United States Patent
Oshiyama et al.

(10) Patent No.: US 7,023,452 B2
(45) Date of Patent: Apr. 4, 2006

(54) IMAGE GENERATION SYSTEM, IMAGE GENERATING METHOD, AND STORAGE MEDIUM STORING IMAGE GENERATION PROGRAM

(75) Inventors: Tomoyuki Oshiyama, Kawasaki (JP); Nobuyuki Mori, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 09/911,419

(22) Filed: Jul. 25, 2001

(65) Prior Publication Data
US 2002/0113796 A1    Aug. 22, 2002

(30) Foreign Application Priority Data
Feb. 22, 2001    (JP)    ............................. 2001-046499

(51) Int. Cl.
*G09G 5/00*    (2006.01)
(52) U.S. Cl. ...................................... 345/635; 715/723
(58) Field of Classification Search ........ 315/619–635; 382/199–208; 715/723, 751
See application file for complete search history.

(56) References Cited

U.S. PATENT DOCUMENTS

| 4,974,173 | A | * | 11/1990 | Stefik et al. ................. 715/751 |
| 5,809,240 | A | * | 9/1998 | Kumagai .................... 709/205 |
| 5,936,642 | A | * | 8/1999 | Yumoto et al. .............. 345/504 |
| 6,008,822 | A | * | 12/1999 | Yumoto et al. .............. 345/530 |
| 6,084,565 | A | * | 7/2000 | Kiya ........................... 345/635 |
| 6,226,392 | B1 | * | 5/2001 | Bacus et al. ................. 382/128 |
| 6,357,042 | B1 | * | 3/2002 | Srinivasan et al. ............ 725/32 |
| 6,401,237 | B1 | * | 6/2002 | Ishikawa ..................... 717/113 |
| 6,701,012 | B1 | * | 3/2004 | Matthews .................... 382/173 |
| 2001/0030654 | A1 | * | 10/2001 | Iki .............................. 345/629 |

FOREIGN PATENT DOCUMENTS

| JP | A-7-98726 | 4/1995 |
| JP | A-8-16766 | 1/1996 |
| JP | A-9-319788 | 12/1997 |
| JP | A-11-85967 | 3/1999 |
| JP | A-11-353470 | 12/1999 |

\* cited by examiner

*Primary Examiner*—Ryan Yang
(74) *Attorney, Agent, or Firm*—Staas & Halsey LLP

(57) ABSTRACT

An image division unit divides an original image. Each divided image is assigned an identifier, and additional information for generating an image corresponding to each divided image. An image distribution unit transmits the divided image and a reference drawing to a corresponding image generation terminal device. The image generation terminal device displays the reference drawing, generates an image corresponding to the received divided image, and transmit the generated image to an image distribution device. The image generation unit generates an entire image by integrating images received from a plurality of image generation terminal devices.

16 Claims, 45 Drawing Sheets

| IMAGE IDENTIFIER | SETTING EXAMPLE |
|---|---|
| IMAGE ID | P00001 |
| IMGAE NAME | Work |
| IMAGE TYPE | V |
| NUMBER OF DIVISION | 5 |
| NUMBER OF LAYERS | 3 |
| NUMBER OF TIME DIVISION | 1 |

F I G. 1 7 A

| DIVISION IDENTIFIER | | SETTING EXAMPLE | |
|---|---|---|---|
| IMAGE ID | | P00001 | |
| DIVISION NUMBER | | 2 | |
| GENERATION TARGET FLAG | | 1 | |
| NAME OF ASSIGNED MACHINE | | S701 | |
| END FLAG | | 0 | |
| DIVISION STARTING POINT(X) | DIVISION STARTING POINT(Y) | 10 | 15 |
| DIVISION INTERMEDIATE POINT(X) | DIVISION INTERMEDIATE POINT(Y) | 46 | 78 |
| DIVISION END POINT(X) | DIVISION END POINT(Y) | 104 | 200 |

F I G. 1 7 B

| LAYER IDENTIFIER | SETTING EXAMPLE |
|---|---|
| IMAGE ID | P00001 |
| LAYER NUMBER | 2 |
| GENERATION TARGET FLAG | 1 |
| NAME OF ASSIGNED MACHINE | S702 |
| END FLAG | 0 |

| TIME SERIES INFORMATION | SETTING EXAMPLE |
|---|---|
| IMAGE ID | P00001 |
| TIME SERIES NUMBER | 3 |
| NUMBER OF FRAMES IN UNIT TIME | 20 |
| TIME INTERVAL | 0.05 |
| STARTING TIME | 20001227011200 |
| END TIME | 20001227011300 |

F I G. 2 4

| IMAGE MOVEMENT INFORMATION | | SETTING EXAMPLE | |
|---|---|---|---|
| IMAGE ID | | P00001 | |
| MOVEMENT TARGET NAME | | OBJ001 | |
| GROUP NAME | | GPR001 | |
| BASIC MOVEMENT INFORMATION | STARTING POINT(X) | STARTING POINT(Y) | 11 | 103 |
| | END POINT(X) | END POINT(Y) | 120 | 140 |
| | NUMBER OF FRAMES IN UNIT TIME | | 20 | |
| | TIME INTERVAL | | 0.05 | |
| | STARTING TIME | | 20001227011200 | |
| | END TIME | | 20001227011300 | |
| ENLARGEMENT/REDUCTION INFORMATION | ENLARGEMENT/REDUCTION FLAG | | 1 | |
| | ENLARGEMENT/REDUCTION BASE POINT(X) | ENLARGEMENT/REDUCTION BASE POINT(Y) | 1 | 0 |
| | INITIAL ENLARGEMENT/REDUCTION RATE | | 1 | |
| | ENLARGEMENT/REDUCTION RATE CHANGE | | 1 | |
| | STARTING POINT MAGNIFICATION | | 1 | |
| ROTATION INFORMATION | ROTATION FLAG | | 0 | |
| | ROTATION CENTER(X) | ROTATION CENTER(Y) | 11 | 12 |
| | INITIAL ROTATION ANGLE | | 0 | |
| | ROTATION ANGLE CHANGE | | 0 | |
| | STARTING POINT ANGLE | | 0 | |

FIG. 26

| TRANSMISSION INFORMATION | SETTING EXAMPLE |
|---|---|
| DIFFERENCE FLAG | 1 |
| END FLAG | 0 |

F I G. 3 0

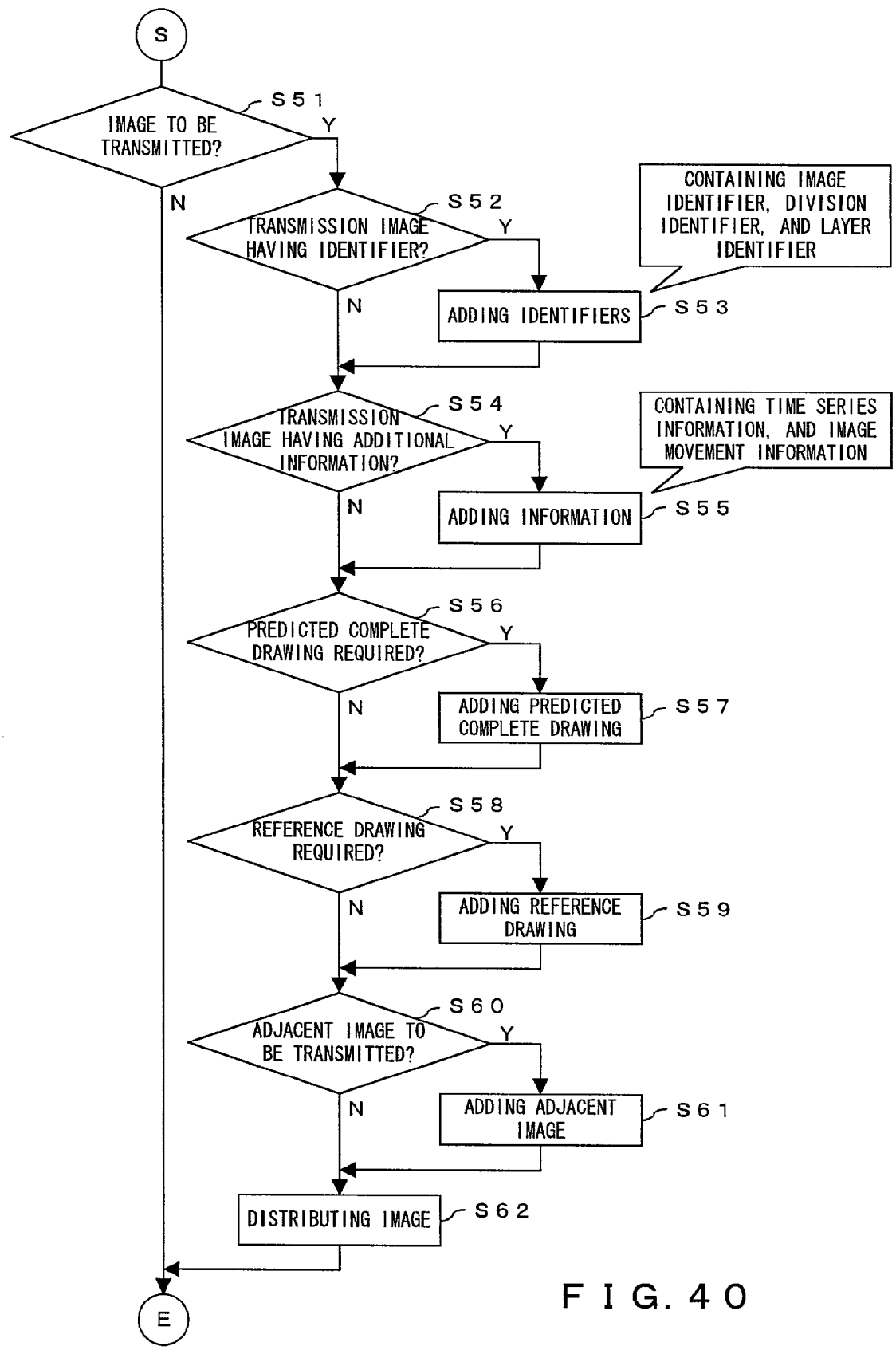
F I G. 40

IMAGE GENERATION SYSTEM, IMAGE GENERATING METHOD, AND STORAGE MEDIUM STORING IMAGE GENERATION PROGRAM

BACKGROUND OF THE INVENTION

1. Field of the Invention

The present invention relates to an image generation system for dividing an image into a plurality of image sections, distributing them to a plurality of terminal devices, and performing a process of generating or editing each image in each terminal device.

2. Description of the Related Art

Recently, the technology of generating or editing an image using a computer has been widely used. However, the operation of generating moving picture and a complicated image requires a very long time and laborious work. Therefore, when the above mentioned image is to be efficiently generated in a short time, the work is often shared among a plurality of users.

A method of generating a specific image by sharing the entire process among a plurality of users can be, for example, (1) storing an original image in a server computer, and a plurality of user accessing the server computer to generate a target image, (2) dividing an original image into a plurality of image sections, distributing them to a plurality of terminal devices, each terminal device performing an assigned editing process, and then combining the edited image sections, etc.

The technology of generating a specific image by sharing respective processes among a plurality of users is described in, for example, Japanese Patent Application No. 7-98726 (U.S. Pat. No. 2,863,428). In addition, the technology of distributing an image process to a plurality of terminal devices is described in, for example, Japanese Patent Application No. 8-16766, 9-319788, 11-85967, 11-353470.

However, in the conventional methods, each user often feels trouble and inconvenience when he or she cooperates with other users in generating an image in parallel. That is, there has been a request to more efficiently perform an operation of generating an image with a plurality of users (or a plurality of terminal devices).

SUMMARY OF THE INVENTION

The present invention aims at providing an image generation system capable of efficiently generating or editing an image by a plurality of users or terminal devices.

The image generation system according to the present invention is designed to generate or edit an image using a plurality of image generation devices, and includes: a division unit for dividing a target image into a plurality of image sections; a providing unit for providing a reference image corresponding to the target image to be displayed on the plurality of image generation devices; a distribution unit for distributing a plurality of divided images obtained from the division unit to corresponding image generation devices, and distributing the reference image to the image generation devices; a display unit for displaying the corresponding divided image and the reference image in the image generation device; and the integration unit for integrating the divided images generated or edited by the plurality of image generation devices.

With the above mentioned configuration, each image generation device displays a significant reference image which corresponds to the divided image assigned to the image generation device, and is useful when the divided image is generated or edited. That is, the user of the image generation device can proceed with his or her process of generating an image by referring to the reference image. Therefore, the efficiency of the image generating operation can be improved, and the image generated by a plurality of image generation device can be completed with an excellent effect of integration.

The image generation system according to another aspect of the present invention is designed to generate or edit an image using a plurality of image generation devices, and includes: a division unit having at least one of the function of dividing a target image into a plurality of areas and the function of dividing the target image into a plurality of layers when the target image is formed by the plurality of layers; a distribution unit for distributing the divided images divided by the division unit to corresponding image generation devices; a generation unit for generating or editing divided images corresponding to the divided image at each image generation device; and a integration unit for integrating divided images generated or edited by the plurality of image generation devices.

With the above mentioned configuration, the target image is divided into areas and/or layers, and distributed to corresponding image generation devices. Then, each image generation device generates or edits a corresponding divided image. Thus, the method of dividing a target image can be more freely used, thereby improving the efficiency of the image generating process.

In the above mentioned system, the distribution unit can be designed to distribute the divided image together with image movement information defining the movement of an image element arranged in the divided image to the corresponding image generation device, and the image generation device can be designed to generate a plurality of divided images corresponding to the received divided images according to the image movement information. With this configuration, each image generation device automatically generates a divided image of a moving picture.

Furthermore, in the above mentioned system, the image generation device can output a divided image being generated, the integration unit can integrate the divided images being generated and output from respective image generation devices, and the distribution unit can transmit the image being generated and integrated by the integration unit. With the configuration, since the entire image being generated by each image generation device is displayed, the user of each image generation device can perform its process while checking the processes performed by other image generation devices.

BRIEF DESCRIPTION OF THE DRAWINGS

FIG. 17A shows an example of a data format of an image identifier;

FIG. 17B shows an example of a data format of a division identifier;

FIG. 17C shows an example of a data format of a layer identifier;

FIG. 18 shows an example of displaying a screen for setting a division identifier;

FIG. 24 shows an example of a data format of time-series information;

FIG. 26 shows an example of a data format of image movement information;

FIG. 30 shows an example of a data format of transmission information;

FIG. 40 is a flowchart of the operation performed by the image distributing unit;

DESCRIPTION OF THE PREFERRED EMBODIMENTS

The embodiments of the present invention are described below by referring to the attached drawings.

Figure 1:
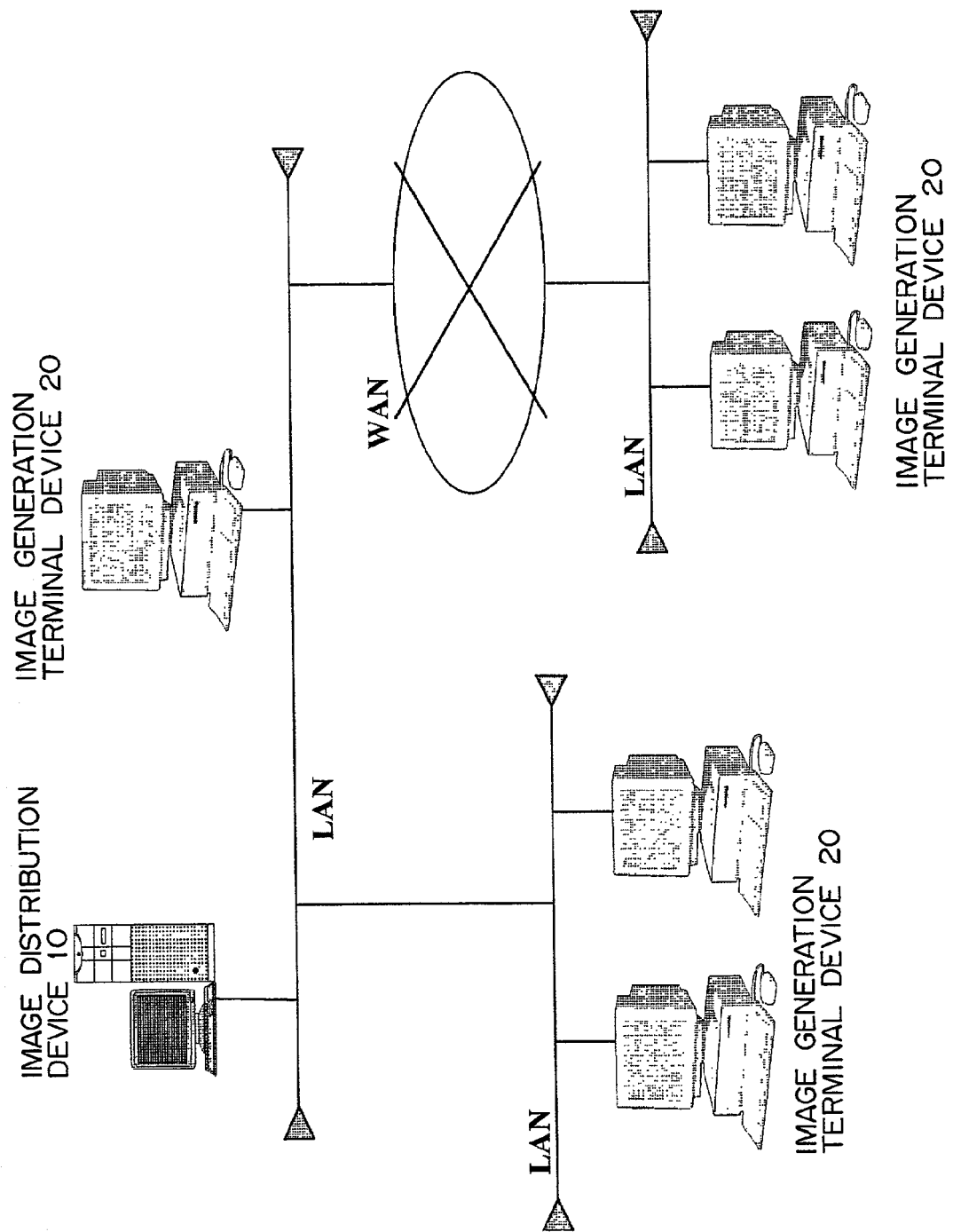
FIG. 1 shows the configuration of the image generation system according to an embodiment of the present invention.

FIG. 1 shows the configuration of the image generation system according to an embodiment of the present invention. The image generation system according to the present embodiment comprises at least one image distribution device 10, and a plurality of image generation terminal devices 20. The image distribution device 10 and the image generation terminal devices 20 are interconnected to each other through a network. The network is, for example, a LAN and/or WAN. The LAN can be a radio network, or a network using an optical fiber or a metal cable. The WAN can be a public network or a VPN (virtual private network) using a public network.

Figure 2:
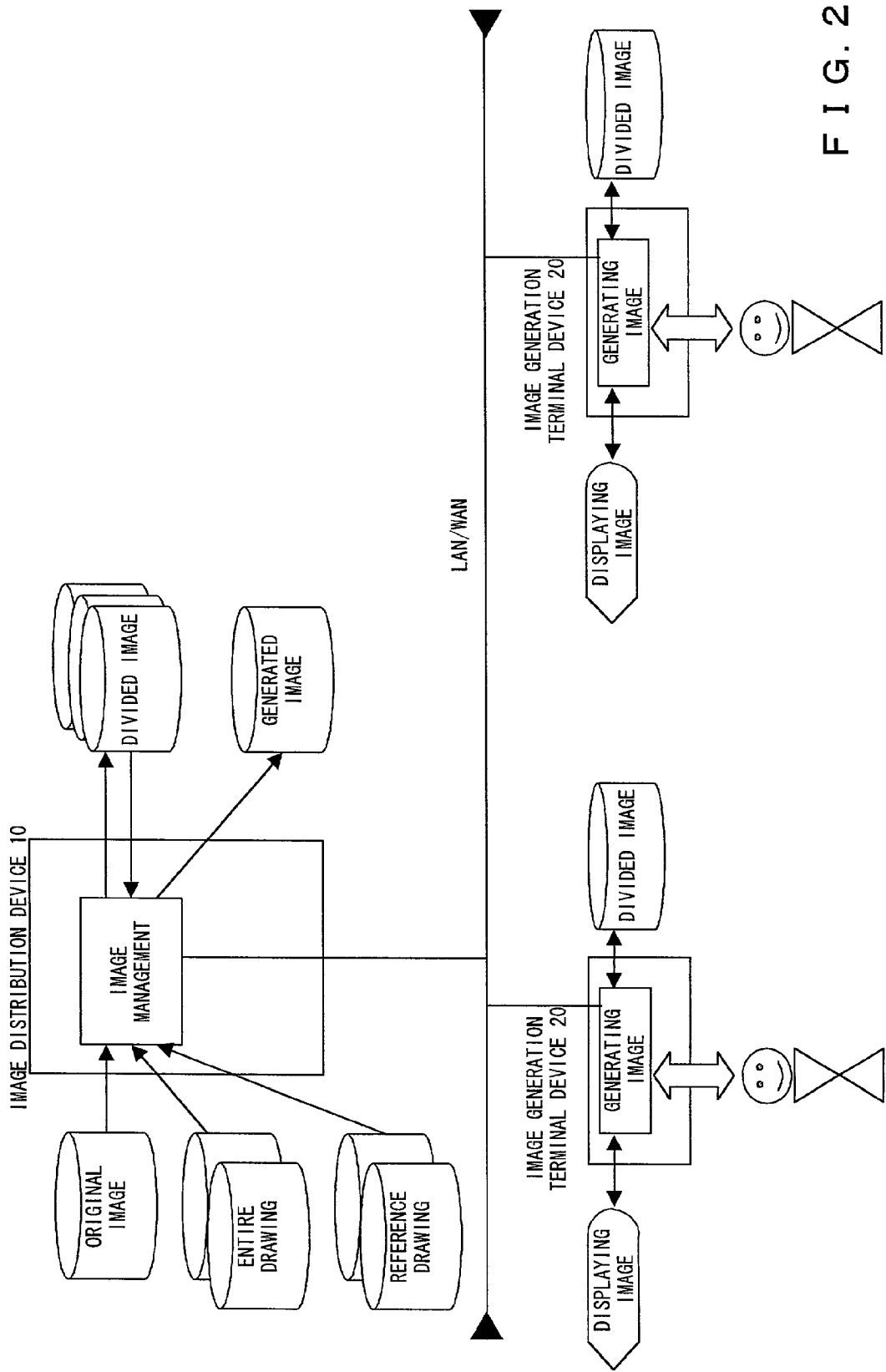
FIG. 2 shows the outline of the operation of the image generation system.

FIG. 2 shows the outline of the operation performed by the image generation system. The image distribution device 10 and the image generation terminal device 20 are interconnected through a network as described above. The image distribution device 10 can transmit data to the image generation terminal devices 20, and each of the image generation terminal devices 20 can transmit data to the image distribution device 10.

The image distribution device 10 generates a plurality of divided image by dividing an original image (target image) into a plurality of image sections, and distributes the plurality of divided images to the corresponding image generation terminal devices 20. The image distribution device 10 can transmit a plurality of divided images to the image generation terminal device 20. The image distribution device 10 can also be operated as an image generation terminal device. In this case, the image distribution device 10 specifies the image distribution device 10 itself as one of the destinations of the divided images.

The image generation terminal device 20 generates a new image based on the divided image received from the image distribution device 10. The image generation terminal device 20 can also edit a received divided image. The process of generating or editing an image can be performed at an instruction from a user, or can be automatically performed by a program described in advance without an operation of a user. The generated or edited image is transmitted to the image distribution device 10. At this time, the image generation terminal device 20 can also transmit the image being generated or edited (an image before completed) to the image distribution device 10.

The image distribution device 10 generates a target image by integrating the images generated or edited by the image generation terminal devices 20. Thus, in the image generation system, the image generating process is distributed to and performed by a plurality of image generation terminal devices 20. Upon receipt of the images being generated or edited by the image generation terminal device 20, the image distribution device 10 transmits the entire image obtained by integrating the received images to each of the image generation terminal devices 20. Thus, the user of each of the image generation terminal devices 20 can be informed of the entire processes.

Furthermore, when transmitting a divided image to the image generation terminal device 20, the image distribution device 10 can transmit information useful to the user of the image generation terminal device 20 together with the divided image. The useful information to the user of the image generation terminal device 20 is, for example, a reference image (reference drawings, predicted complete image, entire image, etc.). The reference image is displayed on the image generation terminal device 20. Therefore, the user of the image generation terminal device 20 can generate or edit an image assigned to the user with referencing to the reference image.

Thus, in the image generation system, the image distribution device 10 and the image generation terminal device 20 interconnected to each other through a network cooperate to generate one image. There is no limit to the place where each device is set. Therefore, the image generating process can also be performed using a remote image generation terminal device.

Figure 3:
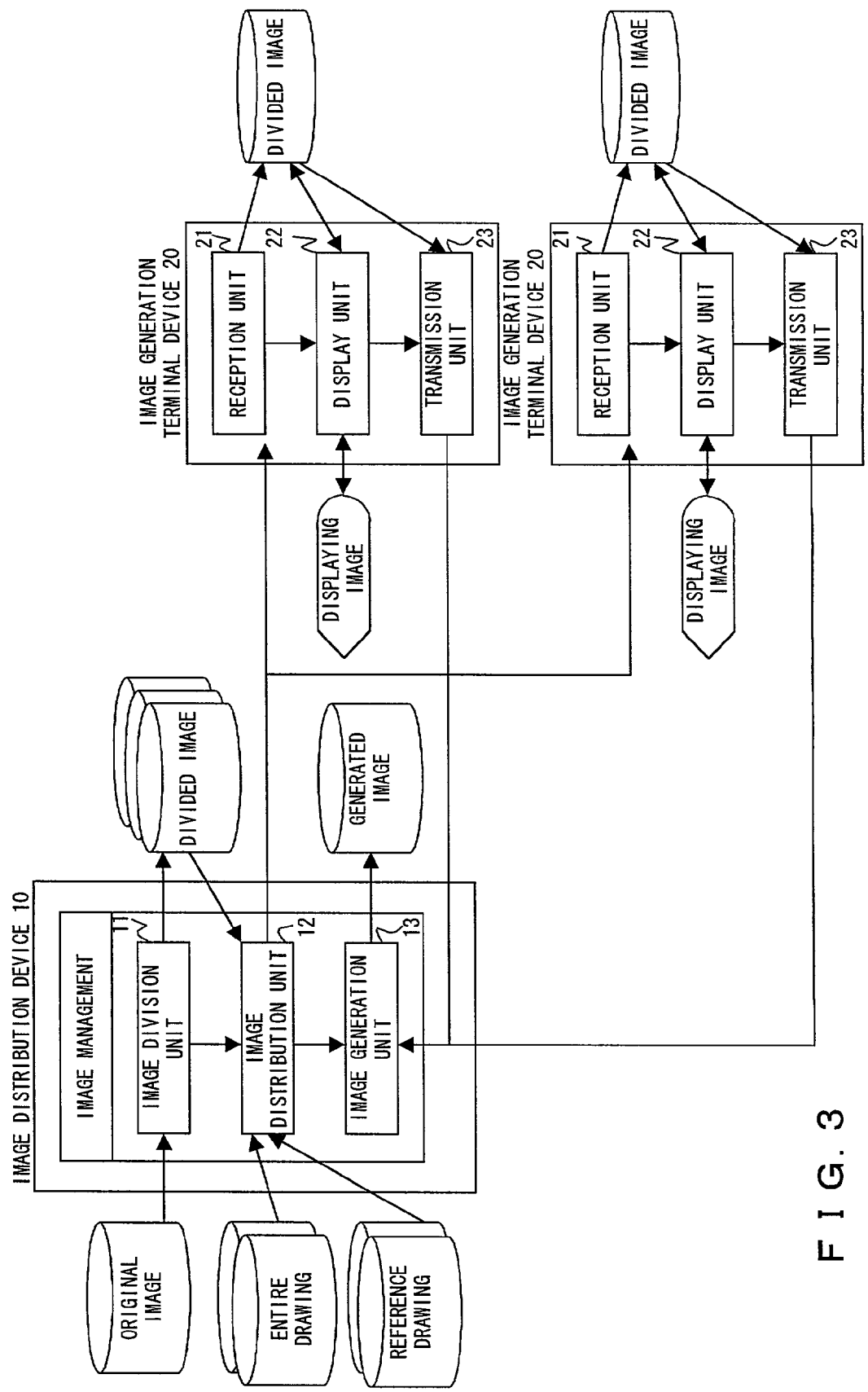
FIG. 3 shows the configuration of the image dividing device and the image generating terminal device.

FIG. 3 shows the configuration of the image distribution device and the image generation terminal device. The image distribution device 10 is a device for performing the main function in the image generation system. That is, the image distribution device 10 performs a process of dividing an original image, a process of distributing a divided image to a corresponding image generation terminal device 20, and a process of receiving and integrating the images being generated by the image generation terminal device 20 or the images generated by the image generation terminal device 20. To perform these processes, the image generation terminal device 20 comprises an image division unit 11, an image distribution unit 12, and an image generation unit 13.

The image division unit 11 divides an original image (target image). At this time, the user of the image distribution device 10 can specify the method of dividing an image using a screen interface or an interactive interface. An image can be basically divided on a display plane, but can be divided into layers when an image is formed by a plurality of layers. The image division unit 11 assigns an image identifier, a division identifier, and a layer identifier to each divided image, and specifies an image generation terminal device to be a destination of the divided image. These identifiers can be assigned at an instruction of a user, or the image division unit 11 can autonomously assign them. Furthermore, the image generation terminal device for transferring a divided image can be specified by a user, or the image division unit 11 can autonomously determine it.

The image distribution unit 12 transmits a divided image and identifiers, etc. corresponding to the divided image to a specified image generation terminal device. The image distribution unit 12 transmits a reference image (reference drawings, sample, predicted complete drawings, etc.) corresponding to a generated image to a corresponding image generation terminal device 20 as necessary. The reference image is assumed to be prepared in advance. Whether or not a reference image is to be transmitted is, for example, instructed by a user.

The image division unit 11 generates time series information and image movement information as necessary. The information is basically used when the image generation terminal device 20 generates moving picture. Therefore, the information is transmitted together with a divided image by the image distribution unit 12 to the corresponding image generation terminal device 20.

With the above mentioned configuration, a plurality of image generation terminal devices 20 can generate divided images forming a target image in parallel. Furthermore, by using the time series information, a plurality of time series images can be edited regardless of the time series order. Additionally, by using the image movement information, the moving picture containing the movement of a specific image element can be automatically generated. Therefore, continuous time series images can be efficiently generated within a short time.

The image generation unit 13 temporarily stores divided images transmitted from the image generation terminal device 20. Then, it generates a target image by integrating the plurality of divided images based on the image identifier, the division identifier, and the layer identifier. The obtained image is the entire image being generated, or the entire image as a generation result.

When integrating the plurality of divided images, the image generation unit 13 integrates divided images based on the difference image and the latest image if the image received from the image generation terminal device 20 is in the difference data format. If the difference data format is set, images are integrated such that the updated portion can be identified. On the other hand, if there is a divided image which is not to be transmitted to the image generation terminal device 20, and the divided image is not to be integrated, then the load of the integrating process can be reduced by not integrating that divided image. Furthermore, if the integration of only the vicinity of a divided image is specified, then the divided image and only the necessary portion of other divided images adjacent to the vicinity of the divided image are integrated. Additionally when the time series information is specified, the time axis is considered to integrate images according to each piece of time series information.

The image generation terminal device 20 generates an image corresponding to the divided image received from the image distribution device 10, and/or edits the divided images received from the image distribution devices 10. To perform the above mentioned processes, the image generation terminal device 20 comprises a reception unit 21, a display unit 22, and a transmission unit 23.

The reception unit 21 receives the divided images transmitted from the image distribution devices 10, the information about various identifiers, etc., the reference image (predicted complete drawings, reference drawings, samples, entire image, etc.), and the integrated image, and the image generation terminal device 20 temporarily stores them in an accessible storage medium.

The display unit 22 displays a received divided image, and displays a reference image as necessary. Then, the user of the image generation terminal device 20 generates or edits the divided image using the screen interface provided by the display unit 22.

The transmission unit 23 reads the divided image being generated at time intervals determined by the characteristics of the image generation terminal device 20, and transmits it to the image distribution device 10. When a transmission request is received from the image distribution device 10, the transmission unit 23 reads the divided image being generated, and transmits it to the image distribution device 10. At this time, the transmission unit 23 compares the divided image data transmitted previously with the divided image data to be transmitted this time, and transmits the difference data to the image distribution device 10. When there is no difference, no data is transmitted to the image distribution device 10.

According to the image generation system with the above mentioned configuration, a divided image being generated is transmitted to the image distribution device 10, and is integrated with other divided images. Thus, the entire image being generated can be displayed on each image generation terminal device 20. As a result, the user of each image generation terminal device 20 can grasp the entire image without inquiring the processes of the operations of other users. Therefore, the operations can be efficiently performed by clarifying the purpose of the generation of images, quickly performing an amending process, reducing repeated operations, etc.

Figure 4:
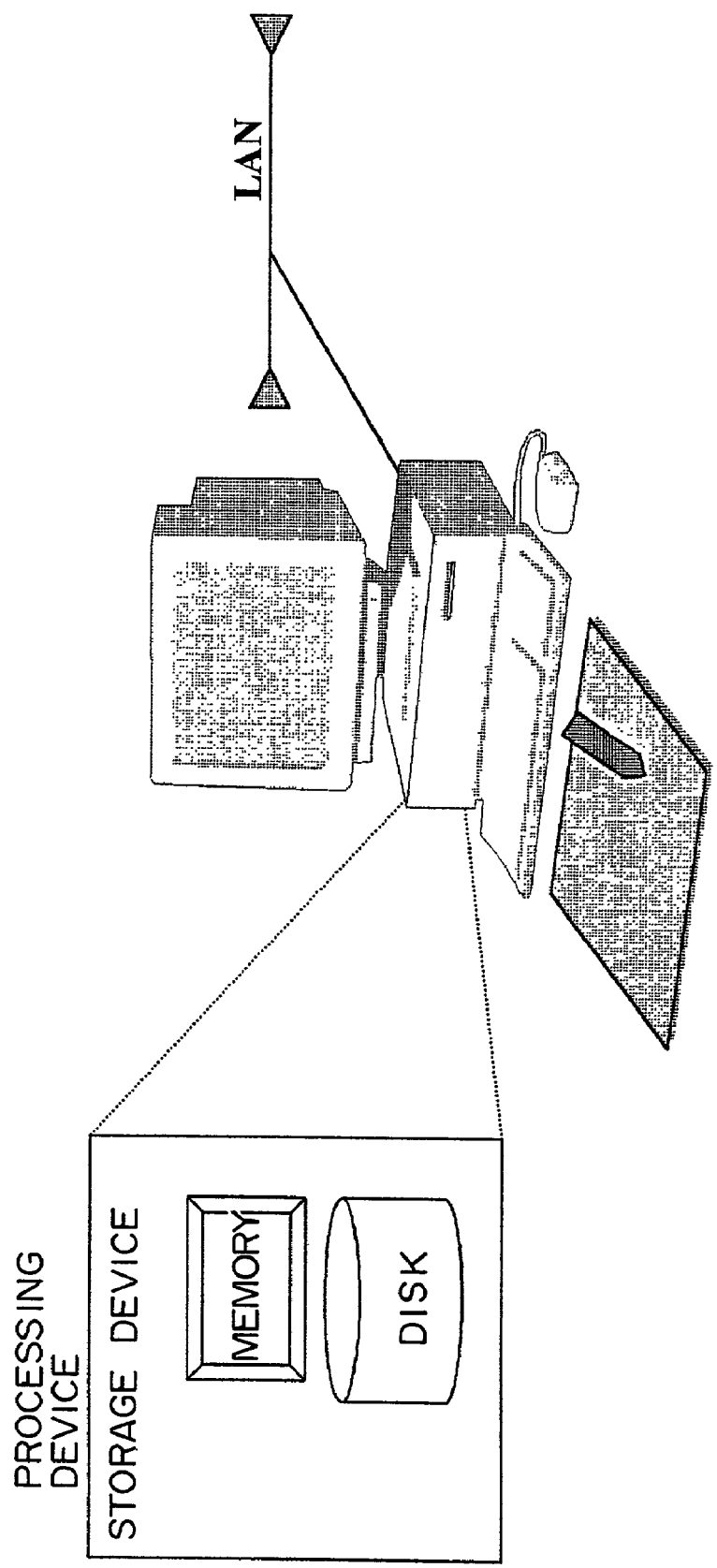
FIG. 4 shows the computer for realizing the image dividing device and the image generating terminal device.

FIG. 4 shows a computer for realizing the image distribution device 10 and the image generation terminal device 20.

The image distribution device 10 and the image generation terminal device 20 are respectively realized by computers. The computer comprises at least a processor, a storage device, an input device, a display device, and a communications device. The processor performs a given program. The storage device includes, for example, a memory device such as semiconductor memory, etc., an external storage medium such as a disk device, a tape device, etc. The storage device stores a program describing the functions mentioned above by referring to FIG. 2 or 3, image data to be processed, the information about the state of the system, etc. The input device can be realized by the device including a plurality of operation keys (for example, a keyboard), and a pointing device such as a mouse, a tablet, etc. The communications control device provides a communications interface for connection to a network.

With the above mentioned configuration, the function of the image distribution device 10 or the image generation terminal device 20 is realized by loading the program from the storage medium onto the memory, and the processor executing the program stored in the memory.

Described below is an example of an embodiment of the image generation system.

Figure 5:
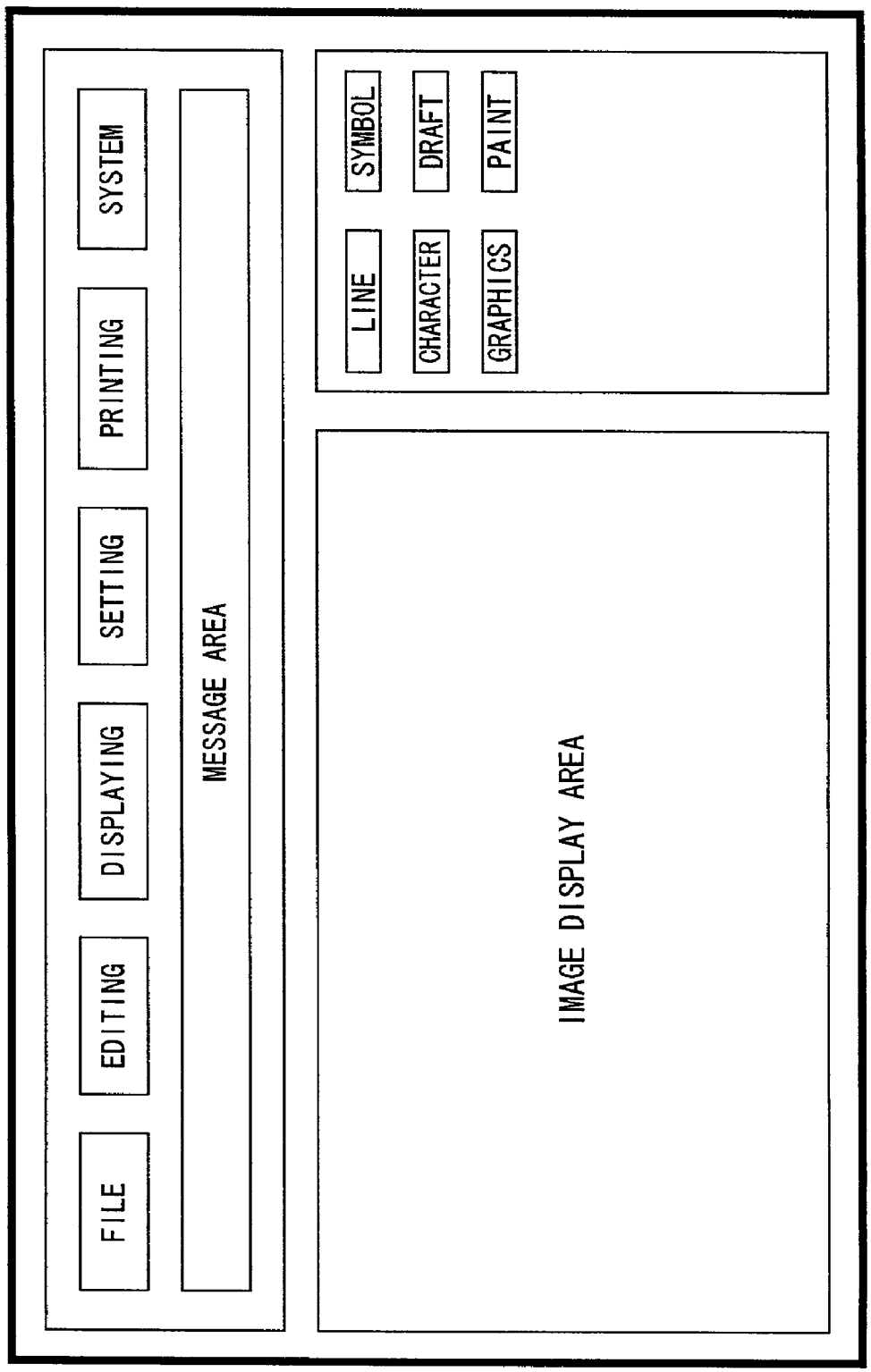
FIG. 5 shows an example of displaying the image generation screen provided by the image generation program according to an embodiment of the present invention.

FIG. 5 shows an example of displaying an image generation screen provided by the image generation program according to the present embodiment. The image generation screen is displayed on the image distribution device 10 and the image generation terminal device 20. The image generation screen displayed on the image distribution device 10 and the image generation terminal device 20 is not necessarily the same screen, but is assumed to be the same in this embodiment.

The image generation screen comprises an image display area for display of an image, a command area in which commands are stored for support of operations, a message area for display of various messages, and an edition button area in which drawing commands for smooth image generating operations are stored. In the example shown in FIG. 5, the command area and the message area are displayed at the upper portion of the image generation screen, the image display area is displayed on the left, and the edition button area is displayed on the right. The user of the image distribution device 10 or the image generation terminal device 20 can select the change, display, or non-display of the display position and size of these areas.

Figure 6:
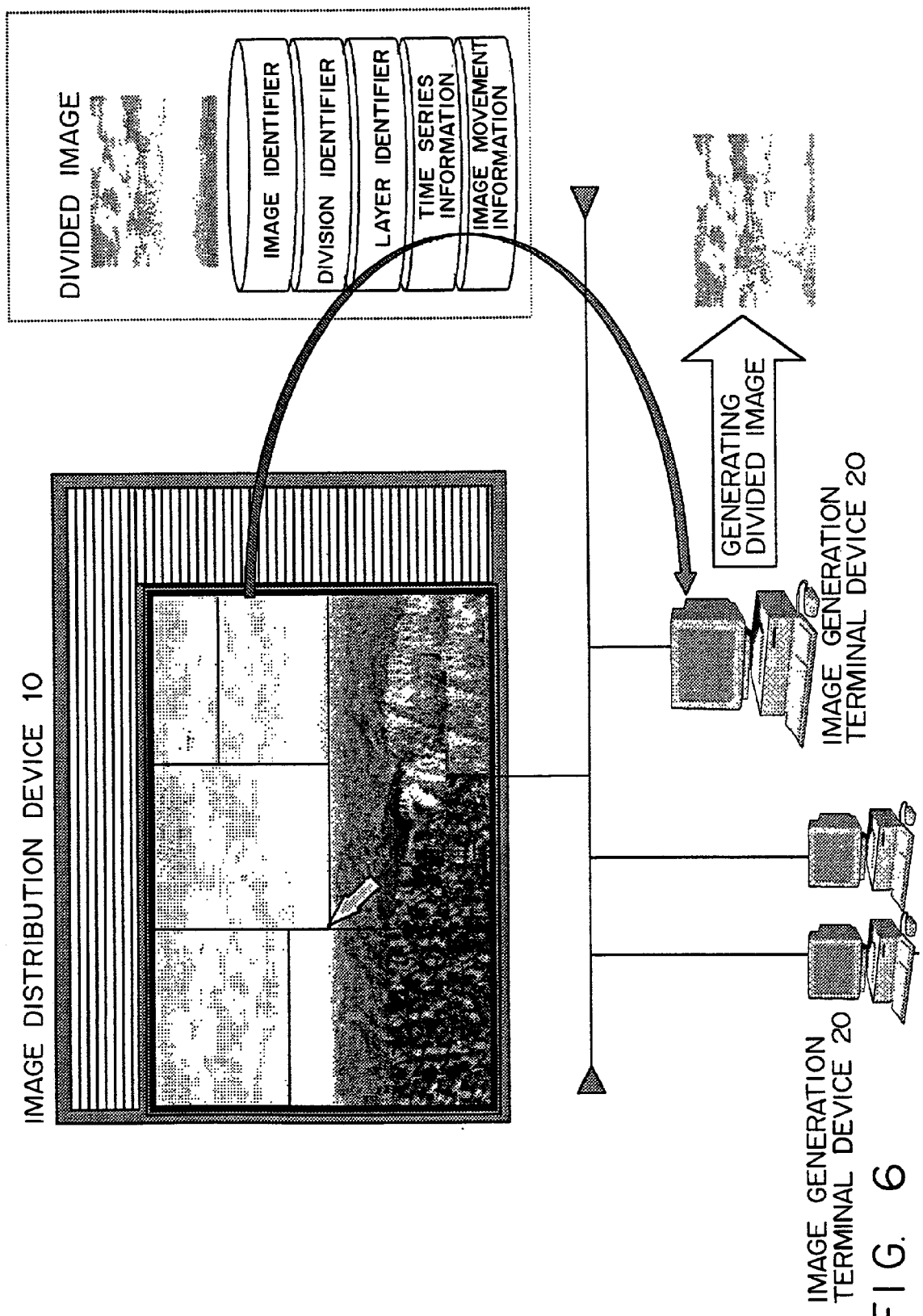
FIG. 6 shows an example of a process of generating a divided image by the image generation system.

FIG. 6 shows an example of a process of generating a divided image in the image generation system according to the present embodiment. In this example, the outline of the sequence of the operations of the image generation system is shown.

On the screen of the image distribution device 10, a user-specified original image (target image), a predicted complete drawing, a reference image, a solid image, etc. are displayed. The user freely divides an original image while by referring to the displayed screen. A divide instruction is input through an input interface such as a tablet, a mouse, etc. capable of drawing an image. In the example shown in FIG. 6, the original image is divided into six pieces, but the number or the shape of divided pieces is not limited. Furthermore, in the operation of dividing an image, there can be the problem of an erroneous input of an instruction or a request to improve a dividing method. Therefore, the image distribution device 10 has the function of storing the contents of a division instruction in a predetermined storage device when they are input, and returning the contents of the division to the original state. Furthermore, the image distribution device 10 can automatically divide the original image depending on the number of image generation terminal devices 20.

After dividing an image, the user assigns a machine (the image generation terminal device 20) corresponding to each divided image. At this time, the image distribution device 10 adds as the generation instruction information an image identifier, a division identifier, a layer identifier, time series information, image movement information, a predicted complete drawing, a reference image, etc. to each divided image. Each divided image is transmitted to a specified image generation terminal device 20 together with the added generation instruction information. The generation instruction information is described later in detail.

In the example shown in FIG. 6, one of the six divided images is transmitted to a specific image generation terminal device 20. Actually, a plurality of divided images are transmitted to corresponding image generation terminal devices 20. At this time, a plurality of divided images can be transmitted to one image generation terminal device 20.

The image generation terminal device 20 receives a divided image transmitted from the image distribution device 10, and the generation instruction information, and displays the divided image. At this time, when a predicted complete drawing or a reference image is transmitted from the image distribution device 10, the image generation terminal device 20 displays the received divided image together with the predicted complete drawing or a reference image. Then, the user of the image generation terminal device 20 generates an image corresponding to the received divided image according to the generation instruction information using a screen interface (including editing a received divided image). In the example shown in FIG. 6, only the divided image generated by the image generation terminal device 20 is shown. However, a plurality of image generation terminal devices 20 generates respective divided images in parallel.

The divided images being generated by a plurality of image generation terminal devices 20 are transmitted to the image distribution device 10 by the transmission unit 23 shown in FIG. 3. Then, the image generation unit 13 of the image distribution device 10 generates the entire image by integrating the divided images using the generation instruction information.

Described below is the method of dividing an image in the image generation system. In this embodiment, the process of dividing an image into areas and the process of dividing an image into layers are used.

Figure 7:
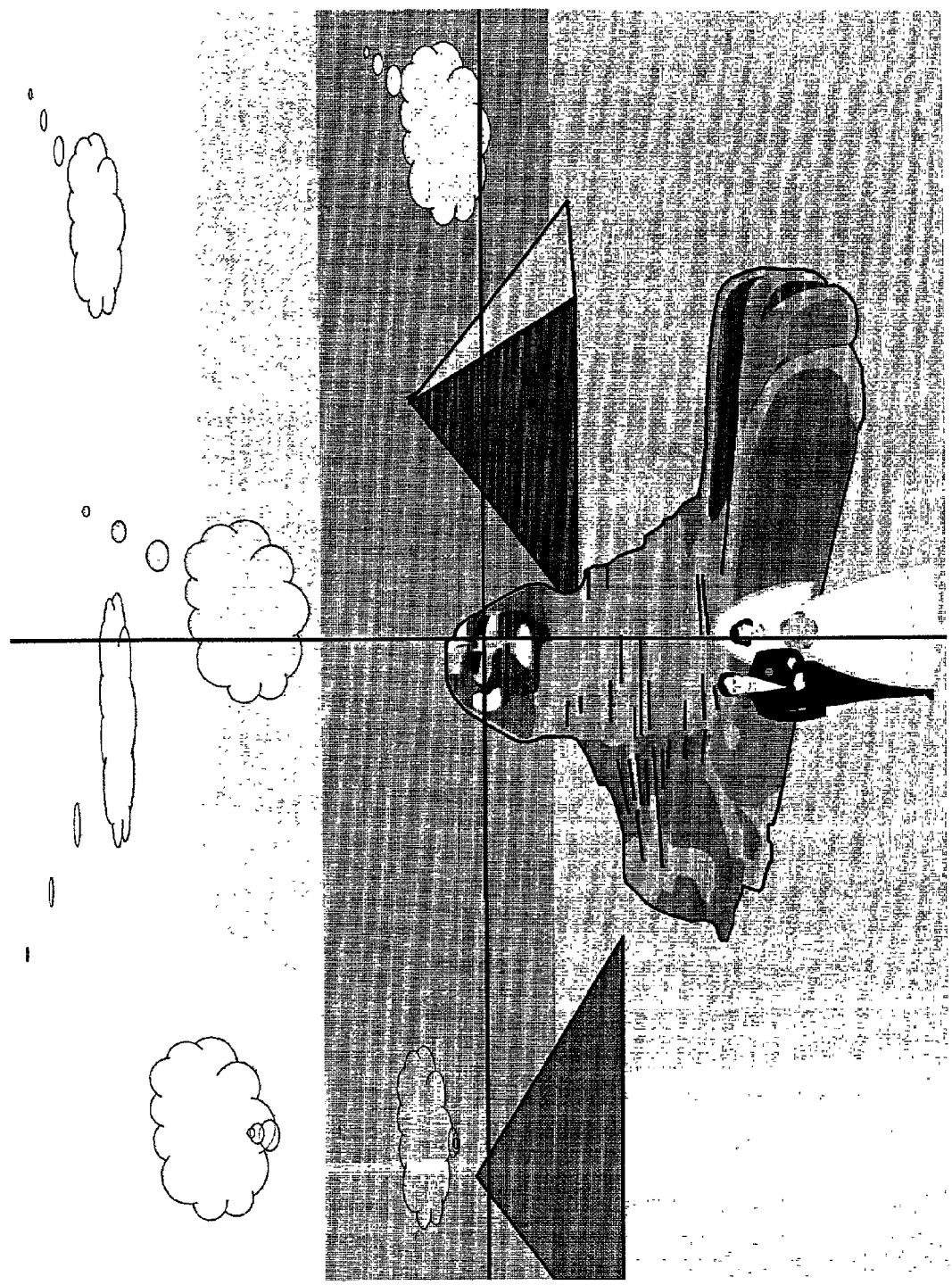
FIG. 7 shows an example (1) of dividing an image into areas.
Figure 8:
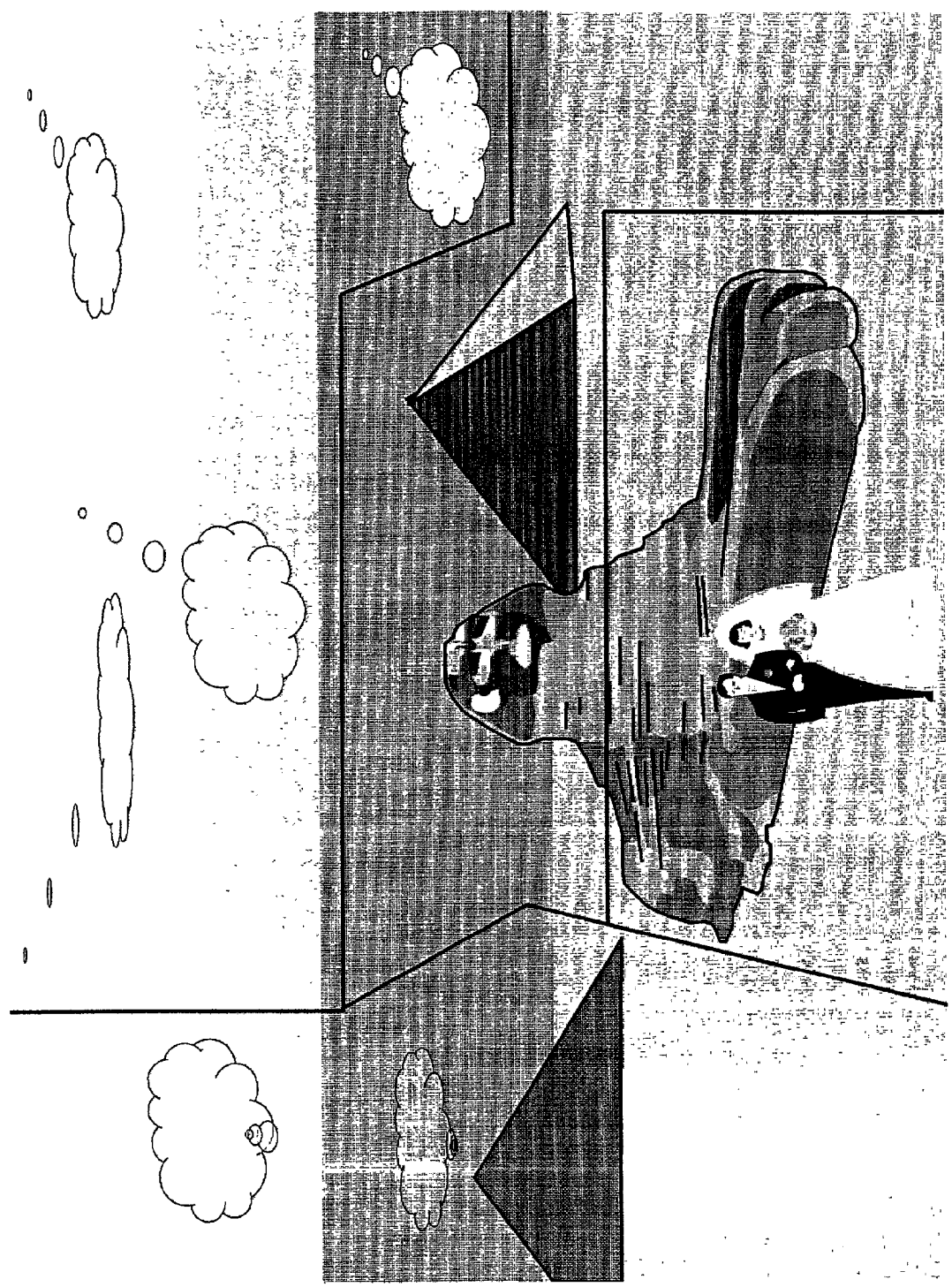
FIG. 8 shows an example (2) of dividing an image into areas.
Figure 9:
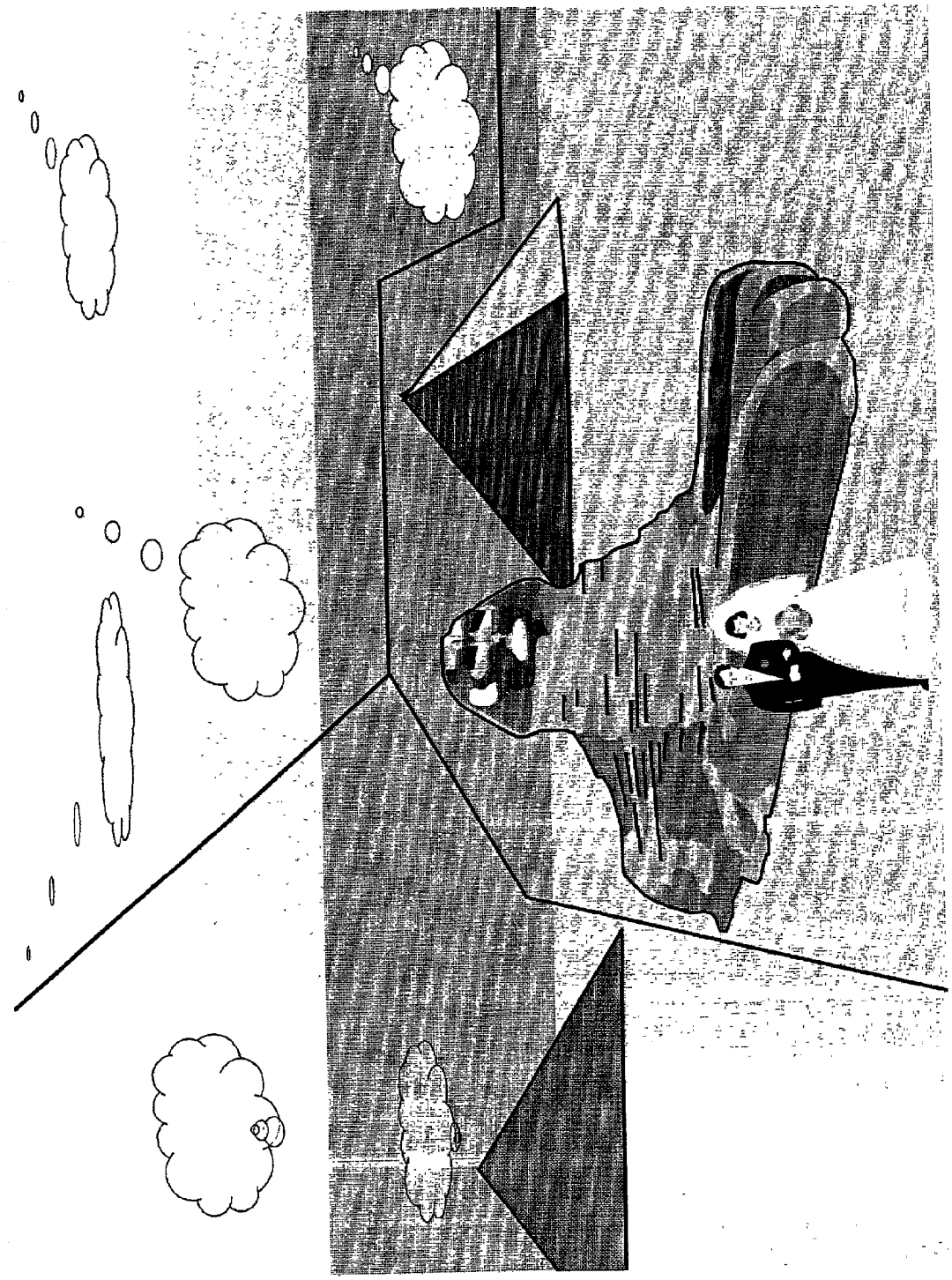
FIG. 9 shows an example (3) of dividing an image into areas.

FIGS. 7 through 9 show examples of dividing an image into areas. This process is performed by the image division unit 11 of the image distribution device 10.

In the example shown in FIG. 7, the original image is divided into four rectangular areas. In the example shown in FIG. 8, an image is divided such that each image element in an image (a couple of bride and bridegroom, a sphinx, a pyramid, cloud, etc.) cannot be divided to a certain extent, and the amount of each operation for each divided image can be average. In the example shown in FIG. 9, an image is divided such that each image element in an image is not divided, the length of the boundary line for division can be shortest possible, and the amount of each operation for each divided image can be average.

An image is basically divided at an instruction of a user. In this case, the user divides an image by drawing a division line on the screen using a mouse, etc. However, the image can be automatically divided by the image division unit 11. For example, in the example shown in FIG. 7, the image can be automatically divided equally into 4 pieces by specifying "the number of divided pieces=4". Otherwise, an image can be automatically divided depending on the number of the image generation terminal devices 20.

In an image in which each image element (object) has an attribute (for example, a vector image), it is not desired that an image element is divided when the image is divided. Therefore, in such an image, as shown in FIG. 8 or 9 (especially as shown in FIG. 9), it is desired that a division line is drawn such that each image element cannot be divided into pieces. Practically, it is desired that an image is divided such that the number of division lines for dividing each element can be the smallest possible value. In this case, the user of the image distribution device 10 can draw the division line, and the image division unit 11 can draw the division line.

The image distribution device 10 transmits each divided image to a corresponding image generation terminal device 20. On the other hand, each image generation terminal device 20 generates a divided image corresponding to a received divided image, and returns it to the image distribution device 10. Then, the image distribution device 10 generates an entire image by integrating the divided images generated by the respective image generation terminal devices 20. When the image distribution device 10 requests a plurality of image generation terminal devices 20 to process an image one divided image can be assigned to one image generation terminal device, and a plurality of divided images can be assigned to one image generation terminal device. Furthermore, the image distribution device 10 does not transmit a divided image to the image generation terminal device 20 if it is not necessary to process the divided image.

FIGS. 10 through 13 show examples of dividing an image into layers. This process is performed by the image division unit 11 of the image distribution device 10.

Figure 10:
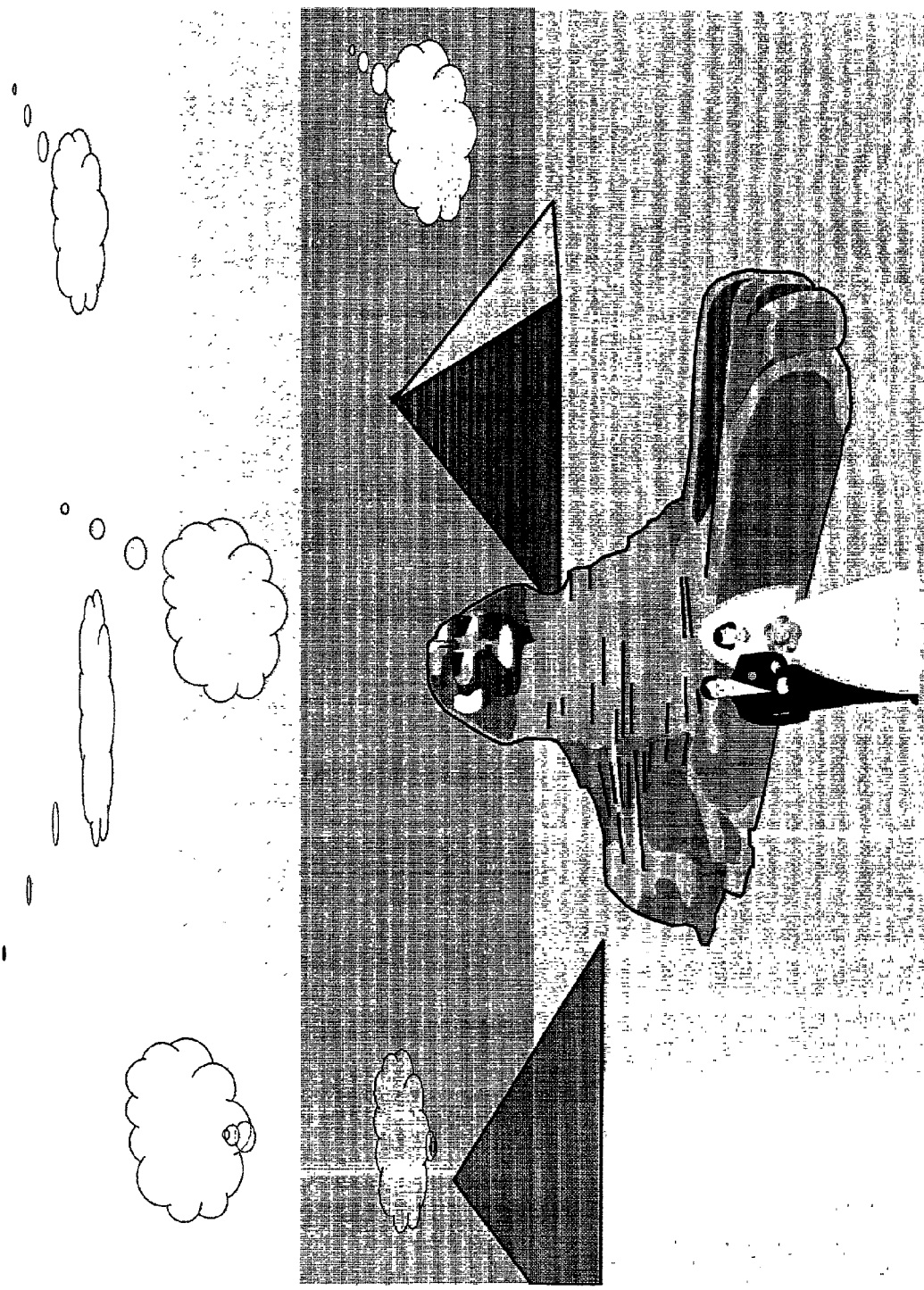
FIG. 10 shows an example (1) of dividing an image into layers.

An image is often generated by combining plural layers of images. The image in this example is formed by three layers. Practically, the image shown in FIG. 10 is obtained by combining the images of the respective layers shown in FIGS. 11 through 13.

The image distribution device 10 transmits the image of each layer to the corresponding image generation terminal device 20. On the other hand, the image generation terminal device 20 generates an image corresponding the received image, and returns it to the image distribution device 10. Then, the image distribution device 10 generates an entire image by integrating the images of the respective layers generated by the image generation terminal device 20. When the image distribution device 10 requests a plurality of image generation terminal devices 20 to process an image, an image of one layer can be assigned to one image generation terminal device, and images of a plurality of layers can be assigned to one image generation terminal device. The image distribution device 10 does not transmit an image of a particular layer to the image generation terminal device 20 if it is not necessary to process the image of the particular layer.

Figure 11:
FIG. 11 shows an example (2) of dividing an image into layers.
Figure 12:
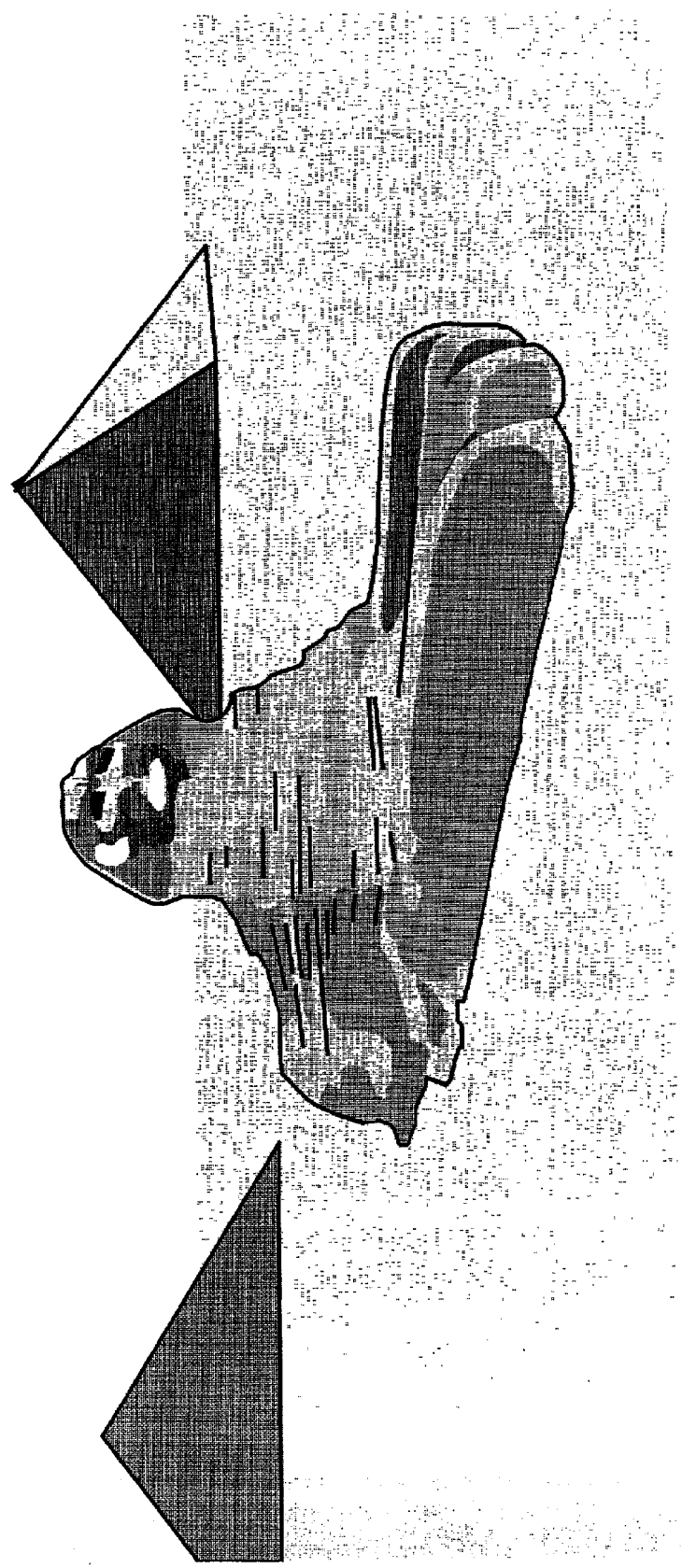
FIG. 12 shows an example (3) of dividing an image into layers.
Figure 13:
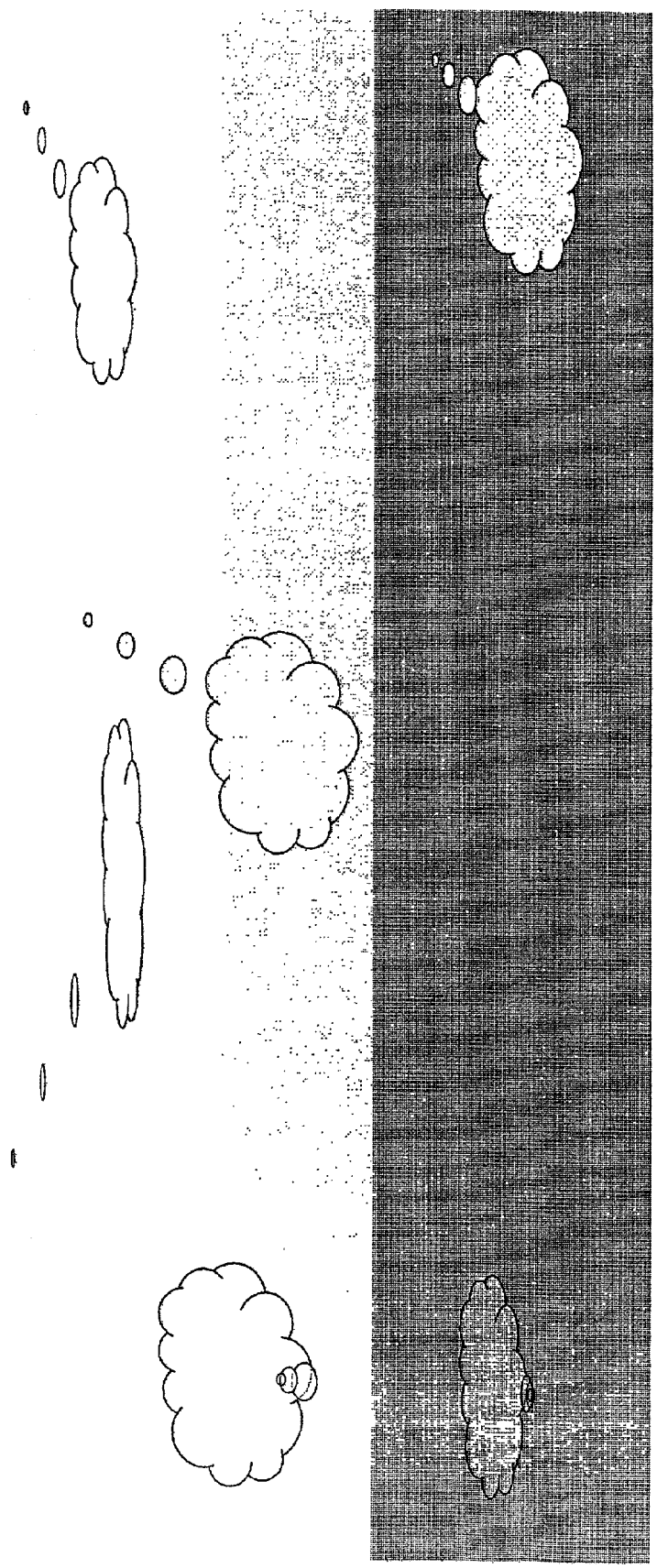
FIG. 13 shows an example (4) of dividing an image into layers.
Figure 14:
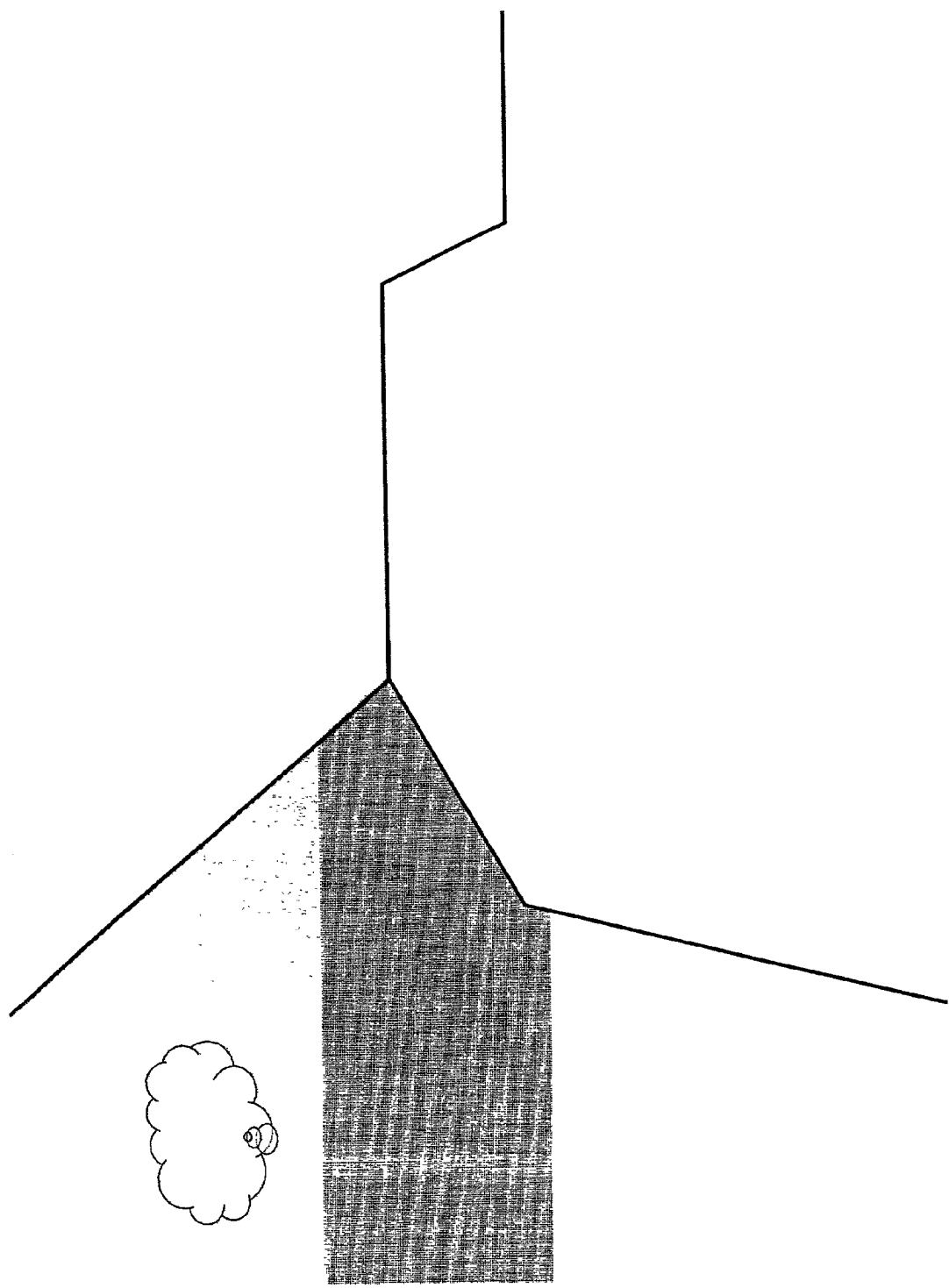
FIG. 14 shows an example (1) of dividing an image into areas and layers.
Figure 15:
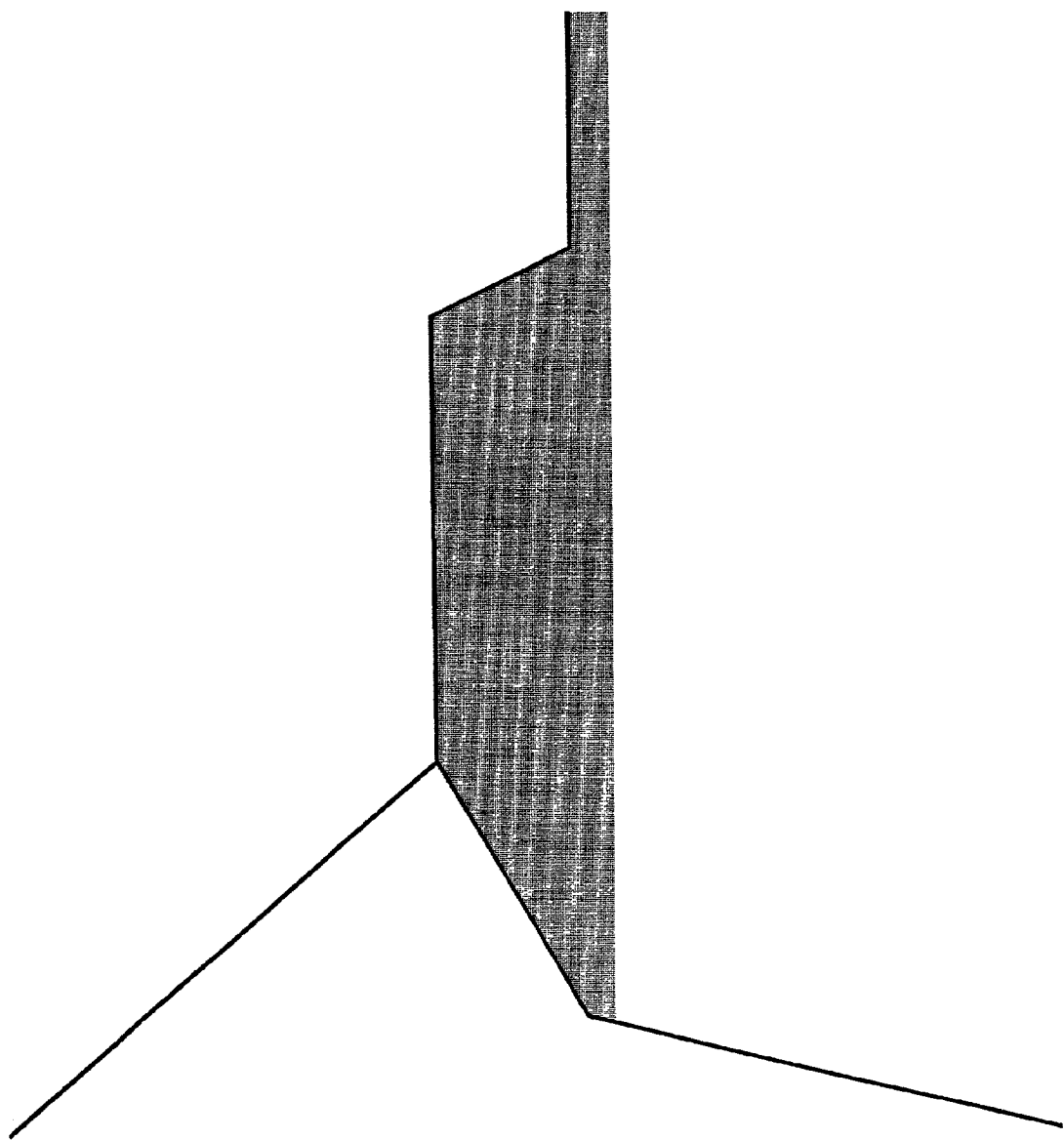
FIG. 15 shows an example (2) of dividing an image into areas and layers.
Figure 16:
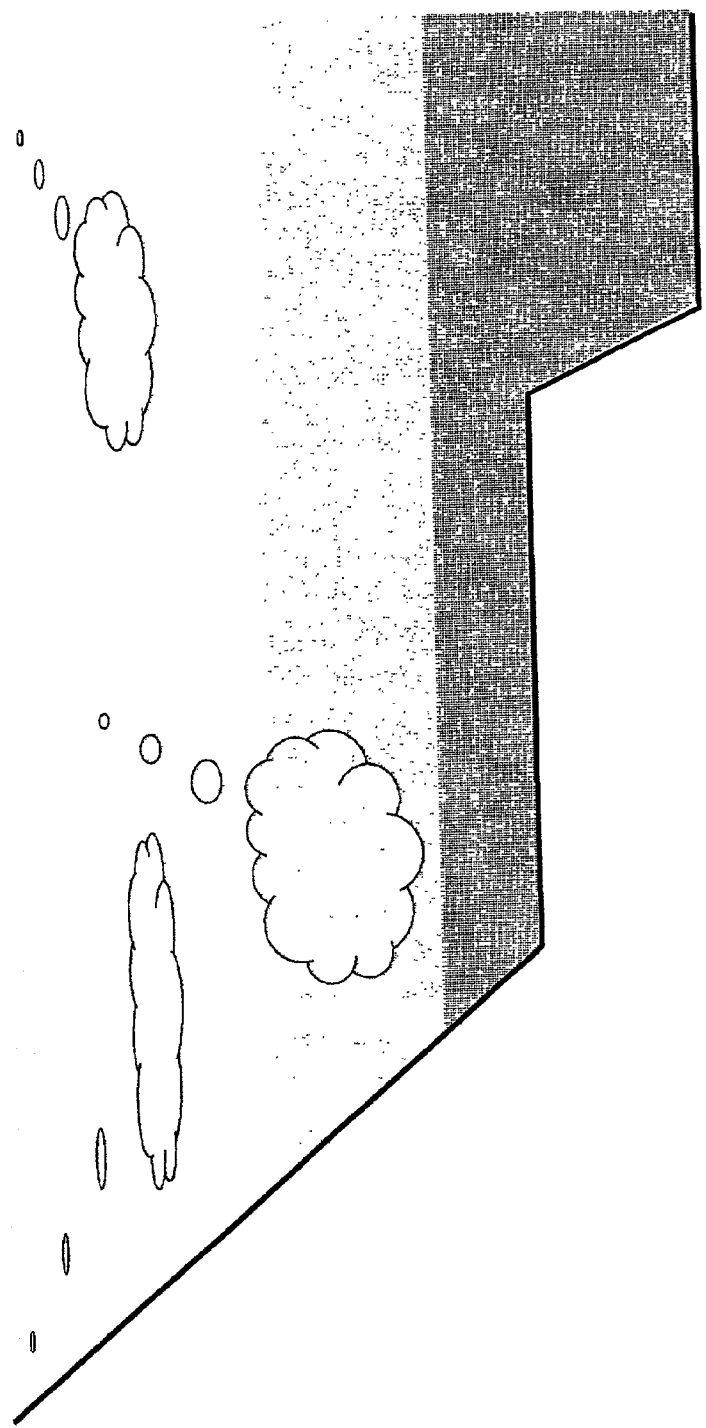
FIG. 16 shows an example (3) of dividing an image into areas and layers.

In FIGS. 7 through 13, the division into areas and the division into layers are independently described above, but they also can be combined and used. FIGS. 14 through 16 show examples of dividing an image into areas and layers. In the examples, an image is divided into layers as shown in FIGS. 11 through 13, and is divided into areas in the method shown in FIG. 9. In FIGS. 14 through 16, only the layer shown in FIG. 13 (the layer of the background image) is displayed.

The image distribution device 10 can transmit the image divided into areas or layers to a corresponding image generation terminal device 20. That is, the image generation system can edit the image divided into areas or layers through the image generation terminal device 20.

Described below are the image identifier, the division identifier, and the layer identifier. These identifiers are generated by the image distribution device 10, and distributed together with a divided image to a corresponding image generation terminal device 20. Then, each image generation terminal device 20 generates a divided image corresponding to the received divided image.

FIG. 17A shows an example of the data format of an image identifier. The image identifier is information identifying each target image and information containing the basic information relating to each target image, and comprises an image ID, an image name, an image type, the number of divided areas, the number of layers, and the number of time division.

The "image ID" is identification information uniquely assigned to a target image when an image generating process is started. Other identifiers described later are linked using this image ID as a key. The image ID is not changed during the process, or the same image ID is not assigned to a plurality of images. The "image name" is the name of a target image. The image ID and the name of an image are associated by this image name.

The "image type" refers to the type or the format of a target image to be generated. For example, it identifies a vector image, a bit map image, etc. The "number of divided areas" refers to the number of images divided into areas by the image distribution device 10. In the example shown in FIG. 7, the number of divided areas is 4. In the example shown in FIG. 9, the number of divided areas is 3. The "number of layers" refers to the number of layers of a target image to be generated. In the examples shown in FIGS. 11 through 13, the number of layers is 3. The "number of time division" refers to the number of total frames to be generated when time series images are generated. For example, assuming that the speed of the moving picture for 3 seconds is 10 frames/second, the number of time division is 30.

The above mentioned information is automatically set by the image distribution device 10. The user can also set the information.

FIG. 17B shows an example of the data format of a division identifier. The division identifier is information identifying each divided image and information containing basic information relating to each divided image, and comprises an image ID, a division number, a generation target flag, a name of assigned machine, an end flag, a division starting point, and a division end point.

The "image ID" inherits the value set in the image identifier shown in FIG. 17A. The "division number" is an identification number uniquely assigned to each image divided by the image division unit 11. For example, when an original image is divided into four areas, 1 through 4 are assigned as division numbers to the respective divided images.

The "generation target flag" refers to whether or not the divided image is a process target. The "process target" refers to that a corresponding image is to be generated by the image generation terminal device 20. The "name of assigned machine" refers to the information identifying the image generation terminal device to be requested to generate a divided image corresponding to the divided image. The name of assigned machine is set only for the divided image on which a generation target flag is effective.

The "end flag" refers to whether or not the image generation terminal device 20 has finished generating a divided image. The end flag is set by the image generation terminal device 20. When the image distribution device 10 detects that the end flag of the division identifier transmitted from the image generation terminal device 20 is effective, it determines that the image generating process has been finished by the image generation terminal device 20, and terminates the communications with the image generation terminal device 20. The "division starting point", the "division intermediate point", and the "division end point" respectively refer to the starting point coordinates, the intermediate point coordinates, and the end point coordinates of the division line for division of a divided image or an image.

Figure 18:
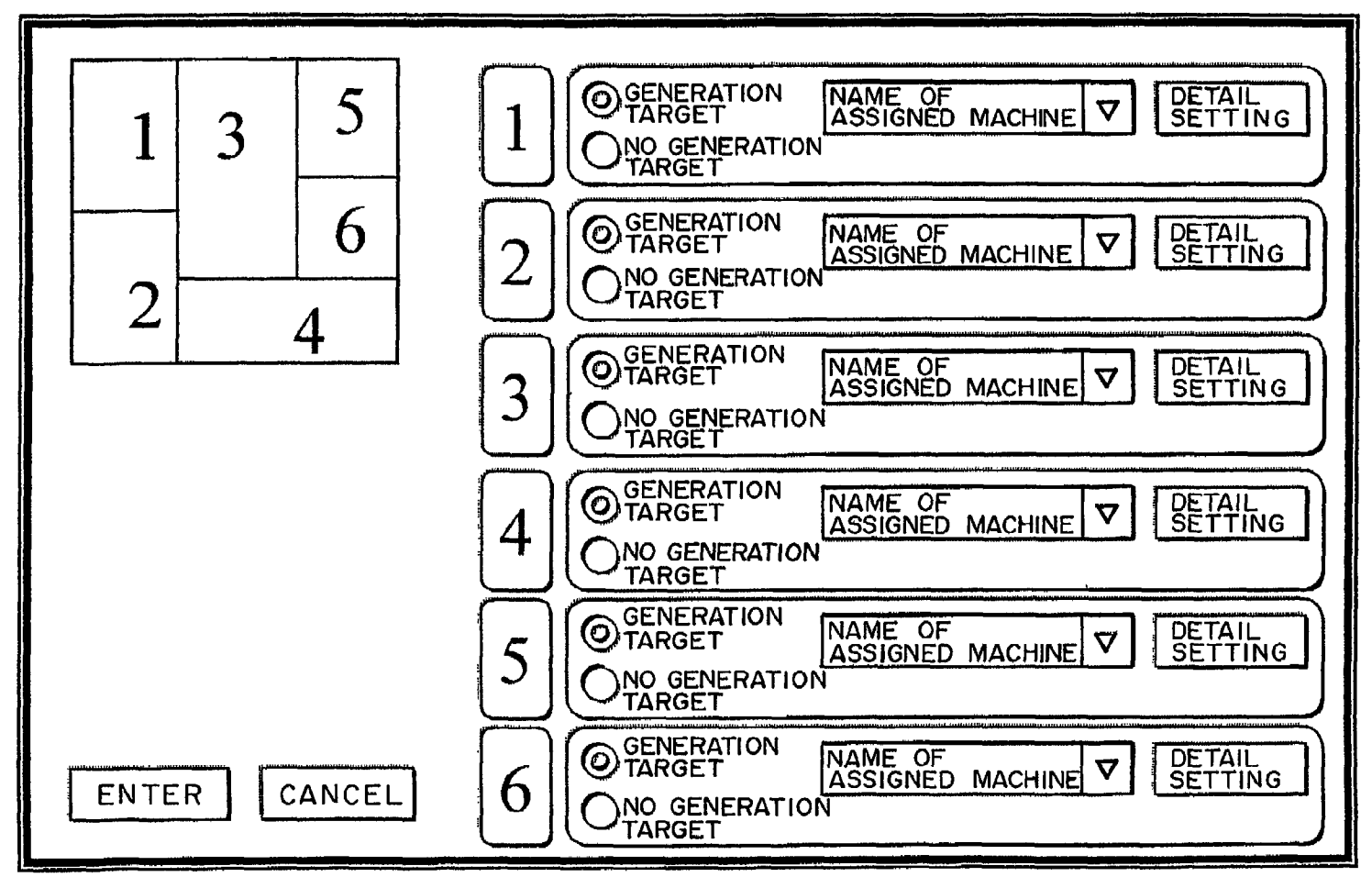

FIG. 18 shows an example of displaying a screen for setting a division identifier shown in FIG. 17B. In this example, an original image is assumed to be divided into six sections.

In this setting screen, the process of dividing an image into areas is shown on the left of the screen. Each divided image is assigned a division number (1 through 6 in this example). The division number is automatically assigned by the image division unit 11 when, for example, an original image is divided. On the right of the screen, a setting dialog box is shown corresponding to each divided image. The number of setting dialog boxes depends on the number of divided areas.

The setting dialog box has a radio button for setting whether or not the divided image is a target to be generated, a menu for specification of a machine to be requested to generate an image (the image generation terminal device 20), and a button for setting the detailed information. When an image generation terminal device is requested to generate a divided image, the name of the machine of the corresponding image generation terminal device is set in the setting dialog box corresponding to the divided image. The name of the machine can be selected by registering the name in the image generation system in advance and scrolling the menu.

Figure 19:
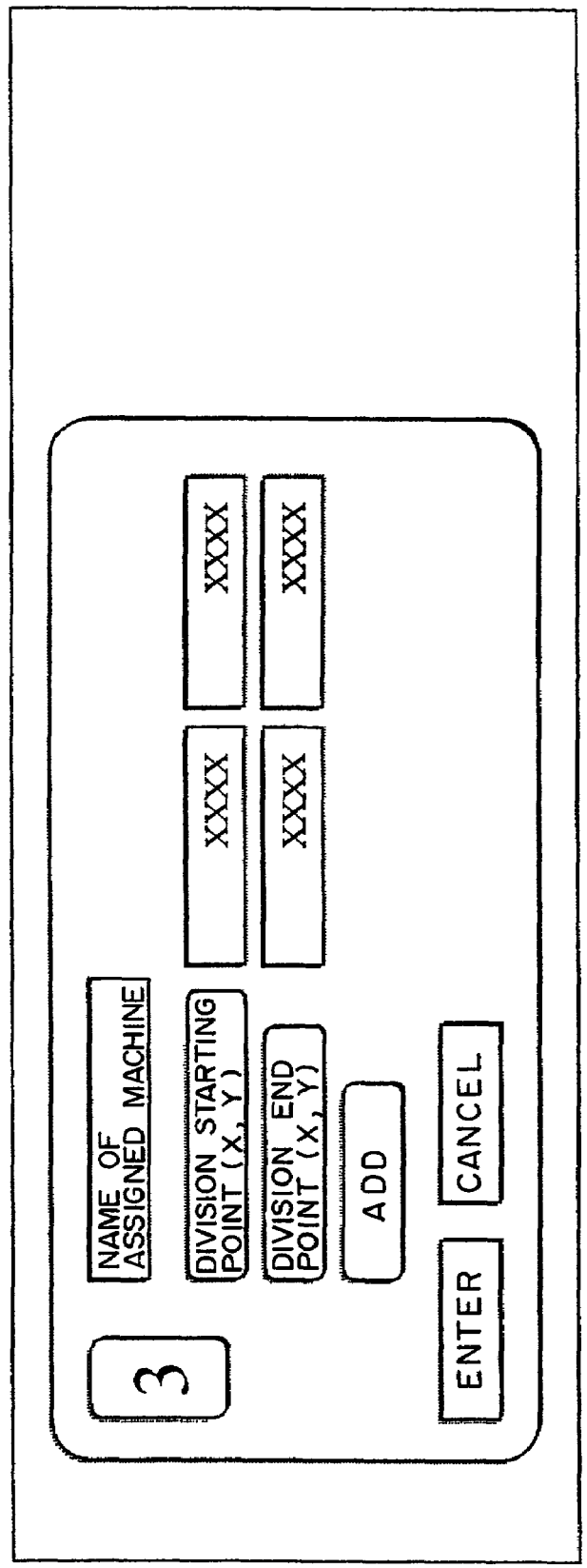
FIG. 19 shows an example of displaying a screen for setting detailed information about a division identifier.

FIG. 19 shows an example of displaying the screen for setting the detailed information about the division identifier. The screen can be invoked by clicking a details setting button shown in FIG. 18. The detailed information includes the information about the position or the shape of each divided image. Practically, the detailed information contains the starting point coordinates (coordinates of the upper left corner) and the end point coordinates (coordinates of the lower right corner) of each rectangular area. Otherwise, it contains the information indicating the boundary line between a divided image and another divided image.

On the setting screen, the division number, the name of assigned machine, the division starting point button, the division starting point coordinates, the division end point button, the division end point coordinates, the addition button, the registration button, and the cancel button are displayed. The division starting and end points can be set by specifying a desired point on the original image using a mouse, etc. or can be set by inputting a desired coordinates using a keyboard. Furthermore, by clicking an addition button, the information for definition of a line for division of an image can be added. Afterwards, when the set value on the screen is entered, the registration button is clicked. When the set value is discarded and the set screen is terminated, the cancel button is clicked.

A set of division starting and end points basically indicates a line for dividing an image, but can also indicate a rectangular area. Furthermore, when a division line is drawn using a mouse, etc., the starting and end points of the line can be automatically set in the detailed information.

FIG. 17C shows an example of a data format of a layer identifier. The layer identifier is information identifying each layer and information including the basic information about each layer, and comprises an image ID, a layer number, a generation target flag, the name of assigned machine, and an end flag.

The "image ID" inherits the value set in the image identifier shown in FIG. 17A. The "layer number" is an identification number uniquely assigned to the image of the layer. The "generation target flag" indicates whether or not the image of the layer is a process target. The "name of assigned machine" identifies the image generation terminal device requested to generate an image corresponding to the image of the layer. The "end flag" indicates whether or not the image generation terminal device 20 has completed generating the image of the layer.

Figure 20:
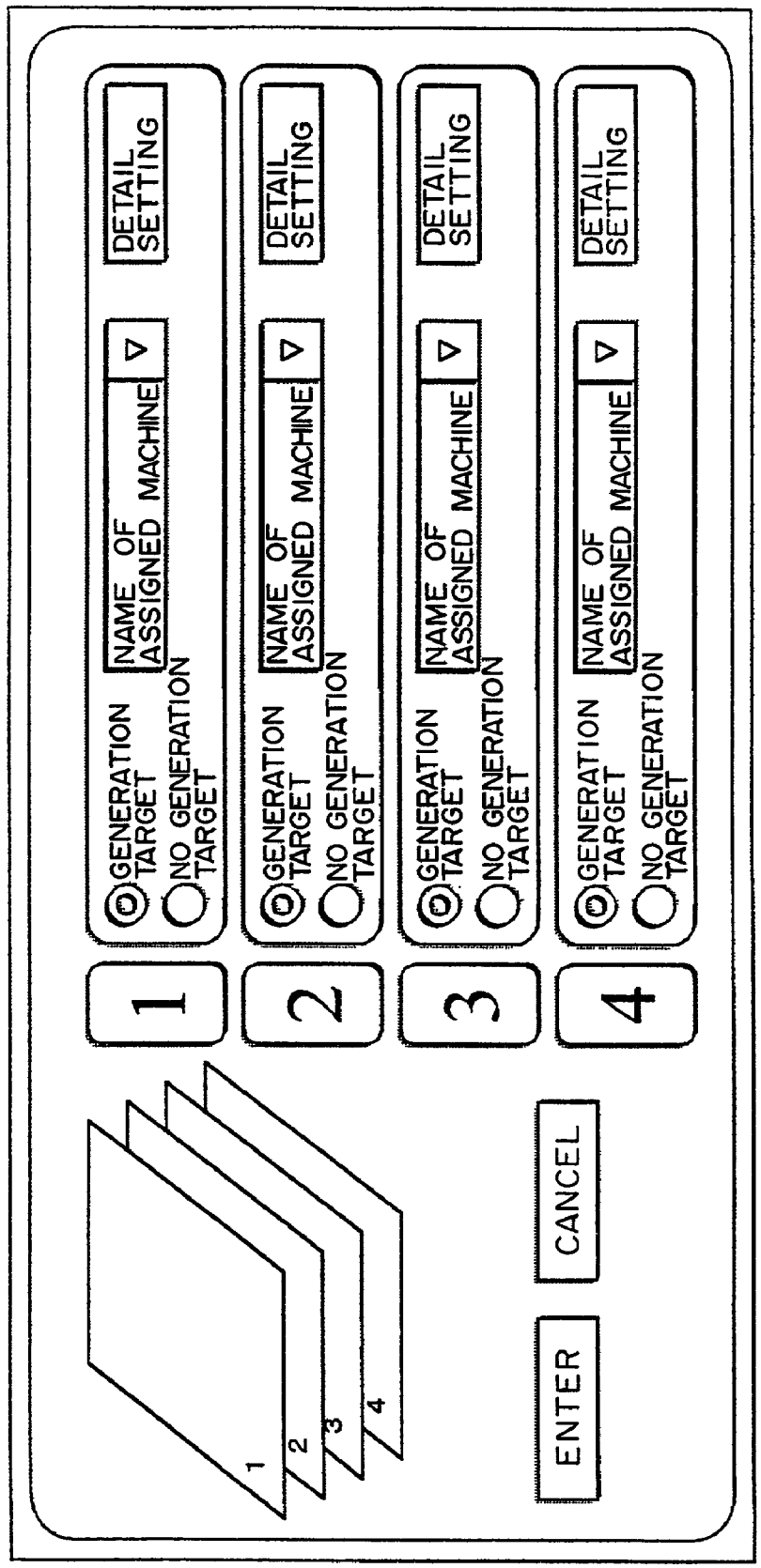
FIG. 20 shows an example of displaying a screen for setting a layer identifier.

FIG. 20 shows an example of displaying a screen for setting a layer identifier shown in FIG. 17C. In this example, an original image is assumed to be divided into four layers.

In this setting screen, the layer forming an image is shown on the left of the screen. Each layer is assigned a layer number (1 through 4 in this example). The layer number is automatically assigned by, for example, the image division unit 11. On the right of the screen, a setting dialog box is shown corresponding to each layer. The number of setting dialog boxes depends on the number of layer forming an image.

The setting dialog box has a radio button for setting whether or not the image of the layer is a target to be generated, a menu for specification of a machine to be requested to generate an image (the image generation terminal device 20), and a button for setting the detailed information. The settings of the name of assigned machine, etc. are basically described above by referring to FIG. 19.

Described next is the method of moving the image element in the image generation system according to the present embodiment. In this example, an image element is moved in parallel (simple movement), enlarged/reduced, or rotated.

Figure 21:
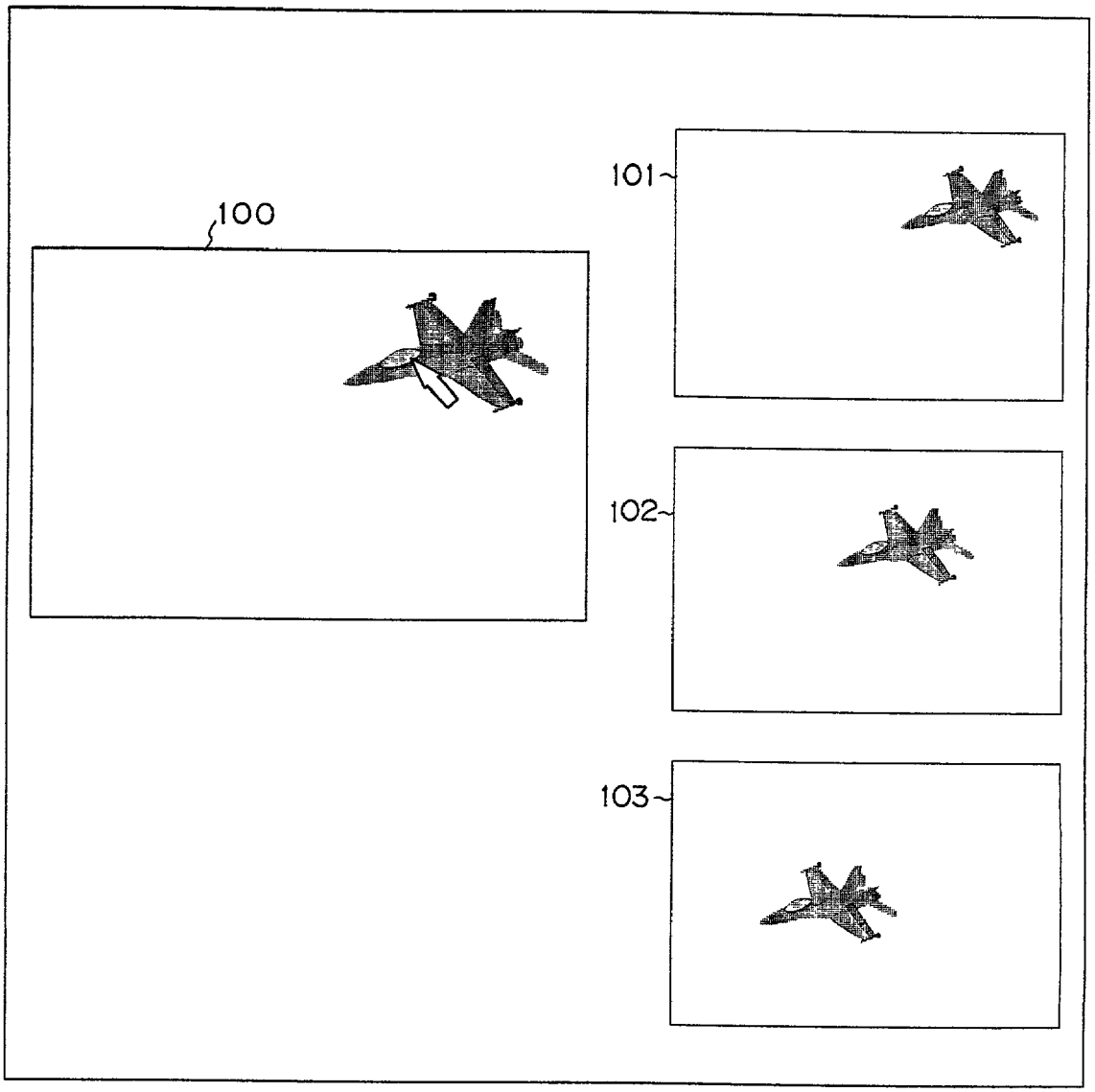
FIG. 21 shows an example of parallel movement of an image element.

FIG. 21 shows an example of parallel movement of image elements. In FIG. 21, an image 100 is an original image. Images 101 through 103 are images obtained by sequentially moving the positions of the image element (an airplane in this example) in the image 100. In this example, the image 101 is an initial image, the image 102 is an intermediate image, and the image 103 is an end image. In this case, by continuously displaying the images 101 through 103, the moving picture of an airplane in flight can be obtained.

Figure 22:
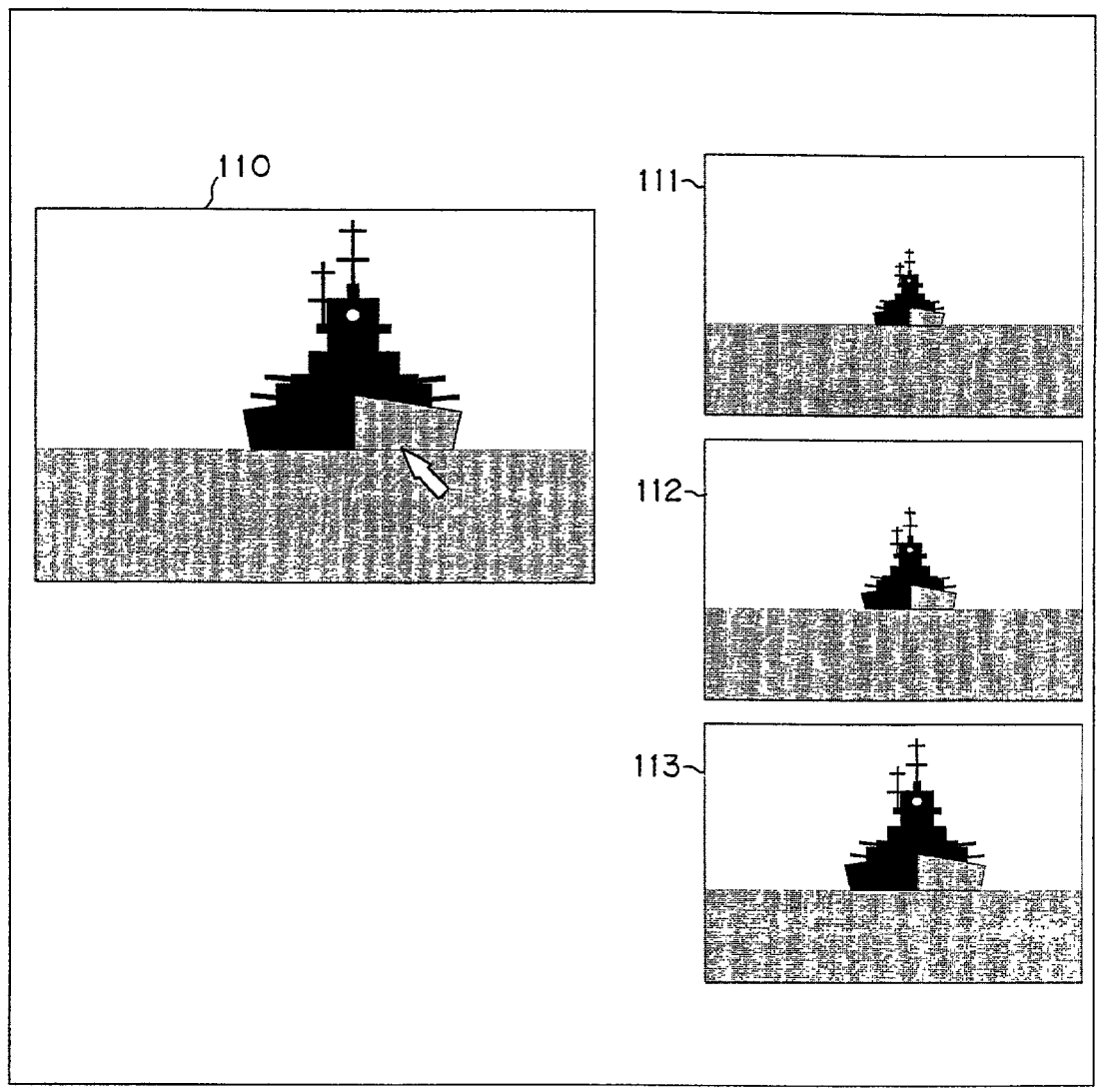
FIG. 22 shows an example of enlarging/reducing an image element.

FIG. 22 shows an example of enlarging/reducing image elements. In FIG. 22, an image 110 is an original image. Images 111 through 113 are images obtained by sequentially enlarging the image element (a ship in this example) in the image 110. In this example, the image 111 is an initial image, the image 112 is an intermediate image, and the image 113 is an end image. In this case, by continuously displaying the images 111 through 113, the moving picture of a coming ship can be obtained. When the image elements are sequentially reduced, the moving picture of leaving ship can be obtained by continuously displaying them.

Figure 23:
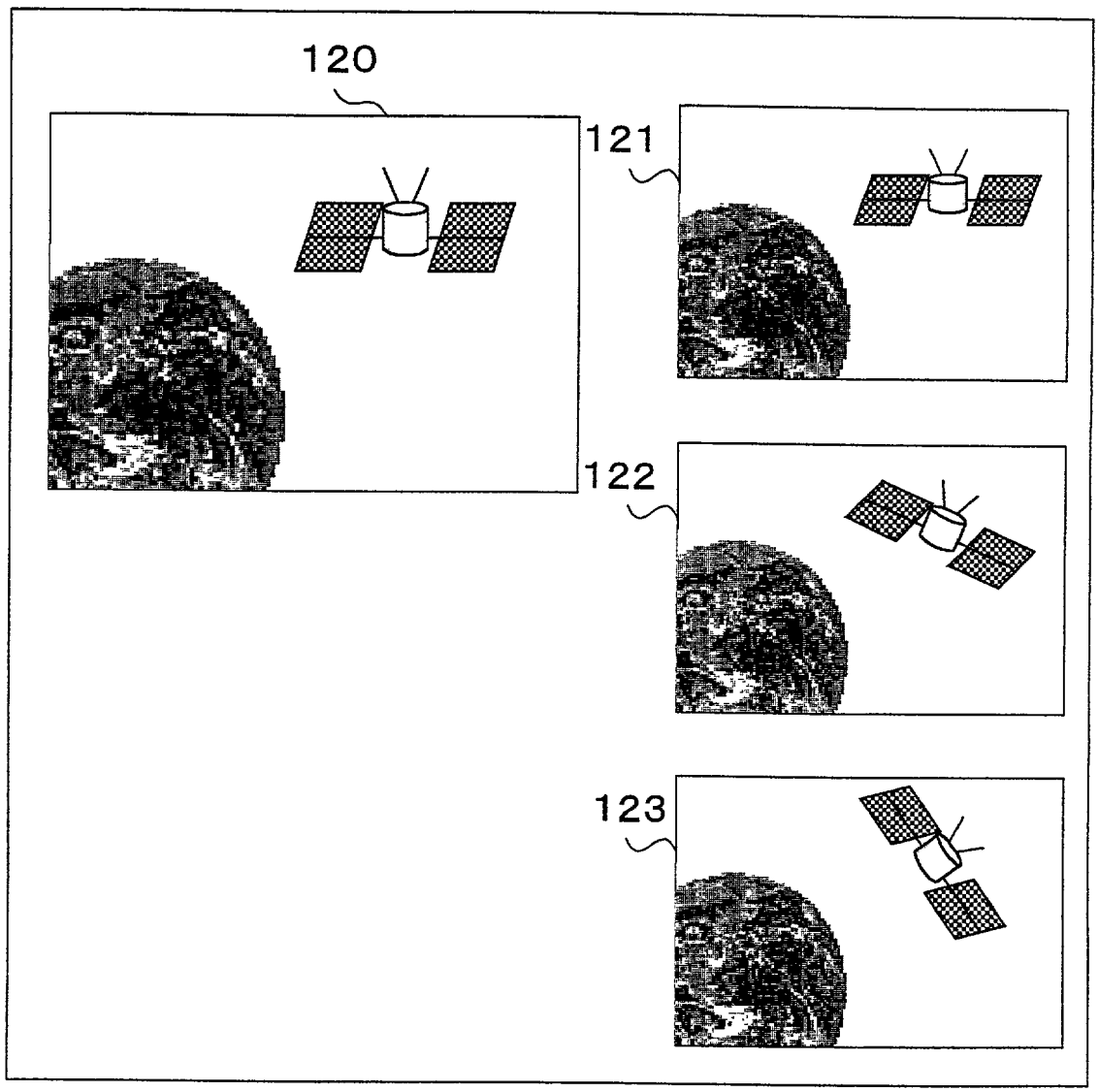
FIG. 23 shows an example of rotating an image element.

FIG. 23 shows an example of rotating image elements. In FIG. 23, an image 120 is an original image. Images 121 through 123 are images obtained by sequentially changing the angle of the image element (a satellite in this example) in the image 120. In this example, the image 121 is an initial image, the image 122 is an intermediate image, and the image 123 is an end image. In this case, by continuously displaying the images 121 through 123, the moving picture of a rotating satellite can be obtained.

In the image generation system according to the present embodiment, the image generation terminal device 20 is requested to generate the above mentioned moving picture. That is, the image distribution device 10 divides an original image into a plurality of image sections and transmits each of them to a corresponding image generation terminal device 20, and gives instructions to each image generation terminal device 20 to generate an image. Described below is an instruction to generate an image.

FIG. 24 shows an example of the data format of the time series information. The time series information is basic information for generation of moving picture by the image generation terminal device 20, and comprises an image ID, a time series number, the number of frames in a unit time, a time interval, a starting time, and an end time.

The "image ID" inherits the value set in the image identifier shown in FIG. 17A. The "time series number" is an identification number assigned to a divided image specified by the image division unit 11 of the image distribution device 10. When the image generation unit 13 of the image distribution device 10 receives a divided image from each image generation terminal device 20, it generates the entire image by integrating the divided images on a time axis according to the time series numbers.

The "number of frames in a unit time" indicates the number of images (frames) to be displayed in a second. The "time interval" indicates the interval at which each image (each frame) forming part of moving picture is to be displayed. The "starting time" and "end time" indicates starting time and end time of the moving picture, respectively. Relating to the time interval, the starting time, and end time, when two values of the three values are set, the remaining value is automatically computed and set.

Figure 25:
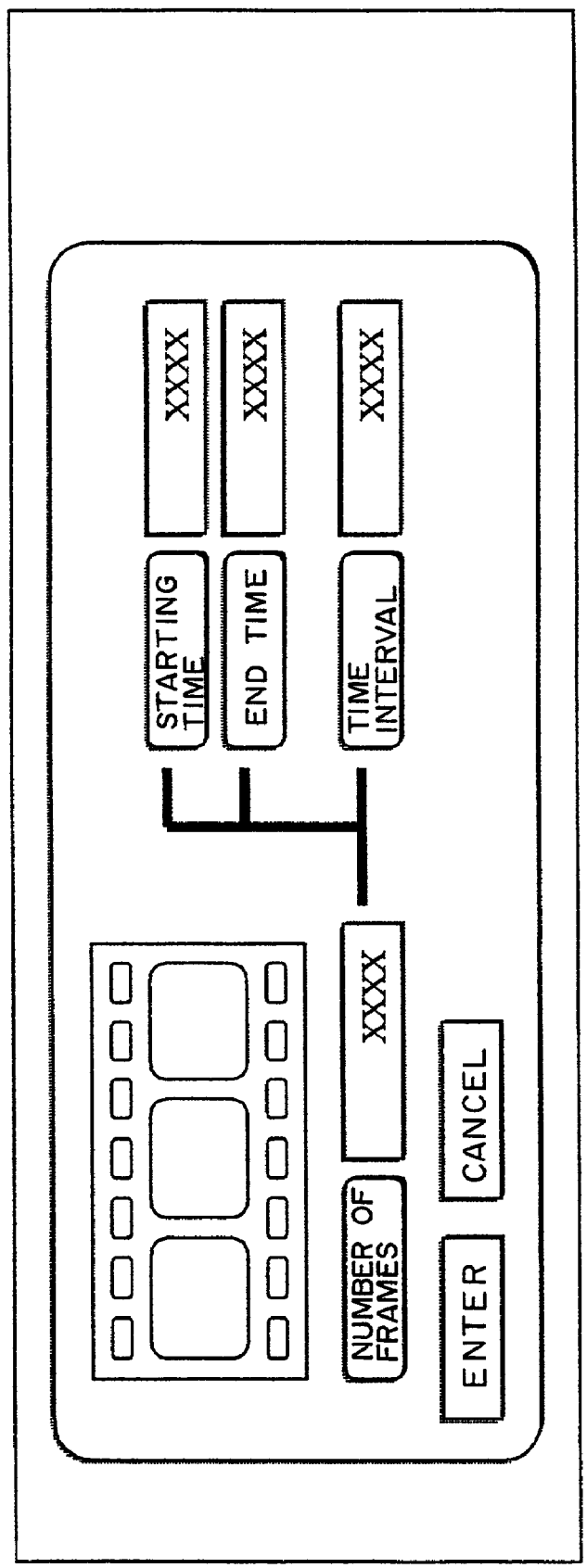
FIG. 25 shows an example of displaying a screen for setting time-series information.

FIG. 25 shows an example of displaying the screen for setting the above mentioned time series information. On this screen, a box for setting the total number of frames, the time interval, the starting time, and the end time is displayed. In this example, the "total number of frames" is the total number of frames forming part of moving picture. A user can input a desired value using a keyboard, etc. The above mentioned four parameters are complemented by one another. Therefore, when three values in the four values are set, the remaining one value is automatically computed. For example, if "0.05 second" is set as a time interval, and the difference between the starting and end time is "3 seconds", the total number of frames of "60" is computed.

The time series information can also be used as the information for division of the moving picture to be generated on a time axis. For example, when two image generation terminal devices are requested to generate the moving picture for 10 seconds, one image generation terminal device can be requested to generate the images for the first 5 seconds, and the other image generation terminal device can be requested to generate the images for the second 5 seconds. The process can be realized by, for example, adding information for specification of an image generation terminal device to the time series information, and appropriately setting the "starting time" and the "end time".

FIG. 26 shows an example of the data format of image movement information. The image movement information defines the movement of image elements, and comprises an image ID, the name of movement target, a group name, basic movement information, enlargement/reduction information, and rotation information.

The "image ID" inherits the value set in the image identifier shown in FIG. 17A. The "name of movement target" identifies the image element to be moved. In the example shown in FIGS. 21 through 23, information identifying an "airplane", a "ship", and a "satellite" is set for the name of movement target. The "group name" identifies a plurality of image elements when the plurality of image elements are moved based on the same rules. For example, when a plurality of airplanes are flying in the same direction at the same speed in the moving picture, one group name is assigned to the plurality of airplanes.

The "basic movement information" is necessarily set when the movement of an image element is defined, and comprises starting point coordinates, end point coordinates, the number of frames in a unit time, a time interval, a starting time, and an end time.

The "starting point information" and the "end point information" are the coordinates of the starting position and the arrival position of image elements. The number of frames in a unit time, the time interval, the starting time, and the end time can inherit the values set for the time series information, or can be otherwise set.

The "enlargement/reduction information" defines the speed of enlarging or reducing an image element, and comprises an enlargement/reduction flag, an enlargement/reduction base point, an initial enlargement/reduction rate, an enlargement/reduction rate change, and a starting point magnification.

The "enlargement/reduction flag" is set when a target image element is to be enlarged or reduced. When the flag is invalid, the enlargement/reduction information is not used when an image is generated. When a target image element is enlarged or reduced, the "enlargement/reduction base point" indicates the coordinates of the position of the basic point. That is, an image element is enlarged or reduced at the base point coordinates. The "initial enlargement/reduction rate" indicates the speed of enlargement/reduction. The "enlargement/reduction rate change" is set when the speed of enlargement/reduction changes with the lapse of time. That is, it is not set when the speed of enlargement/reduction is constant. When the change of the speed of enlargement/reduction is indicated by a specific function, a function corresponding as an enlargement/reduction changed rate is set. The "starting point magnification" indicates the ratio of the image element at the starting point of the moving picture to the original image. For example, when the image element of the original image is used as is, it is set to "1". When the size of the image element at the starting point of the moving picture is ½ of the corresponding image element in the original element (its area is ¼ of the image element in the original element), the magnification at the starting point is set to "0.5".

The "rotation information" defines the rotation of an image element, and comprises a rotation flag, a rotation center, an initial rotation angle, a rotation angle change, and a starting point angle.

The "rotation flag" is set when a target image element is rotated. If the flag is invalid, the rotation information is not used when an image is generated. The "rotation center" indicates the coordinates of the center of the rotation. That is, the image element rotates on the coordinates. The "initial rotation angle" indicates the rotation speed. The "rotation angle change" is set when the rotation speed changes with the lapse of time. That is, it is not set when the rotation speed is constant. When the change of the rotation speed is expressed by a specific function, the function corresponding as a rotation angle change is set. The "starting point angle" indicates the angle of the image element at the start of moving picture.

Figure 27:
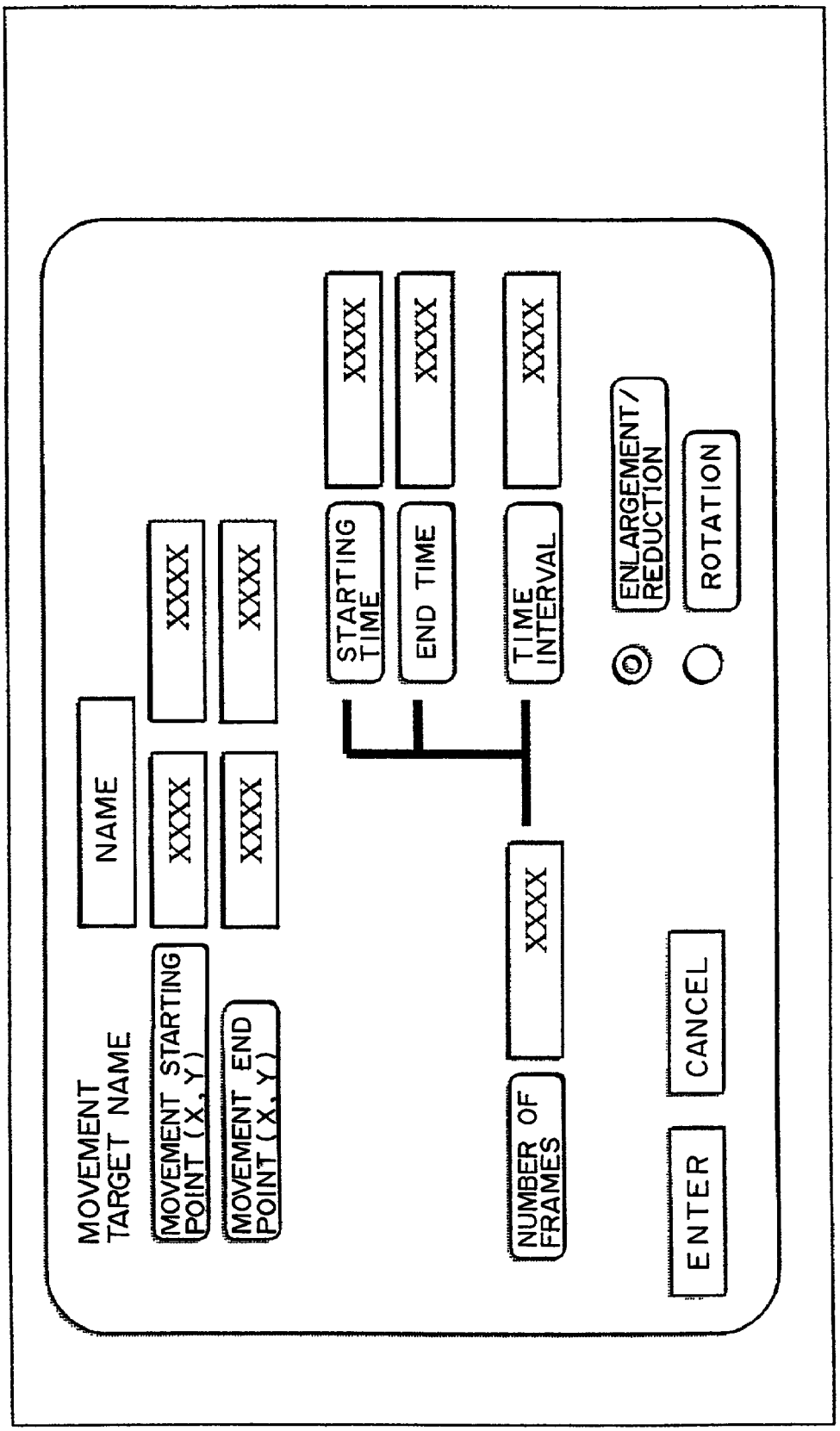
FIG. 27 shows an example of displaying a screen for setting image movement information.

FIG. 27 is an example of displaying the screen for setting the image movement information (excluding the enlargement/reduction information and rotation information). On the screen, an area for input of the name of a movement target, and an area for input of the coordinates of the starting and end points are provided. A character string is input by the user using a keyboard to set the name of a movement target. However, when nothing is input by the user, the system assigns an unused identification number. The coordinates of the starting and end points can be set by the coordinates specified on the screen using a mouse, etc., or can be set by the values input using a keyboard, etc. For the number of frames, the starting time, the end time, and the time interval, refer to the explanation above described by referring to FIG. 25.

The enlargement/reduction button invokes the screen for setting the information for enlargement/reduction of a target image element. On the other hand, the rotation button invokes the screen for setting the information for rotation of a target image element. When the enlargement/reduction button and the rotation button are clicked, the enlargement/reduction and the rotation flag shown in FIG. 26 are valid.

Figure 28:
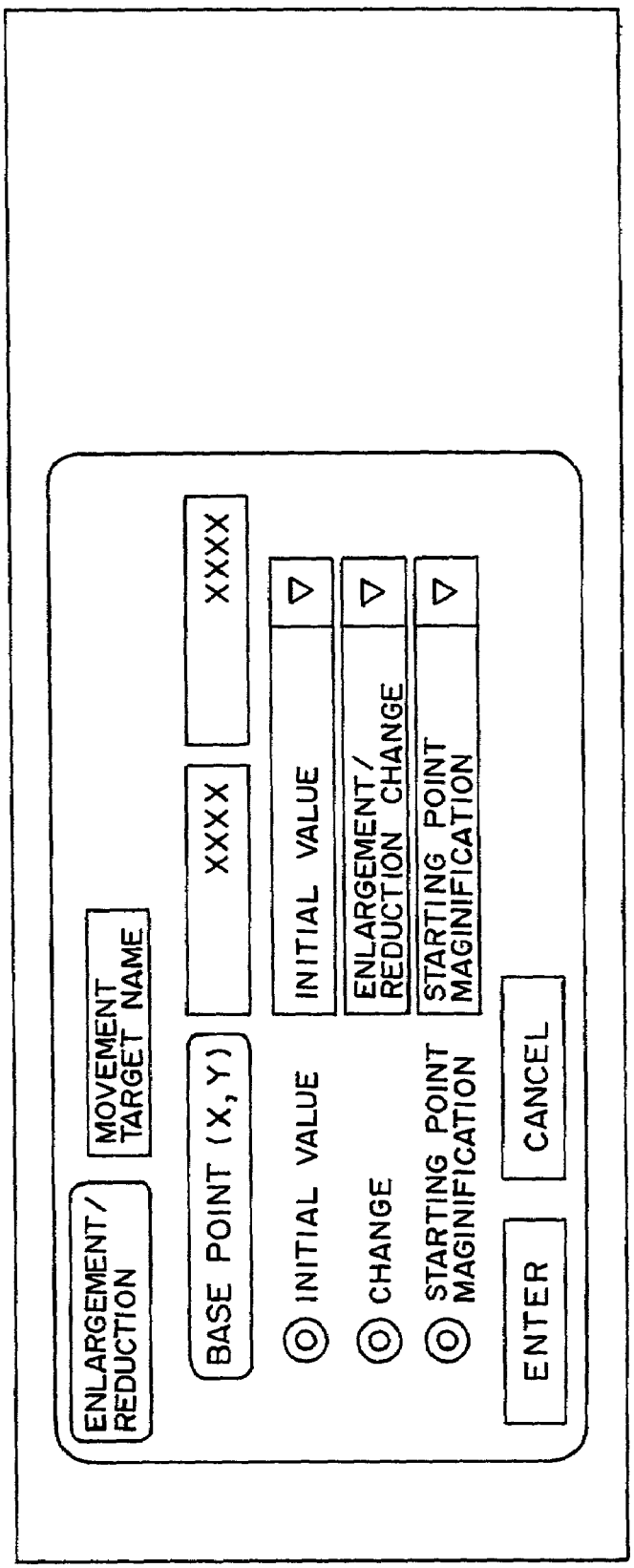
FIG. 28 shows an example of displaying a screen for setting enlargement/reduction information.

FIG. 28 shows an example of displaying the screen for setting the enlargement/reduction information. On this screen, areas are provided for setting the base point, the initial enlargement/reduction rate, the enlargement/reduction change, and the starting point magnification. These values can be input one by one using a keyboard, or can be selected from among the predetermined values.

Figure 29:
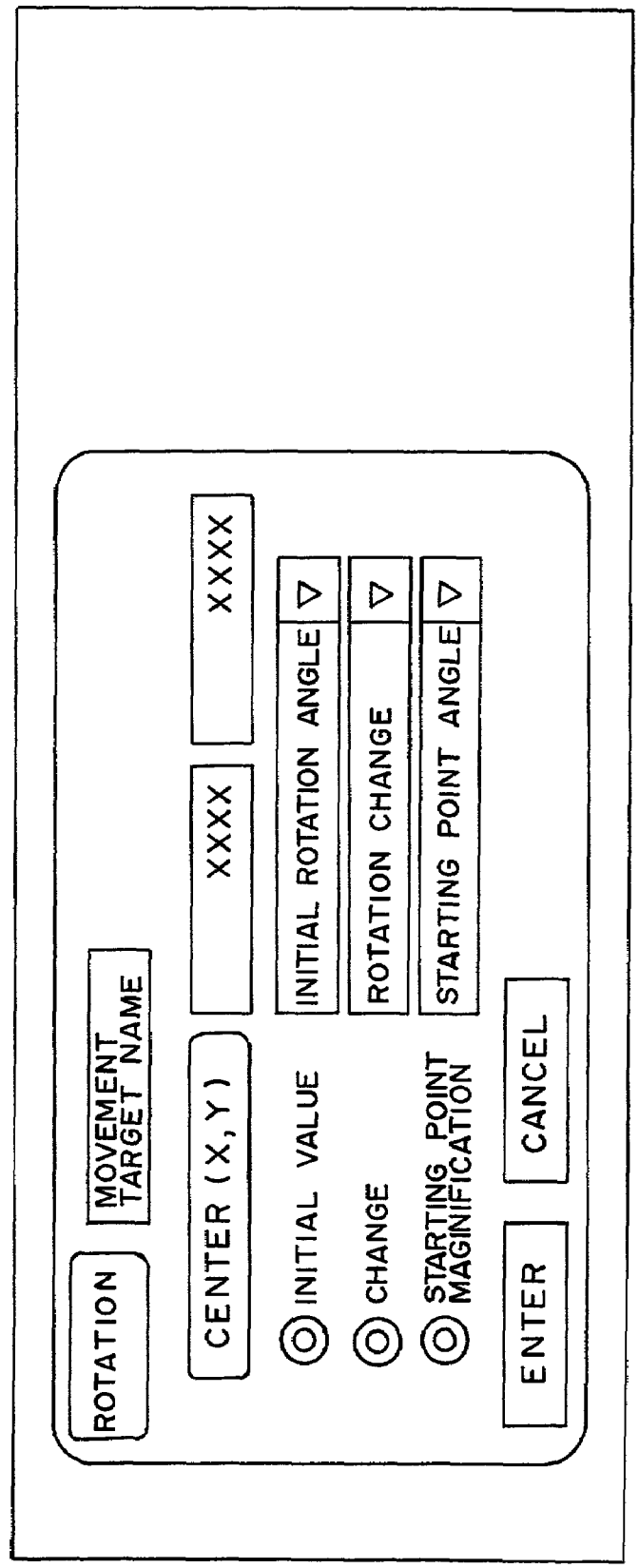
FIG. 29 shows an example of displaying a screen for setting rotation information.

FIG. 29 shows an example of displaying the screen for setting the rotation information. On this screen, areas are provided for setting the rotation center, the initial rotation angle, the rotation angle change, and the starting point angle. These values can be input one by one using a keyboard, or can be selected from among the predetermined values.

As described above, the basic movement information is required information, but the enlargement/reduction information and the rotation information are arbitrarily set. When only the basic movement information is set, parallel movement is defined. However, when the starting point coordinates match the end point coordinates, the position of the target image element is not changed. On the other hand, according to both basic movement information and enlargement/reduction information, a moving picture in which a target image element is moved with approaching or leaving can be defined. Additionally, according to both basic movement information and rotation information, a moving picture in which a target image element is moved with rotation can be defined.

According to the image generation system of the present embodiment, the image distribution device 10 transmits a divided image and the generation instruction information related to the divided image to the corresponding image generation terminal device 20. In this example, the generation instruction information contains identifiers shown in FIG. 17, the time series information shown in FIG. 24, and the image movement information shown in FIG. 26. If the original image is formed in a single layer, no layer identifier is generated. If an image to be generated is a still image, no time series information or image movement information are generated.

The image distribution device 10 transmits only the divided images requiring an editing operation in a plurality of divided images obtained by dividing an original image to a corresponding image generation terminal device 20. For example, when a couple of bride and bridegroom moves in the image shown in FIG. 10, and an image is divided into three areas as shown in FIG. 9, only an image of the area containing the couple of bride and bridegroom is transmitted to a corresponding image generation terminal device 20. When an image is divided into three layers as shown in FIGS. 11 through 13, only an image (shown in FIG. 11) containing the couple of bride and bridegroom is transmitted to the corresponding image generation terminal device 20.

When the image generation terminal device 20 receives a divided image and a generation instruction information from the image distribution device 10, an image corresponding to the divided image received is generated according to the generation instruction information. For example, upon receipt of the image 100 shown in FIG. 21 and the information for parallel movement of the image element (an airplane for example) in the image 100, the image generation terminal device 20 automatically generates the images 101 through 103 according to the information. At this time, the number of frames of moving picture to be generated, the positions of the starting and end points of an image element, the movement speed of an image element, etc. depend on the time series information and the image movement information. In addition, upon receipt of the image 110 shown in FIG. 22 and the information for enlargement of the image element (a ship in this example) in the image 110, the images 111 through 113 are automatically generated according to the information. Furthermore, upon receipt of the image 120 shown in FIG. 23 and the information for rotation of the image element (a satellite in this example) in the image 120, the images 121 through 123 are automatically generated according to the information.

Upon receipt of a request from the image distribution device 10 or in each of the predetermined periods, each image generation terminal device 20 transmits the divided image being generated to the image distribution device 10, despite of whether the image generation process is completed. That is, the image generation terminal device 20 transmits a divided image being generated or a divided image completely generated to the image distribution device 10. At this time, the image generation terminal device 20 generates the transmission information shown in FIG. 30, and transmits the transmission information together with the generated divided image to the image distribution device 10. When the divided image is transmitted from the image generation terminal device 20 to the image distribution device 10, at least the identifiers shown in FIG. 17 are attached to the divided image.

The "end flag" indicates whether or not the image generating process performed by the image generation terminal device 20 has been completed. If the flag indicates the completion of the process, each of the end flags shown in FIGS. 17B and 17C is set to a value indicating the completion.

When a divided image is transmitted from the image generation terminal device 20 to the image distribution device 10, the "difference flag" indicates whether or not the generated image is to be transmitted as is, or only the difference from the previously transmitted image is to be transmitted.

Upon receipt of a divided image, an image identifier, transmission information, etc., the image distribution device 10 integrates a plurality of received divided images according to the image identifiers and the transmission information, etc. about them. At this time, when a difference flag is set for a divided image, a necessary divided image is regenerated by adding the divided image received this time to the divided image received previously. When a divided image in a certain area is not received, the corresponding divided image received previously is used.

The entire image integrated by the image distribution device 10 is distributed to each image generation terminal device 20. The entire image is a complete image when all image generation terminal devices 20 have completed the image generating process. However, if one or more image generation terminal devices 20 have not completed the process, then the entire image is incomplete, and the distributed entire image is displayed on the image generation terminal device 20. Therefore, the user of the image generation terminal device 20 can continue generating a divided image assigned to the user while viewing the entire image. At this time, since the displayed entire image reflects the contents updated by another image generation terminal device 20, the efficiency of an operation can be improved.

Figure 31:
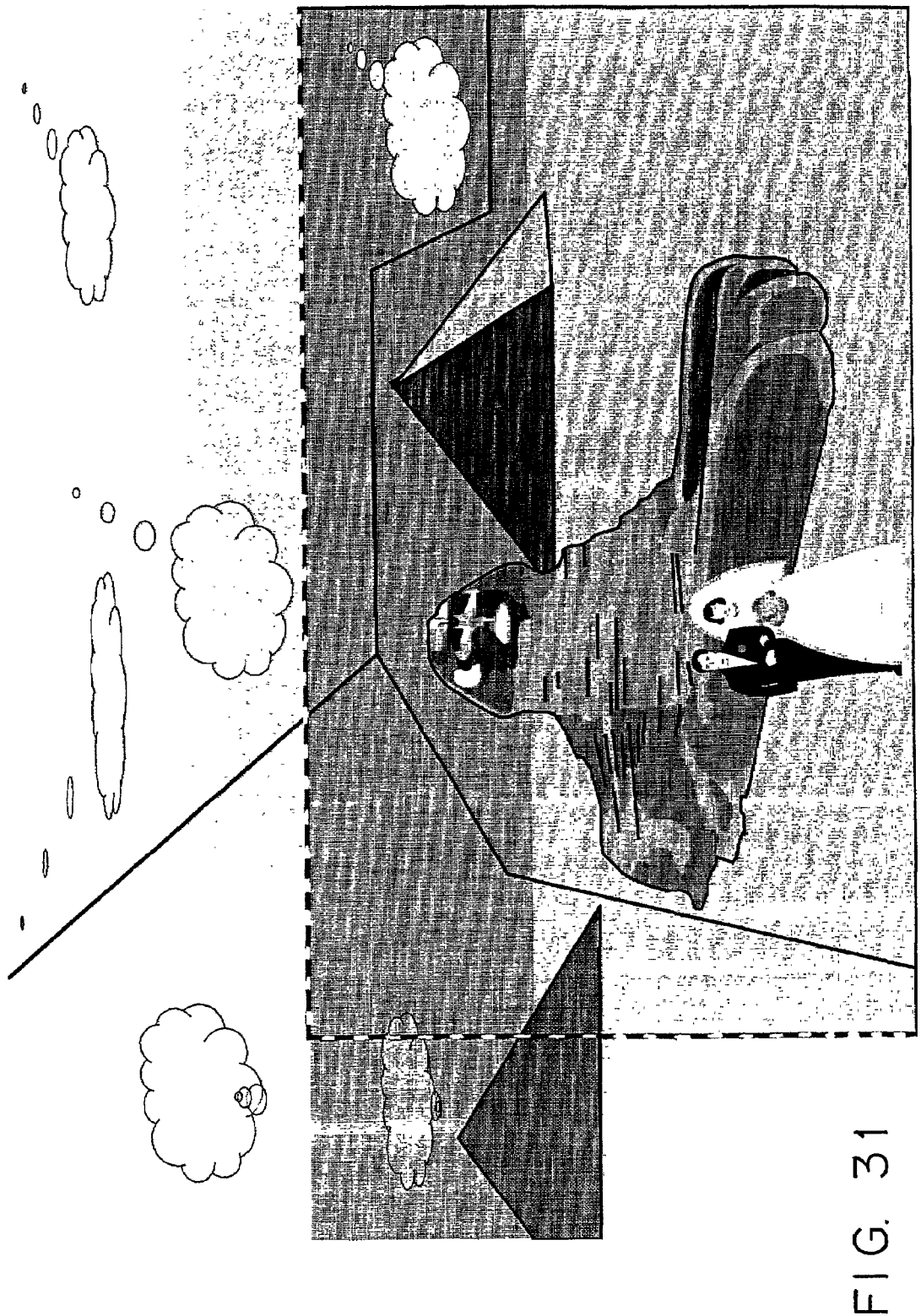
FIG. 31 shows an example (1) of the process of generating a divided image by referring to the entire image.
Figure 32:
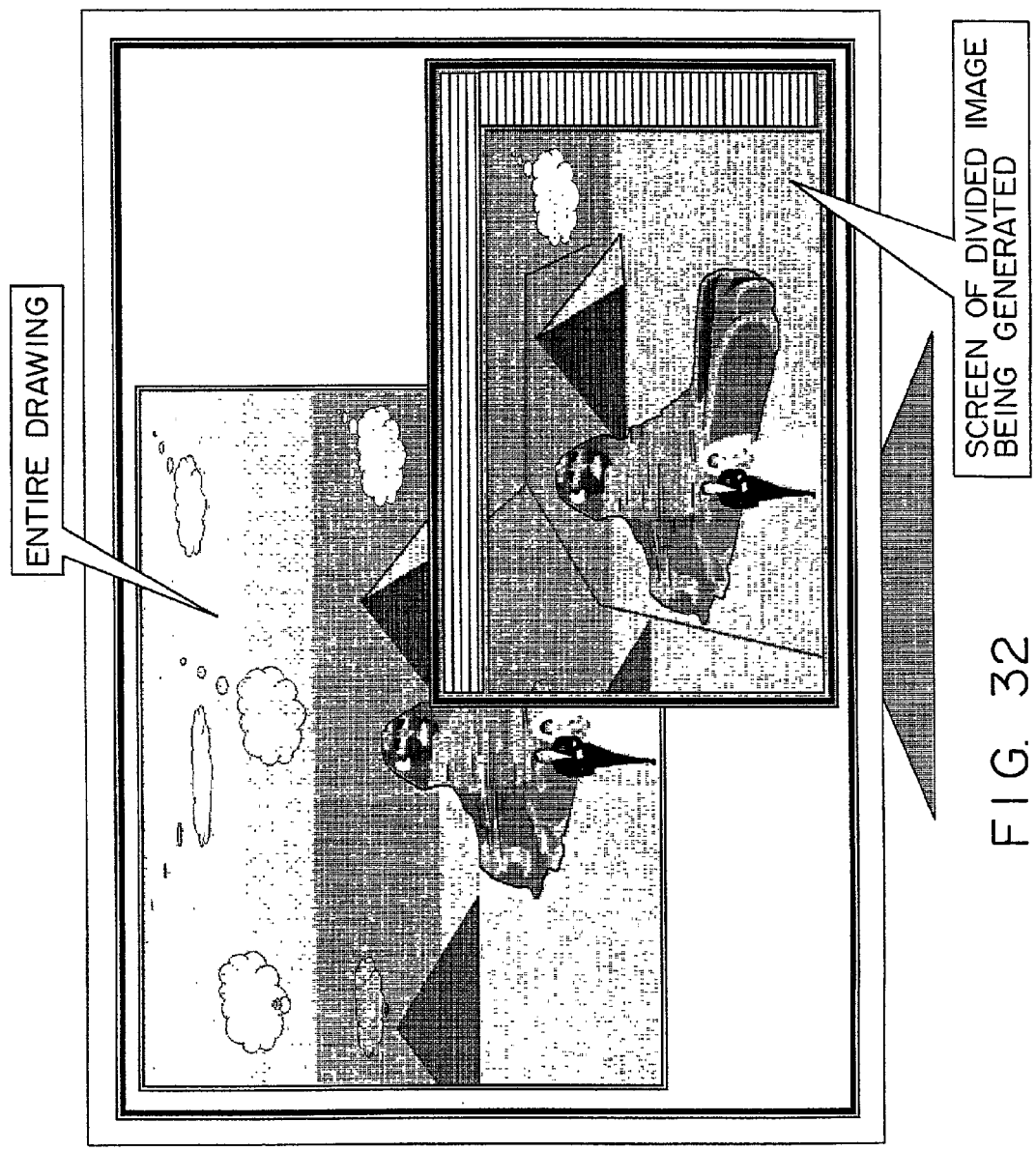
FIG. 32 shows an example (2) of the process of generating a divided image by referring to the entire image.
Figure 33:
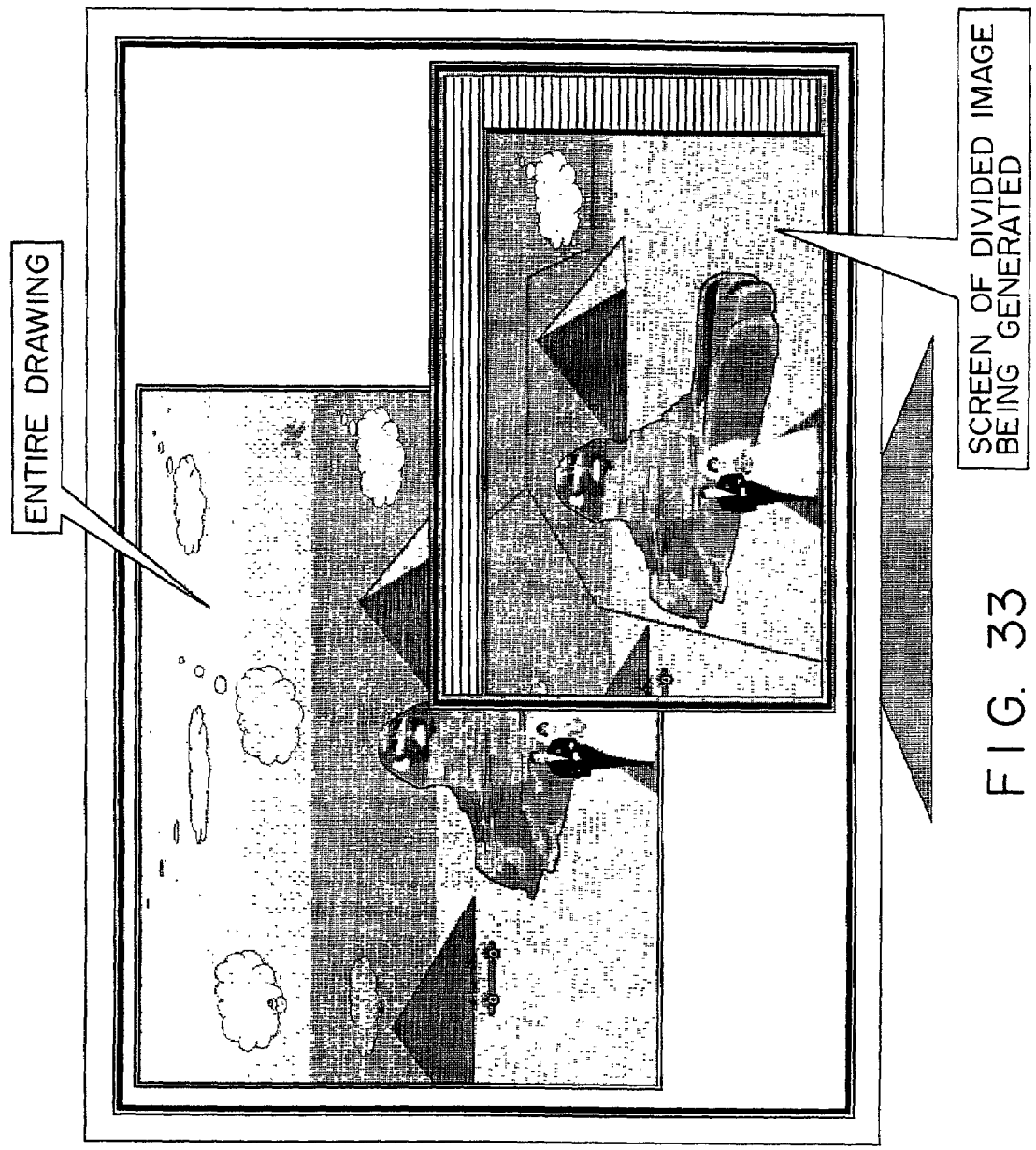
FIG. 33 shows an example (3) of the process of generating a divided image by referring to the entire image.

FIGS. 31 through 33 show examples of the process of generating a divided image by the image generation terminal device 20 by referring to the entire image. As shown in FIG. 31, the original image is divided into three areas, and distributed to the corresponding image generation terminal devices 20. In this example, the image distribution device 10 transmits a corresponding divided image to each image generation terminal device 20, and also transmits the entire image thereto.

FIG. 32 shows an example of displaying an image on the image generation terminal device 20 assigned one of a plurality of divided images. In this example, an edition screen is displayed at the lower right of the display area, and the entire image is displayed on the upper left of the display area. On the edition screen, not only the divided image to be edited by this image generation terminal device, but also the image of the area adjacent to the divided image to be edited is displayed together.

FIG. 33 shows an example of displaying the image being edited. In this example, a "carpet" for a couple of bride and bridegroom to walk on is added in the image generation terminal device. In another image generation terminal device, an "airplane" is added. In a further image generation terminal device, it is assumed that a "car" is added. Then, the divided images edited in the respective image generation terminal devices are integrated by the image distribution device 10, and the integration result is distributed to each image generation terminal device 20. As a result, the entire image to which the "carpet", the "airplane", and the "car" are added is displayed on each image generation terminal device 20. Therefore, the user of each image generation terminal device can edit an assigned divided image while recognizing the process of an operation being performed by another image generation terminal device, thereby improving the efficiency of the editing operation and generating an image with the entire image taken into account.

Described below is the consistency of the divided image generated by a plurality of image generation terminal devices 20. In this example, it is assumed that an image element is divided and displayed in the adjacent divided images. The checking function can be provided in the image distribution device 10, and can be provided in each image generation terminal device 20. In this example, it is assumed that the function is provided in the image distribution device 10.

Figure 34:
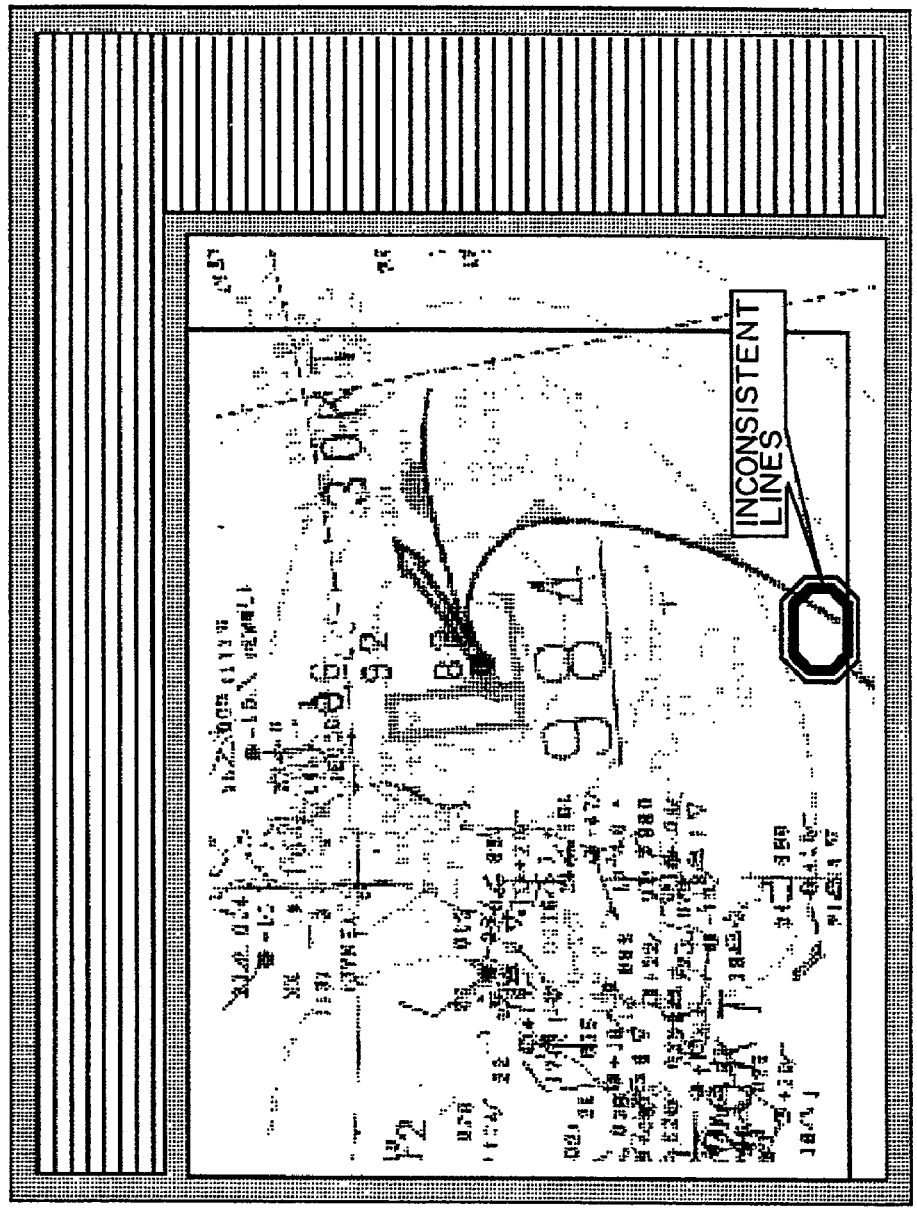
FIG. 34 shows the function of checking the consistency among divided images.

Since a plurality of divided images are individually edited in the corresponding image generation terminal device 20 in the system according to the present embodiment, there can be the possibility that the continuity in the image elements can be lost when the divided images are integrated. Therefore, the image distribution device 10 notifies the image generation terminal device 20 of an alarm when the discrepancy in the display position of an image element exceeds an allowable scope. The alarm can be realized at a corresponding image generation terminal device 20 using, for example, image display, sound (including a voice guidance), vibration, etc. In the example shown in FIG. 34, in the operation of drawing a weather map, the positions of the cold fronts drawn in adjacent divided images are shifted from each other, and an alarm is displayed on the screen. The user of the image generation terminal device 20 which has received the alarm can amend the image according to the alarm.

The above mentioned function can be easily realized in an image whose image element has an attribute. The image whose image element has an attribute is, for example, a vector image.

Thus, the inconsistency between adjacent divided images can be quickly amended by detecting it during the generation of divided images. As a result, a successful and complete image can be generated.

The above mentioned alarm function can also be provided when moving picture (continuous images formed by a plurality of frames on a time axis) is generated. For example, when continuous images showing the change of weather in the past 24 hours are generated, the continuity of the image elements (a front, an isobar, etc.) at each timing generated by each image generation terminal device 20 is checked, and an alarm is raised when the discontinuity is detected. In this case, the image generation terminal device 20 transmits each type of identifier and the time series information to the image distribution device 10 together with a generated divided image. The image distribution device 10 integrates images for each timing according to the time series information, and determines whether or not the alarm is to be raised.

In a case where the function of checking the consistency is provided in the image generation terminal device 20, it is necessary for the image distribution device 10 to transmit an image in the area adjacent to the divided image, when a divided image is transmitted to each image generation terminal device 20.

If the user of the image generation terminal device 20 can see a reference image (reference drawing, predicted complete drawing, sample, etc.) when the user generates a divided image assigned to the user, then a more correct image can be generated. The method of displaying a reference image on the image generation terminal device 20 is described below by referring to FIG. 35.

Figure 35:
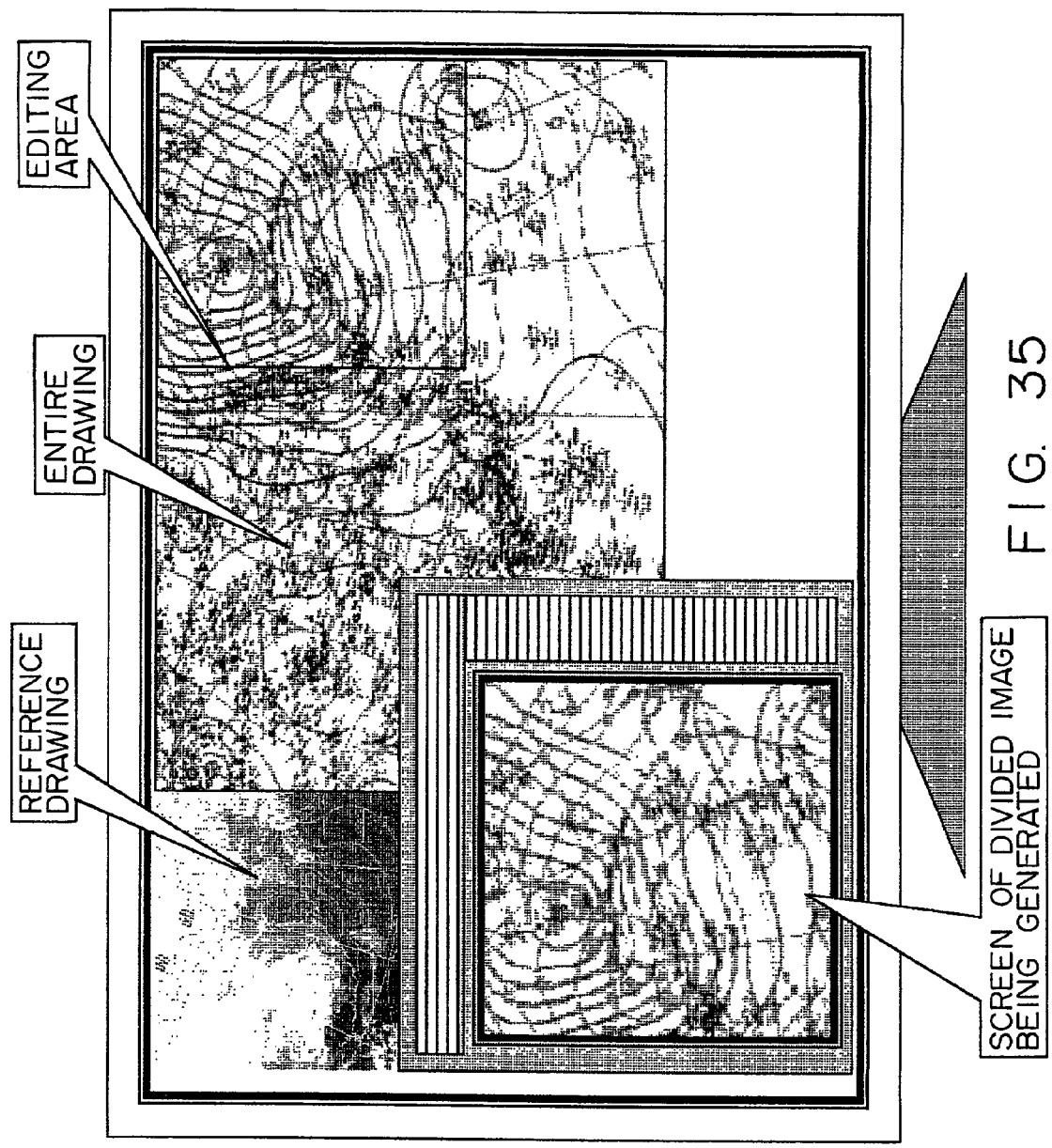
FIG. 35 shows an example of displaying a reference image on the image generation terminal device.

FIG. 35 shows an example of displaying a reference image on the image generation terminal device 20. In this example, a weather map is generated. On this screen, the screen for generation/edition of a divided image assigned to the image generation terminal device 20, the entire drawing and a reference image are displayed. The divided image displayed on the generation/edition screen is a part of an image displayed as an entire drawing. In this example, the image in the rectangular area at the upper right corner is assigned to the image generation terminal device 20.

The entire drawing is an entire image containing the divided images respectively assigned to the corresponding image generation terminal devices 20. The reference drawing is an effective image when a divided image is generated by the image generation terminal device 20. In this example, an image captured from a satellite is displayed. In addition to the entire drawing or the reference drawing, for example, a predicted complete image can be displayed.

Thus, in the method of the present embodiment, when the user of the image generation terminal device 20 generates a divided image assigned to the user, he or she can refer to the reference image, and therefore can generate a more correct image. In addition, the reference image is not only displayed, but can be superposed on a divided image being generated.

The above mentioned reference image is distributed from the image distribution device 10 to the image generation terminal device 20. When the image generation terminal device 20 receives the reference image, etc., it can select whether or not the received image is to be displayed.

The operations of the image distribution device 10 and the image generation terminal device 20 are described below by referring to a flowchart. The processes of the image distribution device 10 and the image generation terminal device 20 are started by the user activating an image generation program.

Figure 36:
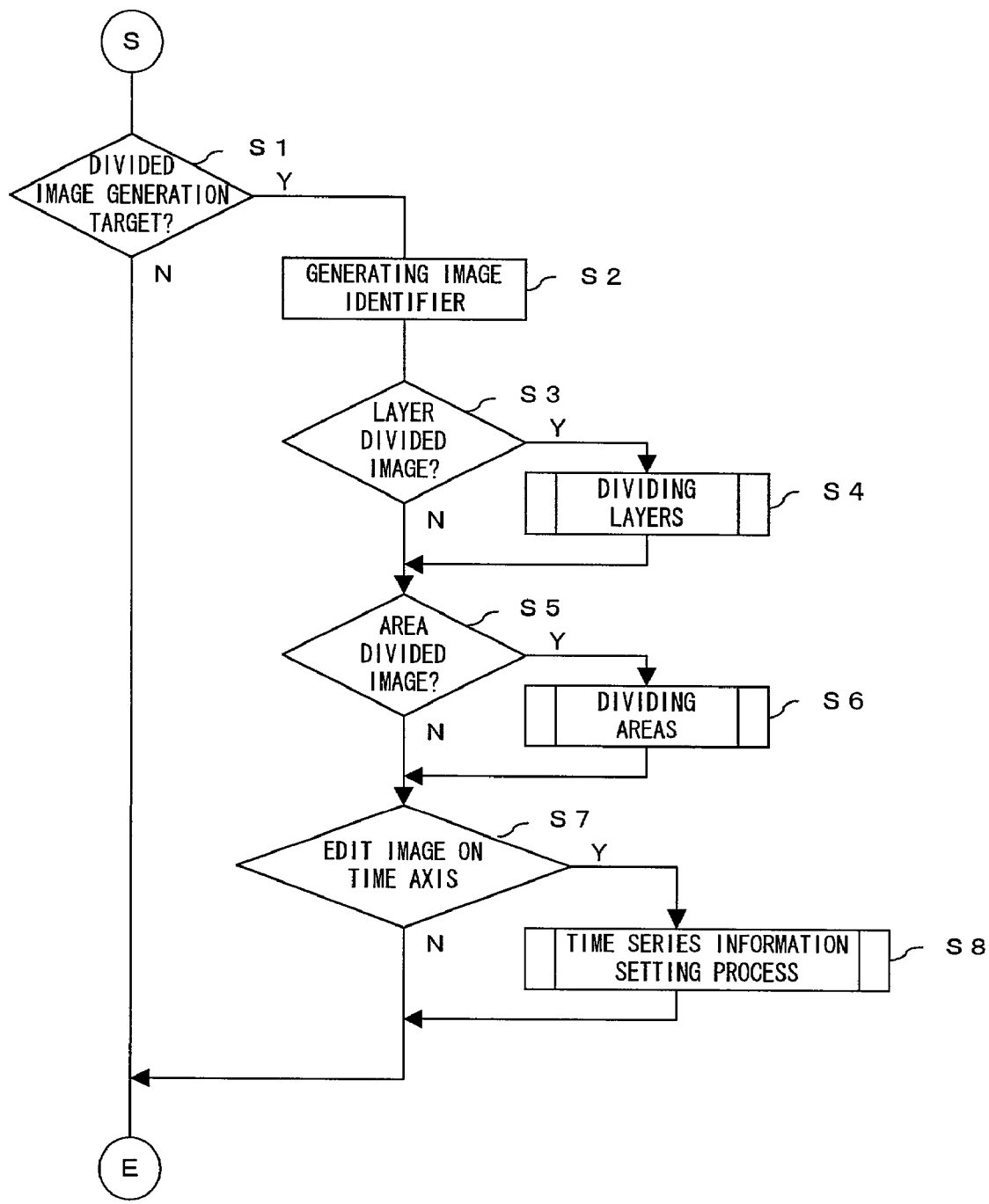
FIG. 36 is a flowchart of the operation of the image dividing unit.

FIG. 36 is a flowchart of the operations of the image division unit 11 provided in the image distribution device 10. This process is performed when an original image to be divided and distributed to the corresponding image generation terminal devices 20 is given.

In step S1, it is determined whether or not the given image is to be divided. If it is an image to be divided, the processes in and after step S2 are performed. The image is hereinafter referred to as an 'original image'.

In step S2, the image identifier shown in FIG. 17A is generated for the original image. At this stage, an image ID, the name of the image, and the type of image are set. As the image ID, an identification number not used by the other images is assigned. The name of the image is a user-specified name. Furthermore, the type of image is detected by analyzing the given original image.

In step S3, it is checked whether or not the original image is formed by a plurality of layers. When the original image is formed by a plurality of layers, a layer dividing process is performed in step S4. Then, in step S5, it is checked whether or not an instruction to divide the original image into a plurality of areas has been issued. When such an instruction has been issued, an area dividing process is performed in step S6. Furthermore, in step S7, it is checked whether or not an instruction to edit the original image on a time axis has been issued. If yes, the corresponding process is performed in step S8. The processes in steps S4, S6, and S8 are described below in detail.

Thus, the image division unit 11 generates the identifiers corresponding to each divided image obtained by dividing the original image at an instruction of the user, and generates time series information as necessary.

Figure 37:
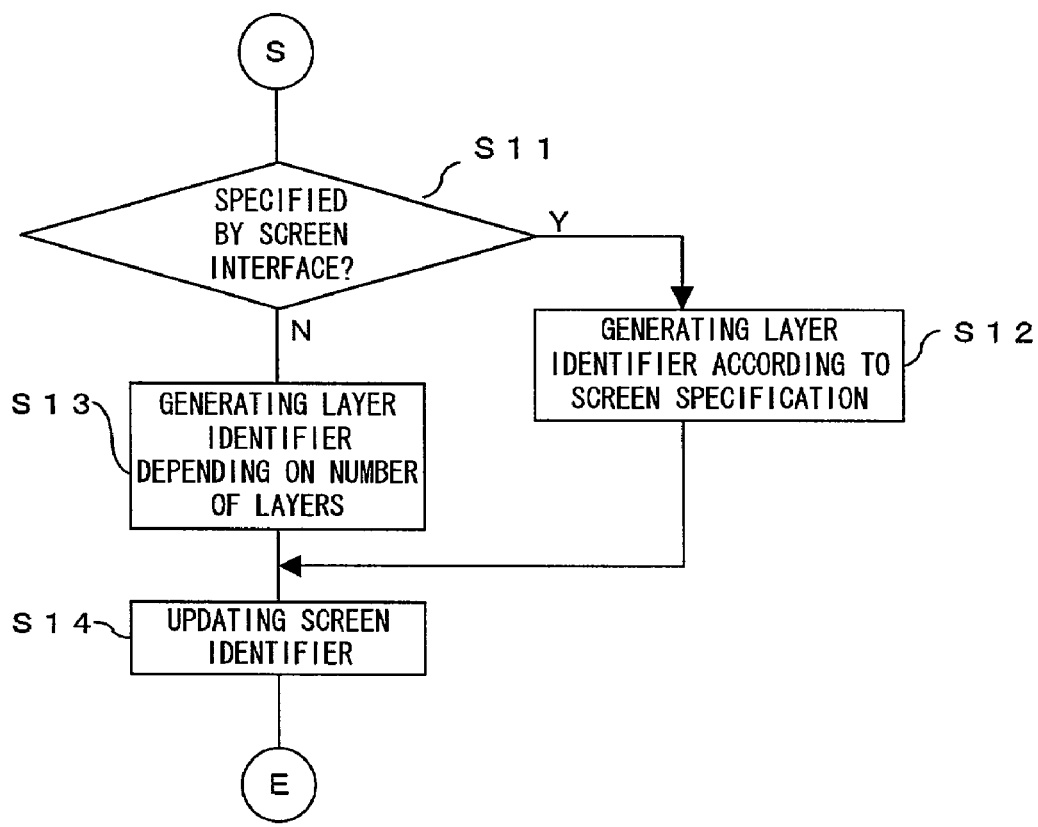
FIG. 37 is a flowchart of the process of dividing an image into layers.

FIG. 37 is a flowchart of the layer dividing process performed by the image division unit 11. This process corresponds to the process in step S4 shown in FIG. 36.

In step S11, it is checked whether or not the user of the image distribution device 10 has issued an instruction to divide an original image into layers through a screen interface. The screen interface is shown in FIG. 20.

When a user instruction is assigned, a layer identifier shown in FIG. 17C is generated at the instruction in step S12. For example, when the user inputs an instruction to edit only a part of a plurality of layers, the image division unit 11 sets a generation target flag only for the specified layer. The image division unit 11 sets the user-specified image generation terminal device 20 as the name of an assigned machine.

If a user instruction has not been issued, the layer identifier shown in FIG. 17C is generated according to default information in step S13. In this case, basically, generation target flags are set for all layers. That is, the number of layer identifiers equal to the number of layers forming the original image are generated.

In step S14, in the processes in step S12 or S13, an image identifier is updated. Practically, the number of layers is set. The number of layers can be the number of the layers forming an original image or can be the number of layers on which generation target flag is set.

Thus, the image division unit 11 generates a layer identifier according to a user instruction or default information, and updates the image identifier.

Figure 38:
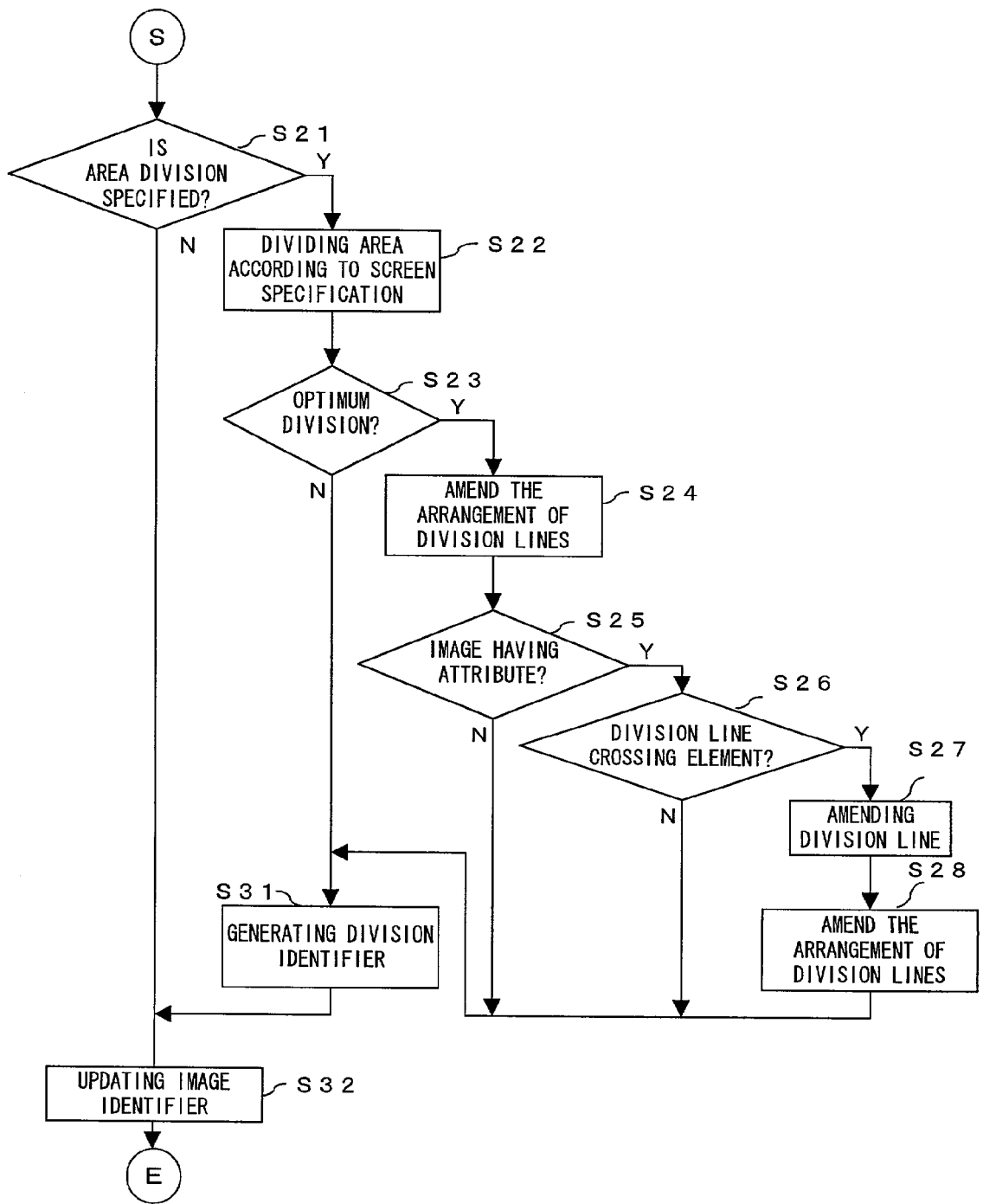
FIG. 38 is a flowchart of the process of dividing an image into areas.

FIG. 38 is a flowchart of the area dividing process performed by the image division unit 11. This process corresponds to step S6 shown in FIG. 36.

In step S21, it is checked whether or not an area division instruction has been issued by the user. The user can input an area division instruction by drawing a division line on an original image using a mouse, or inputting the coordinates using a setting screen shown in FIG. 19. If an area division instruction has been issued, an image is divided based on the instruction from the user in step S22. For example, in the case of a bit map image, bit map data is presented for each of the divided areas.

In step S23, it is checked whether or not the process of optimizing image division is set. It is assumed that the setting is predetermined by the user. When the optimizing process is not performed, the division identifier shown in FIG. 17B is generated. On the other hand, when the optimizing process is performed, the processes in and after step S24 are performed.

In step S24, the arrangement of division lines are amended such that the sum of the division lines for dividing the original image can be the shortest possible. Then, in step S25, it is checked whether or not the image element of the original image has an attribute. An image whose image element has an attribute can be a vector image. When an image element of the original image has an attribute, the processes in and after step S26 is performed. Otherwise, the process in step S31 is performed.

In step S26, it is checked whether or not the division line crosses an image element. In the example shown in FIG. 8, the division line crosses the sphinx. When the division line crosses the image element, the processes of steps S27 and S28 are performed. Otherwise, the process in step S31 is performed.

In step S27, the division line is amended such that the division line cannot cross an image element. In the example shown in FIG. 9, the division line does not cross an image element (a couple of bride and bridegroom, a sphinx, a pyramid, cloud, etc.). In step S28, the arrangement of the division lines are amended such that the sum of the length of the division lines can be the shortest possible.

In step S31, the division identifier shown in FIG. 17B is generated. This division identifier is generated for each of a plurality of divided images obtained by dividing an original image. In addition, the division identifier contains the information for specification of an image generation terminal device to be requested to perform an image generating process, and the information about the position and the shape of a divided image. The image generation terminal device to be requested to perform an image generating process is determined according to a predetermined procedure or designated by a user. The position and the shape of a divided image depend on the pattern of division lines.

In step S32, an image identifier is updated based on the processes in steps S21 through S31. Practically, the number of division is set as shown in FIG. 17A.

When an original image is divided into layers and areas, divided images equal in number to the product of the numbers of layer division and area division are generated. For example, as shown in FIG. 20, if it is assumed that an original image comprises four layers, and the original image is divided into six areas as shown in FIG. 18, then twenty four divided images are generated. Each divided image is identified by the combination of a layer identifier and a division identifier. Then, the image distribution device 10 distributes these twenty four divided images to corresponding image generation terminal devices 20. At this time, the image distribution device 10 can distribute only divided images to be edited in the twenty four divided images to the corresponding image generation terminal devices 20.

Thus, the image division unit 11 generates a division identifier at an instruction of a user, and updates the image identifier based on the division identifier.

Figure 39:
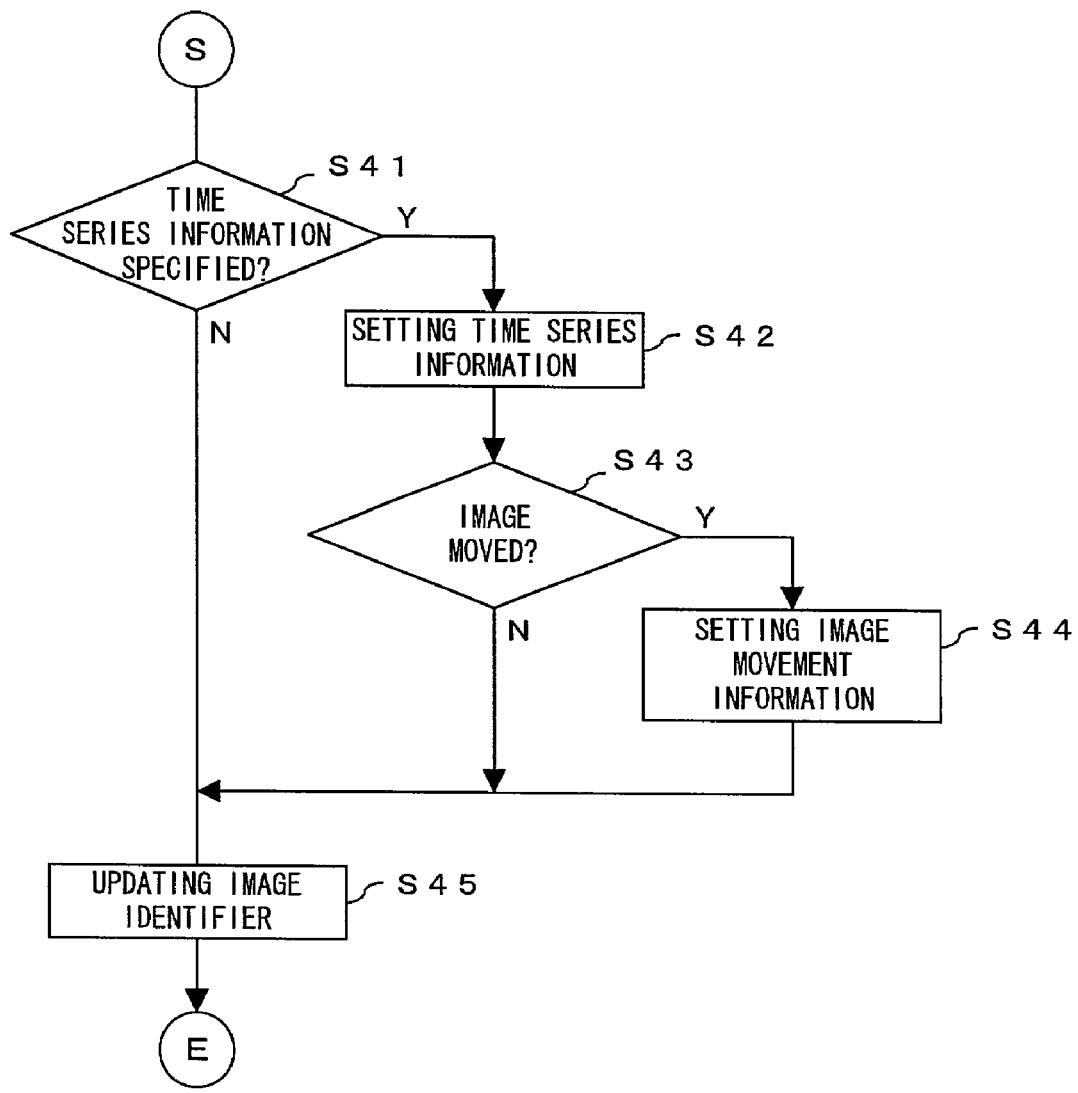
FIG. 39 is a flowchart of the process of setting time-series information.

FIG. 39 is a flowchart of the time series information setting process performed by the image division unit 11. This process corresponds to step S8 shown in FIG. 36. This process can be collectively performed on an original image, or can be individually performed on each divided image.

In step S41, it is checked whether or not the user has issued an instruction to generate a time series information. If yes, the time series information shown in FIG. 24 is generated in step S42. Practically, the information input using the setting screen shown in FIG. 25 is set as time series information.

In step S43, it is checked whether or not a user has issued an instruction relating to the movement of an image element. If yes, image movement information shown in FIG. 26 is generated in step S44. For example, the information input using the setting screen shown in FIGS. 27 through 29 can be set as image movement information.

In step S45, the image identifier is updated in the processes in steps S41 through S44. Practically, the time division number shown in FIG. 17A is set.

Thus, the image division unit 11 generates the time series information and the image movement information at an instruction of a user, and updates the image identifier based on the information.

FIG. 40 shows a flowchart of the operations of the image distribution unit 12 provided in the image distribution device 10. This process is performed when an original image is divided by the image division unit 11. This process is assumed to be performed on each divided image.

In step S51, it is checked whether or not a given divided image is to be transmitted to the image generation terminal device 20. That is, it is checked whether or not a given divided image requires an editing operation. In step S52, it is checked whether or not an identifier for the divided image to be transmitted to the image generation terminal device 20 has been generated. When such an identifier has been generated, the identifier is attached to the divided image in step S53. The identifier contains an image identifier, a division identifier, and a layer identifier.

In step S54, it is checked whether or not additional information for the divided image to be transmitted to the image generation terminal device 20 has been generated. If yes, the additional information is attached to the divided image in step S55. The additional information contains time series information and image movement information.

In steps S56 and S58, it is checked whether or not it is necessary to transmit a predicted complete drawing or a reference drawing to the image generation terminal device 20. It is assumed that whether or not a predicted complete drawing or a reference drawing is to be transmitted is predetermined by the user of the image distribution device 10. A predicted complete drawing or a reference drawing is assumed to be stored in, for example, a predetermined storage area. When it is necessary to transmit a predicted complete drawing or a reference drawing, it is attached to the divided image in steps S57 and S59.

In step S60, it is checked whether or not it is necessary to transmit an image in an area adjacent to a divided image. Whether or not it is necessary to transmit an image in an adjacent area is set in advance by, for example, a user of the image distribution device 10. If it is necessary to transmit the image in an adjacent area, it is attached to the divided image in step S61.

In step S62, the divided image is transmitted to the image generation terminal device 20 defined by the identifier added in step S53. At this time, the information, the image, etc. attached to the divided image are transmitted together to the image generation terminal device 20.

Thus, the image distribution unit 12 transmits a given divided image to a corresponding image generation terminal device 20. If an identifier, additional information, a predicted complete drawing, a reference drawing, and an image in an adjacent area are attached to the divided image, then they are also transmitted together with the divided image.

Figure 41:
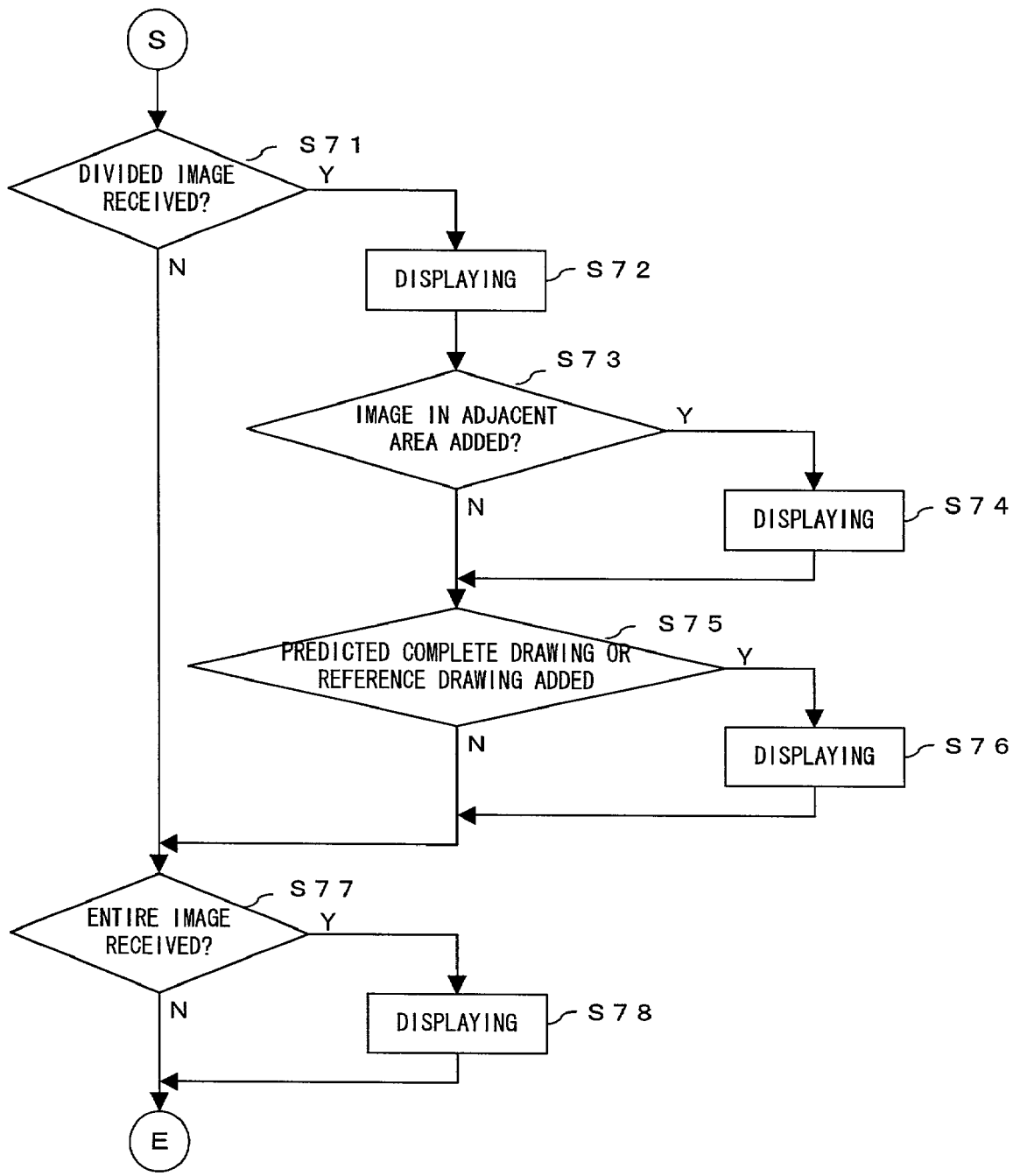
FIG. 41 is a flowchart of the operation performed by the display unit.

FIG. 41 is a flowchart of the operations of the display unit 22 provided in the image generation terminal device 20. This process is performed when a divided image or an entire image is received from the image distribution device 10.

In step S71, it is checked whether or not the image generation terminal device 20 has received a divided image from the image distribution device 10. When a divided image is received, it is displayed in step S72. At this time, the divided image is displayed in the edition area provided by the image generation terminal device 20.

In step S73, it is checked whether or not a received divided image is provided with an image of an area adjacent to the divided image. When the image in the adjacent area is attached to the divided image, the image is displayed as combined with the divided image in step S74. An example of displaying a divided image together with the image in the adjacent area is shown in FIG. 32 or 33.

In step S75, it is checked whether or not a predicted complete drawing or a reference drawing has been attached to the received divided image. If yes, it is displayed in step S76. An example of displaying a predicted complete drawing or a reference drawing is shown in FIG. 35. A predicted complete drawing or a reference drawing is basically displayed in an area different from the area for the received divided image, but can also be superposed on an arbitrary image at an instruction from a user.

In step S77, it is checked whether or not the image generation terminal device 20 has received an entire image from the image distribution device 10. If yes, the entire image is displayed in step S78. At this time, the entire image is displayed in an area different from the area for the received divided image. An example of displaying the entire image is shown in FIG. 32 or 33.

Thus, the display unit 22 can display the received divided image together with the predicted complete drawing, the reference drawing, the entire drawing, etc. Then, the image generation terminal device 20 generates a divided image corresponding to the received divided image according to an instruction of the user or automatically generates it according to the received additional information.

Figure 42:
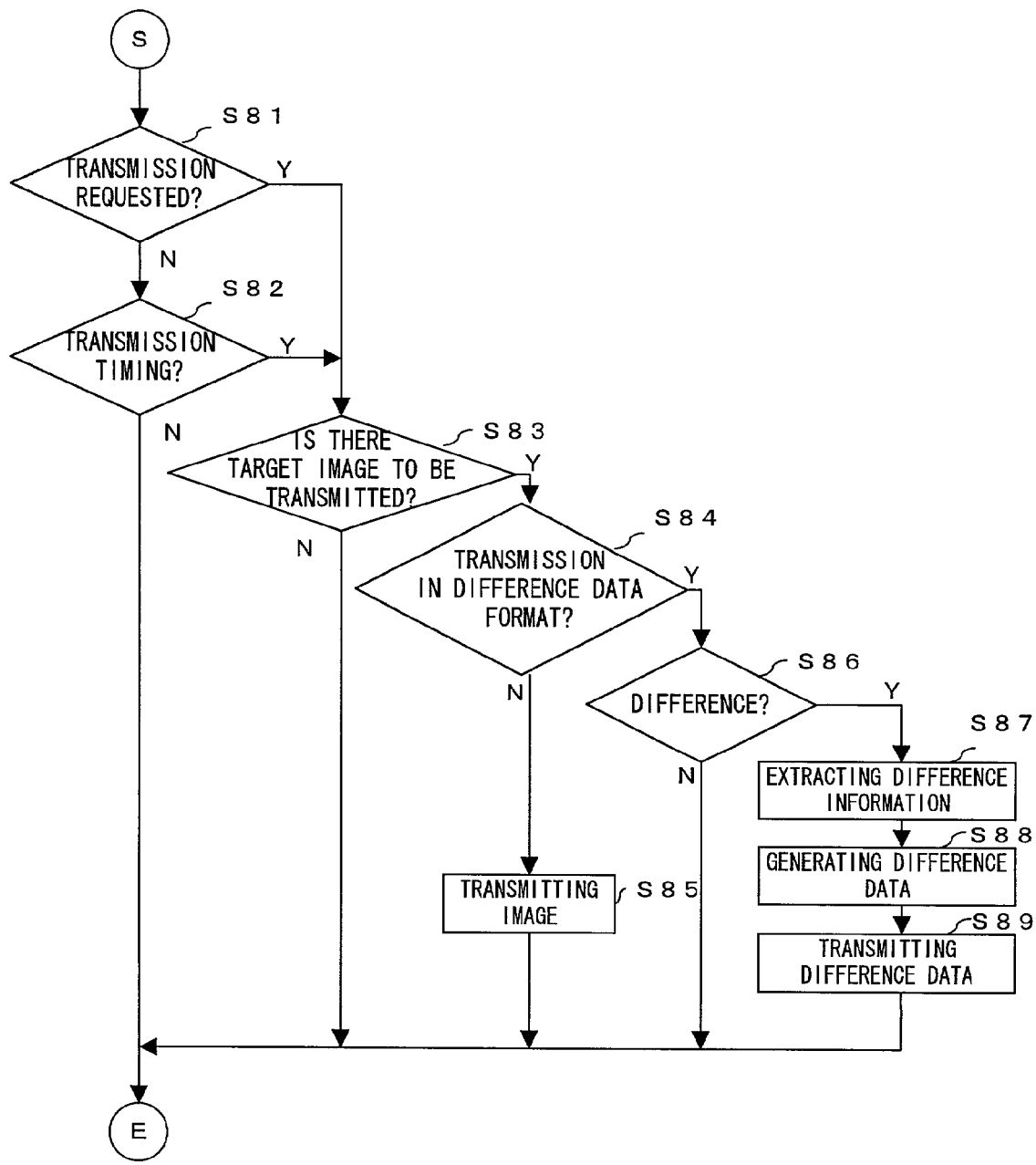
FIG. 42 is a flowchart of the operation performed by the transmission unit.

FIG. 42 is a flowchart of the operations of the transmission unit 23 provided in the image generation terminal device 20. This process is performed when a request from the image distribution device 10 is received or at each predetermined time.

In step S81, it is checked whether or not a transmission request has been received from the image distribution device 10. The "transmission request" is a message requesting to transmit a divided image generated by the image generation terminal device 20 to the image distribution device 10. In step S82, it is checked whether or not a predetermined time has passed from a transmission timing of the previous divided image from the image generation terminal device 20 to the image distribution device 10. If a transmission request has been received or a predetermined time has passed, then it is checked in step S83 whether or not there is a divided image to be transmitted to the image distribution device 10.

If there is no divided image to be transmitted to the image distribution device 10, then the process terminates. On the other hand, if there is a divided image to be transmitted, then it is checked in step S84 whether or not it is possible to transmit a divided image in a difference data format. A "difference data format" refers to the system of detecting the difference between the divided image at the previous timing and the divided image at the current time, and transmitting the difference. Whether or not it is possible to transmit an image in the difference data format is assumed to be predetermined between the image distribution device 10 and the image generation terminal device 20.

If it is not possible to transmit an image in the difference data format, the generated divided image at this timing is transmitted to the image distribution device 10 in step S85. On the other hand, if it is possible to transmit an image in the difference data format, then it is checked in step S86 whether or not there is a difference between the divided image at the previous transmission timing and the divided image at the current time. If not, no data is transmitted to the image distribution device 10, and the process terminates, or a message informing that there is no difference is transmitted to the image distribution device 10.

If there is a difference, then the difference is detected and the difference data is generated in steps S87 and S88. Then, in step S89, the generated difference data is transmitted to the image distribution device 10.

The transmission unit 23 transmits the transmission information shown in FIG. 30 together with the divided image to the image distribution device 10. If a divided image is transmitted in step S85, then the difference flag is set to "0 (no difference)". If difference data is transmitted in step S89, then the difference flag is set to "1 (difference data format)". When the image generating process is completed in the image generation terminal device 20, the end flag is set to "1 (end)".

Thus, the transmission unit 23 transmits a divided image being generated by the image generation terminal device 20 or the generate divided image to the image distribution device 10 regardless of whether or not the image generating process has been completed.

Figure 43:
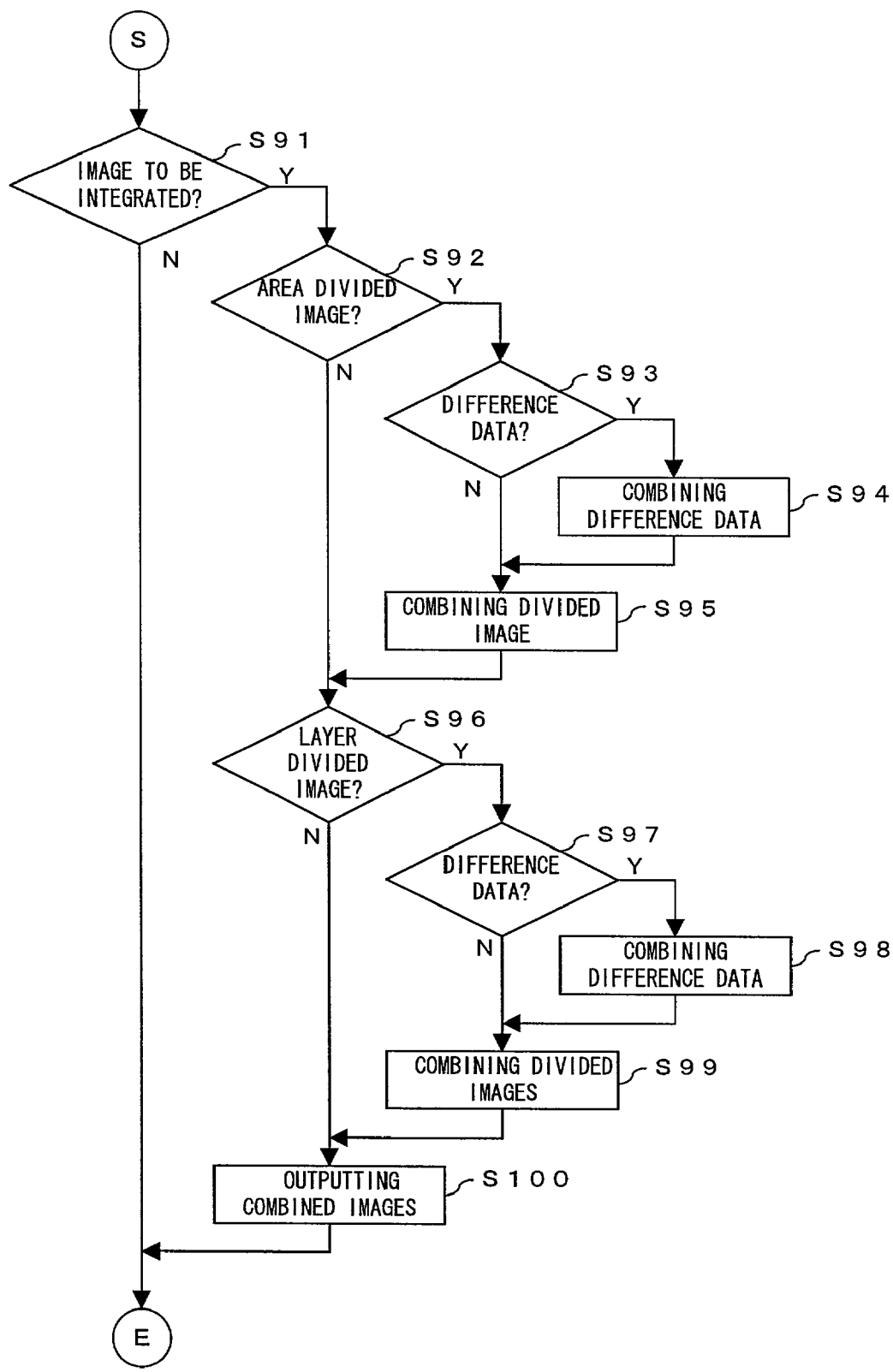
FIG. 43 is a flowchart of the operation performed by the image generation unit.

FIG. 43 is a flowchart of the operations of the image generation unit 13 provided in the image distribution device 10. This process is performed when a plurality of divided images generated by the image generation terminal devices 20 are received.

In step S91, it is checked whether or not the received images are to be combined. In step S92, it is checked whether or not the received image is an image obtained by dividing an image into areas. In this case, the image identifier assigned to the divided image is referred to. If the "number of division" is equal to or larger than "2", then it is determined that the image has been divided into areas.

If the received image is an image obtained by dividing an original image into areas, then it is checked whether or not the received image is difference data. In this case, the difference flag of the transmission information assigned to the received image is referred to. If the received image is difference data, then the difference data is combined with the previously received image in step S94, thereby forming one divided image. In step S95, the entire image is generated by integrating a plurality of received divided images (or the divided images formed in step S94), thereby forming the entire image.

In step S96, it is checked whether or not the received images have been obtained by dividing an image into layers. In this case, the image identifier assigned to a received image is referred to. If the "number of layers" is equal to or larger than "2", then it is determined that an image has been divided into layers. If the received image is an image obtained by dividing an original image into layers, it is checked in step S97 whether or not the received image is difference data. If the received image is difference data, then the image corresponding to the same layer received previously is combined with the difference data in step S98, thereby forming the divided image of the layer. In step S99, by integrating a plurality of received divided images (or the divided image formed in step S98), the entire image can be generated. The processes in steps S96 through S99 are performed on each layer. Therefore, when an image comprises a plurality of layers, the processes in steps S96 through S99 are repeatedly performed the number of times equal to the number of layers, thereby generating the entire image including all layers.

In step S100, the entire image generated in steps S92 through S99 is output. When images whose time series information shown in FIG. 24 is set are integrated, the above mentioned process is performed for each frame. Thus, a plurality of generated entire images form continuous images or moving picture.

As described above, the image generation terminal device 20 can transmit a divided image being generated to the image distribution device 10. In this case, the entire image obtained in the above mentioned process shown in the flowchart is obviously being generated. When the image distribution device 10 has generated the entire image before completion, it transmits the image to the image generation terminal device 20. The image generation terminal device 20 displays the entire image being generated. A practical example of the process is shown in FIGS. 31 through 33. Whether the divided image received from the image generation terminal device 20 is an image being generated or a complete image is determined by an end flag in the transmission information.

Figure 44:
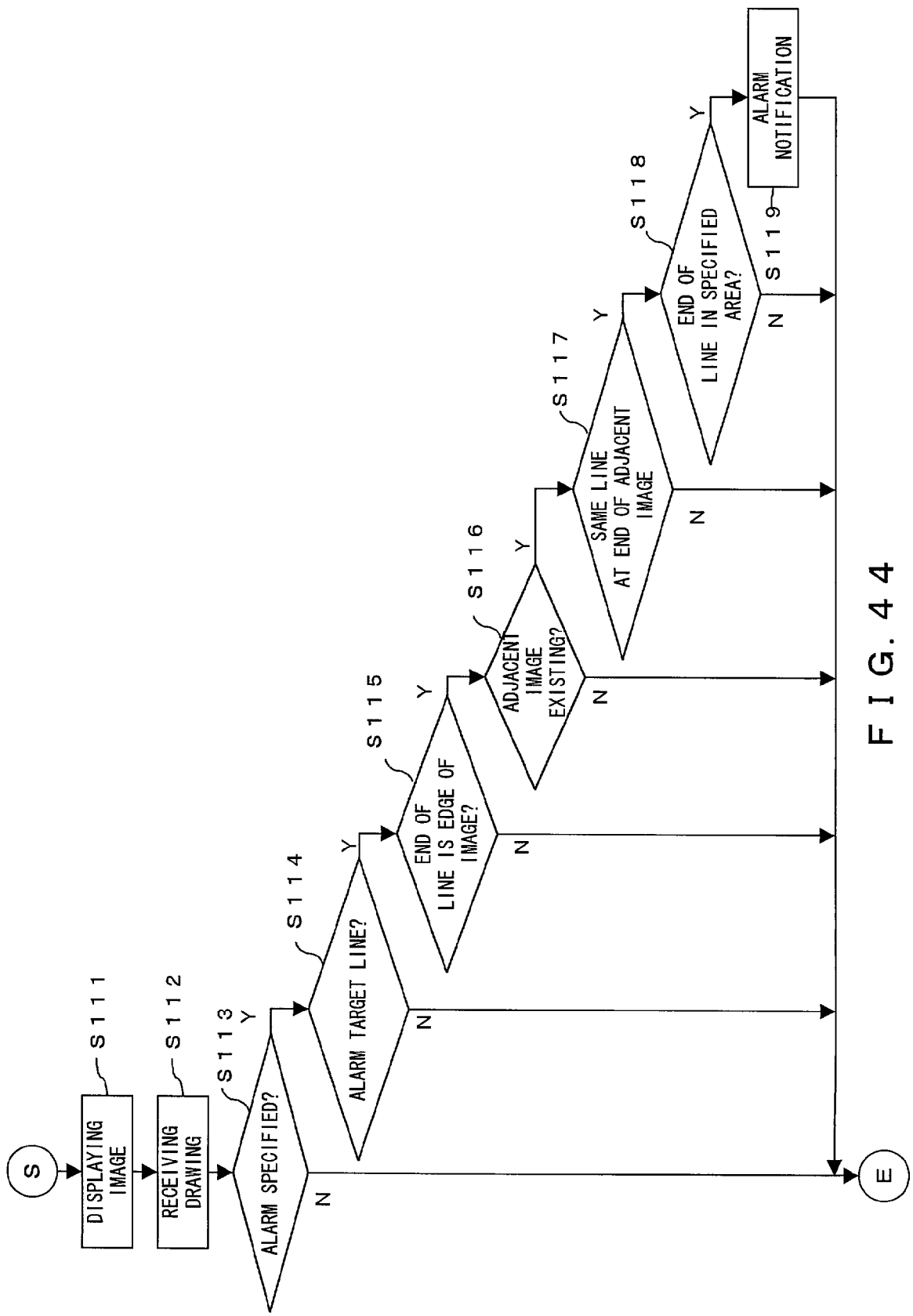
FIG. 44 is a flowchart of the process of checking the consistency of a plurality of divided images.

FIG. 44 is a flowchart of the process of checking the consistency of the divided image generated by the image generation terminal device 20. In this example, the process is performed by the display unit 22 of the image generation terminal device 20.

In step S111, the image assigned to the image generation terminal device 20 is displayed. In step S112, a drawing instruction is received from a user. In step S113, it is checked whether or not an alarm is to be raised when there is inconsistency between adjacent images. A user can specifies whether the alarm is needed.

In step S114, it is checked whether or not a newly drawn line is an alarm target. In this example, the image element of the line having an attribute (for example, the line drawn in the vector image) is an alarm target. In step S115, it is checked whether or not the end of the line is drawn to the edge of the image.

In step S116, it is checked whether or not an image in the area adjacent to the area of the divided image assigned to the image generation terminal device 20 has been received. In this example, it is assumed that the image in the area adjacent to the area of the image generated by another image generation terminal device 20 is transferred through the image distribution device 10. In step S117, it is checked whether or not the received image in the adjacent area contains a line having the same attribute as the above mentioned alarm target line. If the line is drawn, it is checked in step S118 whether or not the discrepancy between the positions of the two lines can be allowed. If the discrepancy is not allowed, an alarm is raised for the user of the image generation terminal device 20 in step S119.

Thus, the image generation terminal device 20 raises an alarm when there is inconsistency of the positions of the image elements drawn in two adjacent divided images.

When the image distribution device 10 assigns a divided image to a corresponding image generation terminal device 20, the performance of each image generation terminal device 20 and the skill of the user of each image generation terminal device 20 can be considered. For example, a process of a heavy load can be assigned to an image generation terminal device with high performance or of a user of a high skill.

The above mentioned image generation function is realized by performing the software program describing the process shown in the above mentioned flowchart using a computer.

Figure 45:
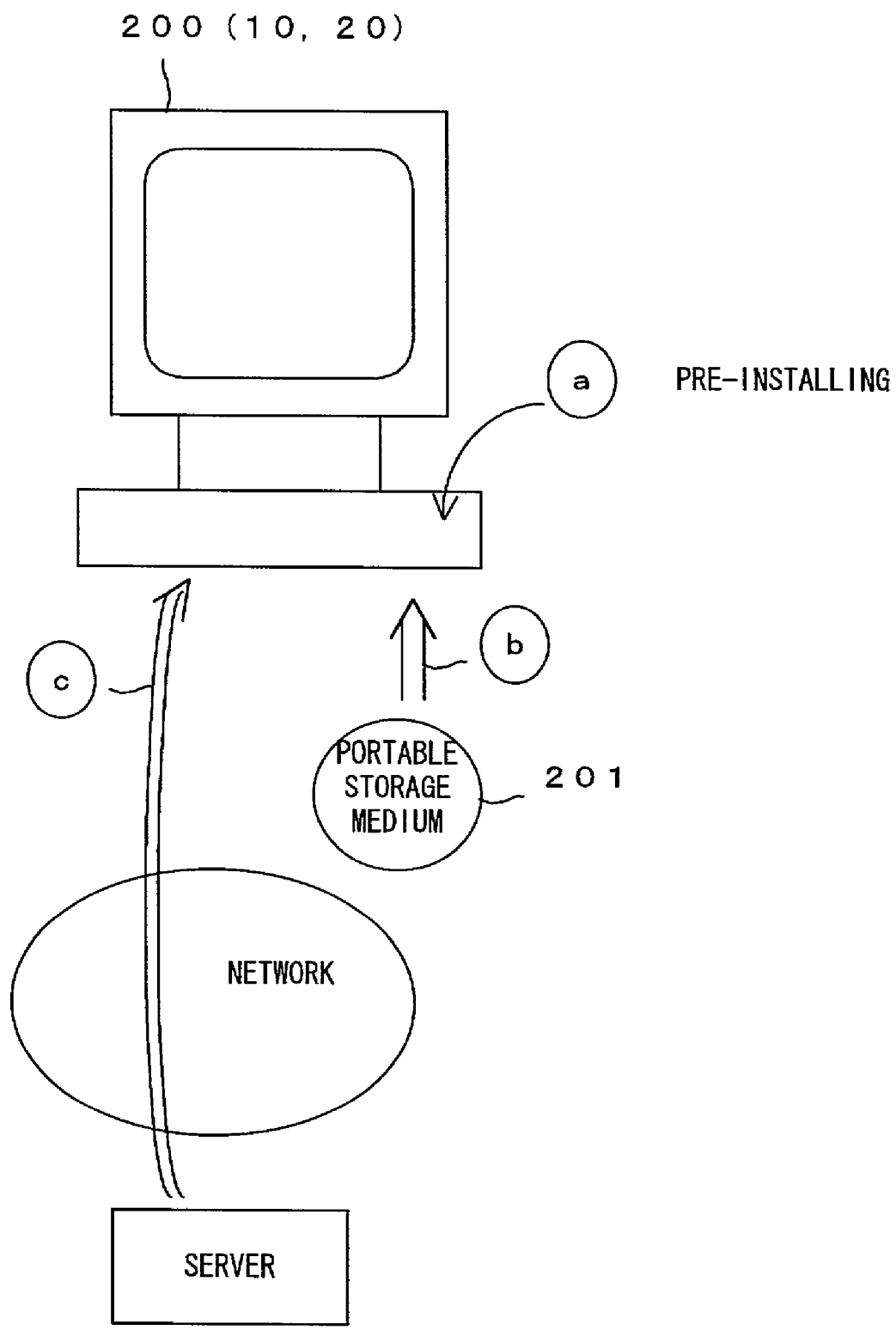
FIG. 45 shows the method of providing a software program according to the present invention.

FIG. 45 shows the methods of providing a software program, etc. of the present invention. A program according to the present invention is provided by, for example, any of the following three methods.

(a) The program is installed and provided in a computer 200 (the image distribution device 10 and the image generation terminal device 20). In this case, the program, etc. is pre-installed, for example, before delivery.

(b) The program is stored in a portable storage medium 201. The portable storage medium 201 includes, for example, a semiconductor device (PC card, memory stick, etc.), a medium (floppy disk, magnetic tape, etc.), for input/output of information through a magnetic effect, a medium (optical disc etc.) for input/output of information through an optical effect.

(c) The program is provided from a server in a network. In this case, basically, the program can be obtained by the computer 200 downloading the program, etc. stored in the server.

According to the present invention, an image is concurrently edited in a plurality of image generation terminal devices, and images can be generated in time series. Furthermore, since moving picture can be automatically generated in a predetermined pattern, the moving picture can be efficiently generated, careless mistakes can be reduced, and the load of a user can be considerably reduced. Thus, for example, a large image and continuous images can be shared among a plurality of users in performing processes on the image(s), thereby remarkably improving the efficiency and the speed of editing operations.

In dividing an image, image generating operations are shared among users according to the respective skills of the users, and the operations are concurrently performed. As a result, the entire operations can be efficiently performed, and can be delivered in a short period. In addition, by devising the method of dividing an image, the editing operation can be performed without consideration of the direction of the entire image, and non-related areas. This process can be efficiently performed by assigning a portion to be generated to a user who has a specific skill.

Furthermore, since an operation can be performed through a network, operations can be performed regardless of the positions of installed devices when images are generated by a plurality of image generation terminal devices. Therefore, one image can be edited/generated although a plurality of image generation terminal devices which are provided apart from each other.

Additionally, images being generated and transmitted from a plurality of image generation terminal devices are integrated into one image, and the obtained image is displayed in real time on any image generation terminal device. Thus, a user can edit his or her own divided image while viewing the process of generating an image by another image generation terminal device, thereby efficiently editing an image with high precision. Furthermore, since the entire image can be monitored in real time, the influence of an image being divided and generated on the entire image can be immediately detected and corrected. As a result, an image can be generated without waste of time or operations.

Furthermore, since the predicted complete drawing or reference drawing (sample) is displayed together with a divided image to be generated while a divided image is being generated or edited, the directions of the image generating operations can be unified.

What is claimed is:

1. An image generation system which generates or edits an image using a plurality of image generation devices, comprising:
   a division unit having at least a function of dividing a target image into a plurality of areas or a function of dividing the target image into layers when the target image is formed by a plurality of layers;
   a distribution unit distributing images divided by said division unit to corresponding image generation devices;
   a generation unit generating or editing a divided image corresponding to the received divided image in each image generation device; and an integration unit integrating divided images generated or edited by the plurality of image generation devices, and wherein:

said distribution unit distributes time series information defining a time interval of each frame and a total number of frames of a moving picture to be generated together with the divided image to a corresponding image generation device; and said image generation device generates a plurality of divided images corresponding to the received divided images according to the time series information.

2. The system according to claim 1, wherein said distribution unit distributes only a divided image requiring generation of a corresponding divided image to the image generation device.

3. The system according to claim 1, wherein said distribution unit distributes together with the divided image to a corresponding image generation device a first identifier identifying the target image, and at least one of a second identifier identifying an area divided by said division unit and a third identifier identifying each layer.

4. The system according to claim 3, wherein:

each image generation device assigns the first identifier and at least one of the second and third identifiers to a generated or edited divided image; and said integration unit integrates divided images based on identifiers assigned to divided images generated or edited by the plurality of image generation devices.

5. The system according to claim 1, wherein said integration unit integrates the plurality of divided images generated by the plurality of image generation devices into a plurality of images.

6. An image generation system which generates or edits an image using a plurality of image generation devices, comprising:

a division unit having at least a function of dividing a target image into a plurality of areas or a function of dividing the target image into layers when the target image is formed by a plurality of layers;

a distribution unit distributing images divided by said division unit to corresponding image generation devices;

a generation unit generating or editing a divided image corresponding to the received divided image in each image generation device; and an integration unit integrating divided images generated or edited by the plurality of image generation devices, and wherein:

said distribution unit distributes image movement information including data indicative of an image element to be moved in a distributed image and data defining a basic movement, enlargement/reduction, rotation of the indicated image element together with the divided image to a corresponding image generation device; and said image generation device generates a plurality of divided images corresponding to divided images received according to the image movement information.

7. The system according to claim 6, wherein said image movement information contains as a condition of defining movement of the image element at least one of information defining required time, information defining a time interval of each frame of moving picture, information defining enlargement or reduction of the image element, and information defining rotation of the image element.

8. The system according to claim 1, wherein:

said image generation device outputs a divided image in a difference data format; and said integration unit regenerates a divided image by adding a newly received divided image to a previously received divided image, and integrates regenerated divided images.

9. The system according to claim 1, further comprising an alarm unit raising an alarm when a position of an image element contained in a target divided image are not consistent with a position of the same image element contained in an adjacent divided images.

10. The system according to claim 1, wherein said division unit divides a target image based on an arrangement of an image element in the target image or a characteristic of the target image.

11. The system according to claim 1, wherein said division unit divides the target image such that a sum of lengths of division lines for dividing the target image is smallest.

12. The system according to claim 1, wherein said division unit divides the target image depending on a number of image generation devices.

13. An image distribution device for use in an image generation system which generates or edits an image using a plurality of image generation devices, comprising:

a division unit having at least one of a function of dividing a target image into a plurality of areas and a function of dividing the target image into layers when the target image is formed by a plurality of layers;

a distribution unit distributing images divided by said division unit to corresponding image generation devices, each of the images divided being distributed with information of a respective layer;

a generation unit generating or editing a divided image corresponding to the received divided image in each image generation device; and an integration unit integrating divided images generated by the plurality of image generation devices, and wherein:

said distribution unit distributes time series information defining a moving picture to be generated, data indicative of an image element to be moved in a distributed image and data defining a basic movement, enlargement/reduction, rotation of the indicated image element together with the divided image to a corresponding image generation device; and said image generation device generates a plurality of divided images corresponding to the received divided images according to the time series information.

14. A storage medium storing a program for providing a method of generating an image by generating or editing an image using a plurality of image generation devices, said method comprising:

receiving a divided image obtained by dividing a target image from an image distribution device and generating a corresponding divided image, the divided image and the target image being substantially simultaneously displayed using corresponding plurality of image generation devices; and transmitting a divided image being generated at an instruction from said image distribution device or at each predetermined time interval, wherein data indicative of an image element to be moved in the divided image and data defining a basic movement, enlargement/reduction, rotation of the indicated image element is transmitted together with the divided image.

15. A computer program product for generating an image by generating or editing an image using a plurality of image generation devices, said computer program product comprising:

a program code for providing at least a function for dividing a target image into a plurality of areas and a function for dividing the target image into layers when the target image is formed by a plurality of layers;

a program code for distributing the divided images divided by said function to corresponding image generation device, each of the divided images being distributed with information of a respective layer; and a program code for integrating divided images generated by the plurality of image generation device, and wherein:

said distributing distributes time series information defining a moving picture to be generated, data indicative of an image element to be moved in a distributed image and data defining a basic movement, enlargement/reduction, rotation of the indicated image element together with the divided image to a corresponding image generation device; and said generating or editing generates a plurality of divided images corresponding to the received divided images according to the time series information.

16. A computer program product for generating an image by generating or editing an image using a plurality of image generation devices, said computer program product comprising:

a program code for receiving a divided image obtained by dividing a target image from an image distribution device, and generating a corresponding divided image;

a program code for substantially simultaneously displaying the divided image and changes to the target image using corresponding plurality of image generation devices; and a program code for transmitting a divided image being generated at an instruction from said image distribution device or at each predetermined time interval, wherein data indicative of an image element to be moved in the distributed image and data defining a basic movement, enlargement/reduction, rotation of the indicated image element is transmitted together with the divided image.

* * * * *

UNITED STATES PATENT AND TRADEMARK OFFICE
CERTIFICATE OF CORRECTION

| | | |
|---|---|---|
| PATENT NO. | : 7,023,452 B2 | Page 1 of 1 |
| APPLICATION NO. | : 09/911419 | |
| DATED | : April 4, 2006 | |
| INVENTOR(S) | : Tomoyuki Oshiyama et al. | |

It is certified that error appears in the above-identified patent and that said Letters Patent is hereby corrected as shown below:

Column 30, line 9, after "and" delete "changes to"

Signed and Sealed this

Thirty-first Day of October, 2006

JON W. DUDAS
*Director of the United States Patent and Trademark Office*